US 8,111,317 B2

(12) United States Patent
Fukuma et al.

(10) Patent No.: US 8,111,317 B2
(45) Date of Patent: Feb. 7, 2012

(54) IMAGE CAPTURING APPARATUS WITH LENS COVER

(75) Inventors: Yohei Fukuma, Chiba (JP); Kenichi Agata, Tokyo (JP); Ryo Yamamoto, Chiba (JP); Toru Karashima, Tokyo (JP); Naohiko Otake, Chiba (JP); Nozomi Ozaki, Kanagawa (JP); Hisaya Miyashita, Kanagawa (JP); Daisuke Ishii, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/983,531

(22) Filed: Jan. 3, 2011

(65) Prior Publication Data

US 2011/0109785 A1    May 12, 2011

Related U.S. Application Data

(63) Continuation of application No. 11/600,267, filed on Nov. 15, 2006, now Pat. No. 7,969,497.

(30) Foreign Application Priority Data

Nov. 21, 2005    (JP) ............................... P2005-335705
Nov. 21, 2005    (JP) ............................... P2005-335706
Dec. 6, 2005    (JP) ............................... P2005-352118

(51) Int. Cl.
    *H04N 5/222*    (2006.01)
(52) U.S. Cl. .................. 348/333.06; 348/373
(58) Field of Classification Search ........... D14/138 AD, D14/138 C, 317, 371, 138 R; D16/206, 212, D16/229, 200; 348/333.06, 333.07, 552, 348/373, 375, 376, 207.99; 455/575.4, 556.1, 455/575.3; 396/448, 229
    See application file for complete search history.

(56) References Cited

U.S. PATENT DOCUMENTS

| 4,985,037 A | 1/1991 | Petersen |
| 2004/0204202 A1 | 10/2004 | Shimamura et al. |
| 2006/0046796 A1 | 3/2006 | Park et al. |
| 2006/0078324 A1 | 4/2006 | Yasuda et al. |

FOREIGN PATENT DOCUMENTS

| EP | 0 963 100 | 12/1999 |
| EP | 1 585 316 | 10/2005 |
| EP | 1786198 | 5/2007 |

(Continued)

OTHER PUBLICATIONS

Communication from corresponding European Application 06255899.

(Continued)

*Primary Examiner* — Nelson D. Hernández Hernández
(74) *Attorney, Agent, or Firm* — Lerner, David, Littenberg, Krumholz & Mentlik, LLP

(57) ABSTRACT

An image capturing apparatus includes a camera body having an image-capturing lens for receiving light to form an image of a subject and a display unit having a display screen for displaying the image. The display unit is slidably supported by the camera body. A surface of the display unit opposite a surface having the display screen disposed thereon faces a surface of the camera body opposite a surface having the image-capturing lens disposed thereon. An image capture button is disposed on the surface of the camera body opposite the surface having the image-capturing lens disposed thereon. The image capture button is exposed when the display unit is slid over the camera body in a first direction and the image capture button is covered by the display unit when the display unit is slid over the camera body in a second direction opposite the first direction.

6 Claims, 41 Drawing Sheets

FOREIGN PATENT DOCUMENTS

| | | |
|---|---|---|
| JP | 61130936 A | 6/1986 |
| JP | 01269263 A | 10/1989 |
| JP | 03058578 A | 3/1991 |
| JP | 03102979 A | 4/1991 |
| JP | 03291065 A | 12/1991 |
| JP | 04114567 A | 4/1992 |
| JP | 04364670 A | 12/1992 |
| JP | 04369975 A | 12/1992 |
| JP | 05025085 A | 2/1993 |
| JP | 07077728 A | 3/1995 |
| JP | 08-098071 | 4/1996 |
| JP | 09135377 A | 5/1997 |
| JP | 10023300 A | 1/1998 |
| JP | 10065943 A | 3/1998 |
| JP | 11064928 A | 3/1999 |
| JP | 11153817 A | 6/1999 |
| JP | 11-298773 | 10/1999 |
| JP | 11-355621 | 12/1999 |
| JP | 2003149708 A | 5/2003 |
| JP | 2005051531 A | 2/2005 |
| JP | 2005134502 A | 5/2005 |
| JP | 2006113174 A | 4/2006 |
| WO | 2006/046681 | 5/2006 |

OTHER PUBLICATIONS

Office Action from Japanese Application No. 2005-352118, dated Feb. 4, 2010.
Office Action from Japanese Application No. 2005-335705, dated Nov. 25, 2010.
Office Action from Japanese Application No. 2005-335706, dated Nov. 25, 2010.
Office Action from Japanese Application No. 2005-352118, dated Nov. 25, 2010.

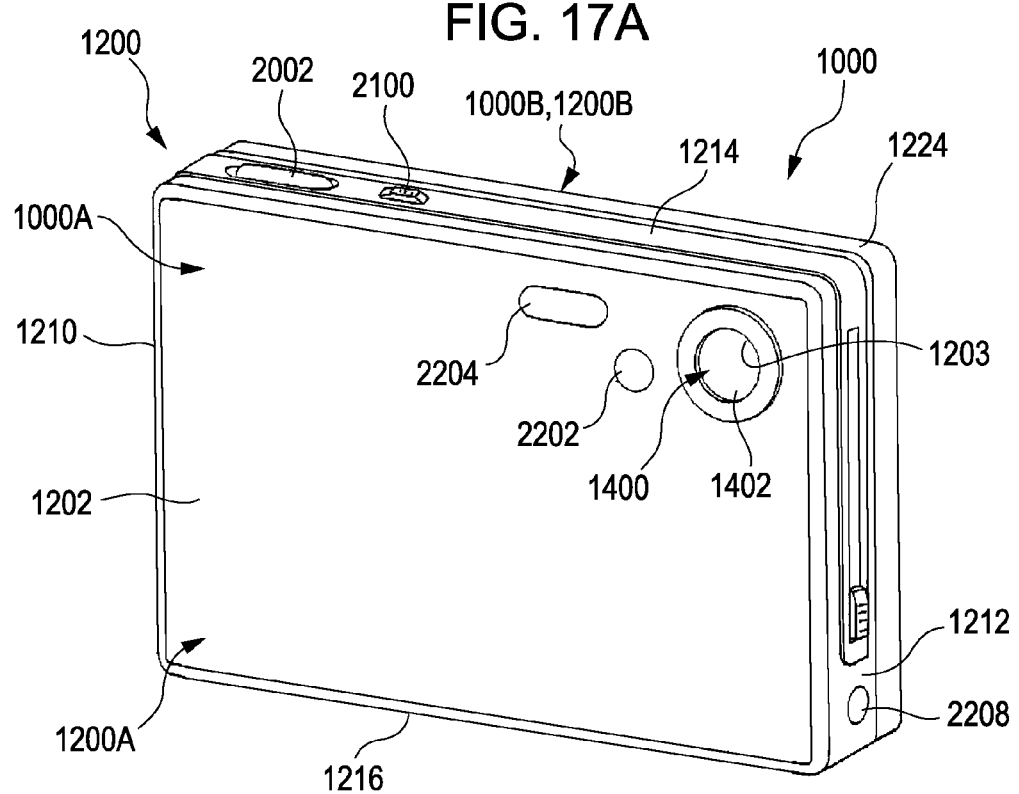
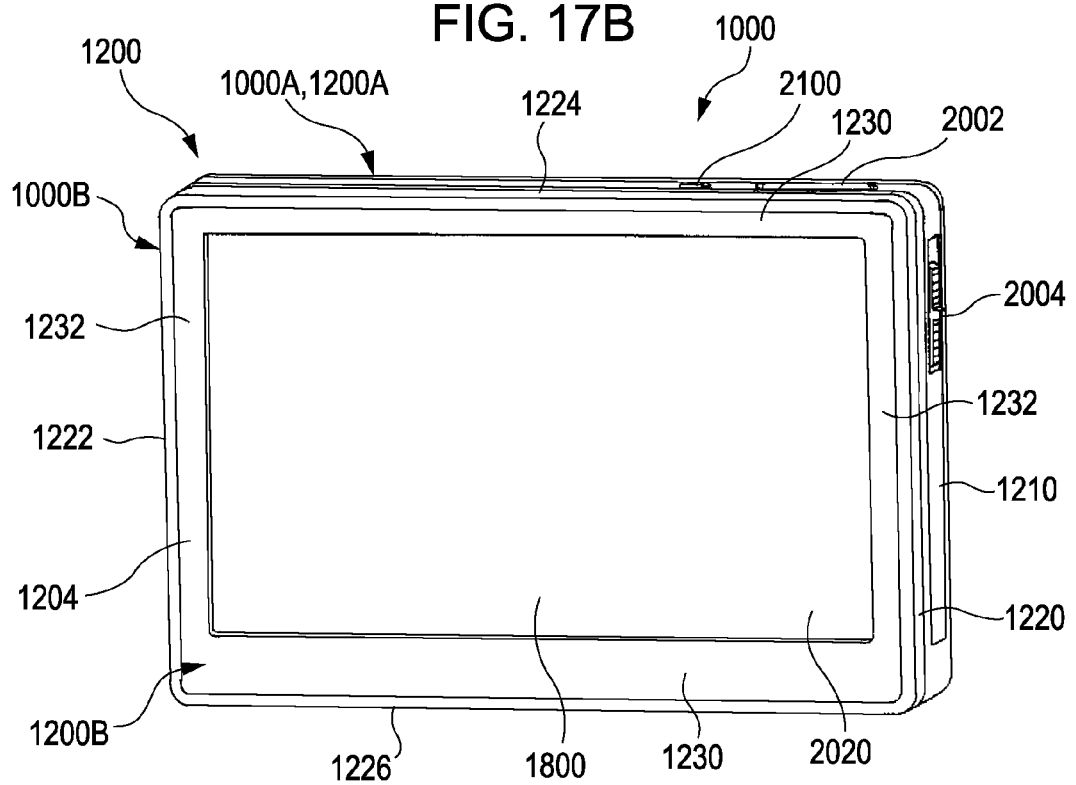

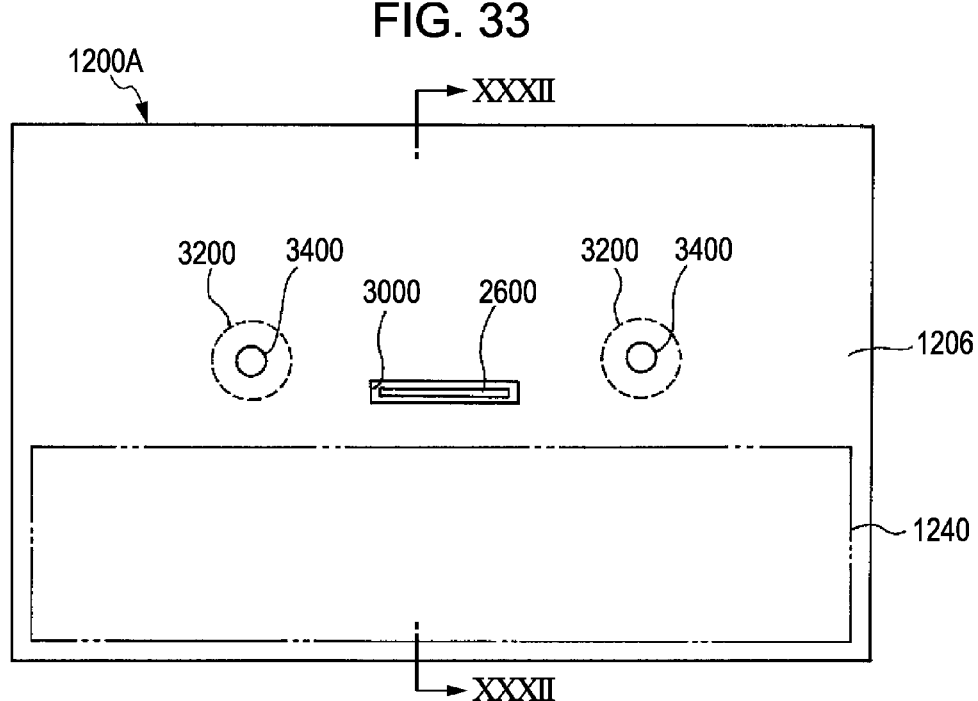
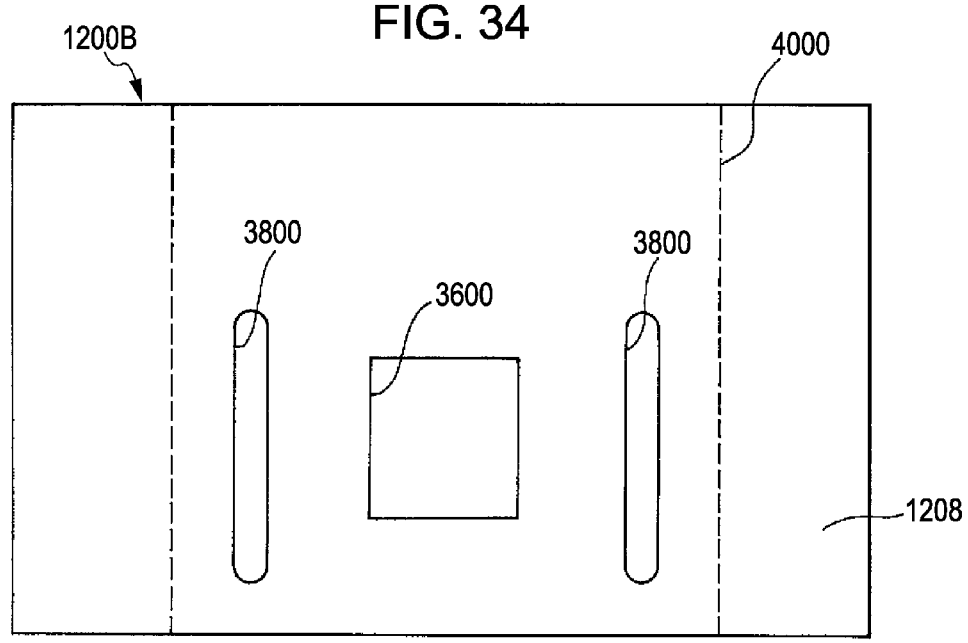

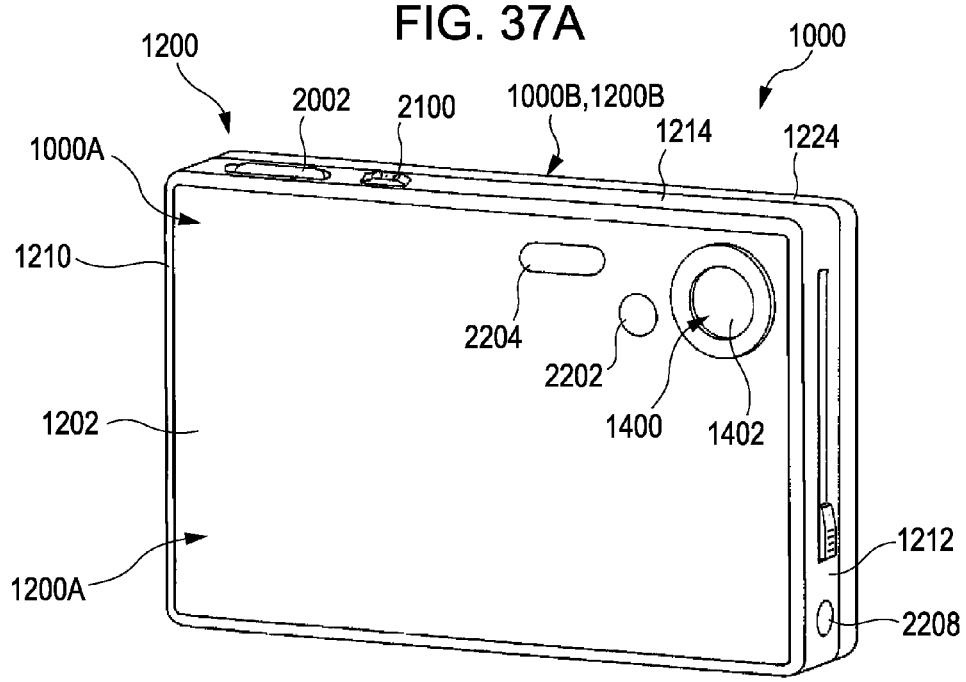
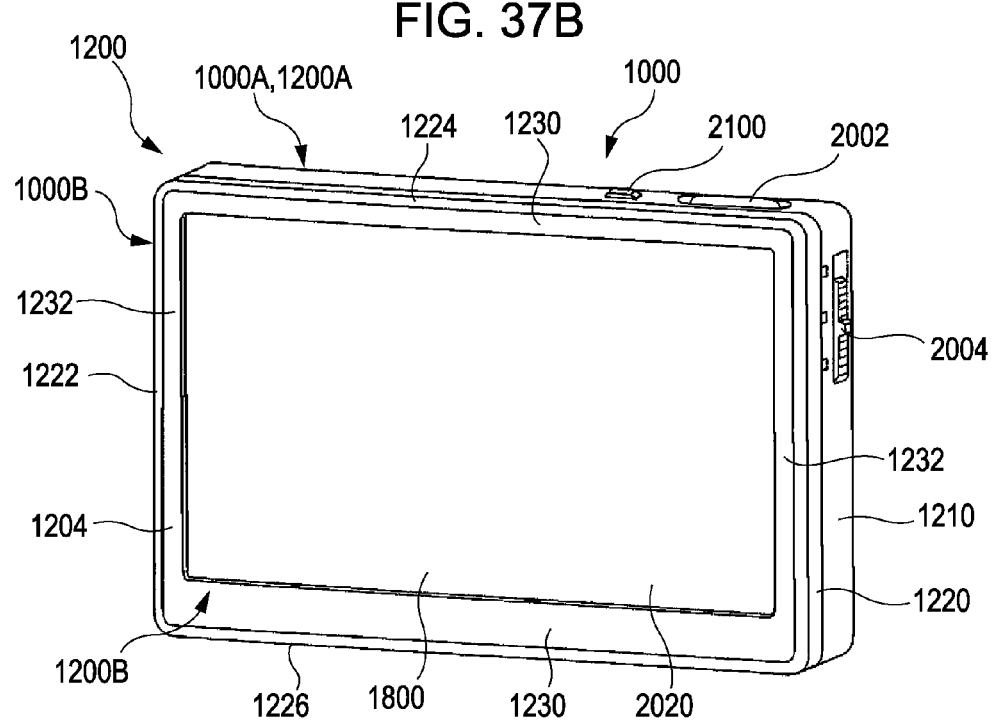

IMAGE CAPTURING APPARATUS WITH LENS COVER

CROSS REFERENCES TO RELATED APPLICATIONS

This application is a continuation of U.S. application Ser. No. 11/600,267, filed on Nov. 15, 2006, which contains subject matter related to Japanese Patent Application JP 2005-335705 filed in the Japanese Patent Office on Nov. 21, 2005, JP 2005-335706 filed in the Japanese Patent Office on Nov. 21, 2005, and JP 2005-352118 filed in the Japanese Patent Office on Dec. 6, 2005, the entire contents of which are incorporated herein by reference.

BACKGROUND OF THE INVENTION

1. Field of the Invention

The present invention generally relates to an image capturing apparatus and, in particular, to a technology to allow a display unit having a display screen to be slidable with respect to a camera body having an image-capturing lens.

2. Description of the Related Art

Image capturing apparatuses (such as video cameras and still cameras) that are capable of capturing moving images or still images are in widespread use.

The image capturing apparatus includes an image-capturing lens for capturing the image of a subject, buttons for performing a variety of operations for taking a picture, and a display screen for displaying an image when taking a picture and playing back the captured image.

Among such image capturing apparatuses, some image capturing apparatuses include a camera body having the image-capturing lens and a display unit that is slidable with respect to the camera body. The image-capturing lens is disposed on the front surface of the camera body. An operation unit including the operation buttons for taking a picture is disposed on the back surface of the camera body. In addition, the display screen is disposed on the back surface of the display unit (refer to, for example, Japanese Unexamined Patent Application Publication No. 8-98071).

In the image capturing apparatus described in Japanese Unexamined Patent Application Publication No. 8-98071, the operation unit including the operation buttons for taking a picture is exposed to the outside regardless of the sliding state of the display unit with respect to the camera body (refer to FIGS. 1 and 2 of Japanese Unexamined Patent Application Publication No. 8-98071). However, when no pictures are taken, the whole display unit can be folded onto the camera body (refer to FIG. 1 of Japanese Unexamined Patent Application Publication No. 8-98071).

SUMMARY OF THE INVENTION

As noted above, in the known image capturing apparatuses, the operation unit including the operation buttons for taking a picture is exposed to the outside regardless of the sliding state of the display unit with respect to the camera body. However, since the operation buttons are used only when the image of a subject is captured, the operation buttons are not necessary when a user plays back a captured image on the display screen. Accordingly, at the playback time, the user could automatically operate or touch the operation buttons for taking a picture. At that time, the image capturing apparatus may unintentionally operate.

Accordingly, the present invention addresses the problem described above by providing an image capturing apparatus whose size can be flexibly changed according to need.

According to an embodiment of the present invention, an image capturing apparatus includes a camera body having an image-capturing lens for receiving light to form an image of a subject and a display unit having a display screen for displaying the image. The display unit is slidably supported by the camera body. A surface of the display unit opposite a surface having the display screen disposed thereon faces a surface of the camera body opposite a surface having the image-capturing lens disposed thereon. An image capture button is disposed on the surface of the camera body opposite the surface having the image-capturing lens disposed thereon. The image capture button is exposed when the display unit is slid over the camera body in a first direction and the image capture button is covered by the display unit when the display unit is slid over the camera body in a second direction opposite the first direction.

Accordingly, in the image capturing apparatus, the image capture button is covered and uncovered in accordance with the slide operation of the display unit with respect to the camera body.

According to another embodiment of the present invention, an image capturing apparatus includes a camera body having an image-capturing lens for receiving light to form an image of a subject and a display unit having a display screen for displaying the image. The display unit is slidably supported by the camera body. A surface of the display unit opposite a surface having the display screen disposed thereon faces a surface of the camera body opposite a surface having the image-capturing lens disposed thereon. An image capture button used for capturing the image is disposed on the surface of the camera body opposite the surface having the image-capturing lens disposed thereon. The image capture button is exposed and an image capture mode for capturing the image of a subject is set when the display unit is slid over the camera body in a first direction.

Accordingly, the image capturing apparatus can be set to the image capture mode at the same time as the image capture button is exposed.

As described above, according to an embodiment of the present invention, an image capturing apparatus includes a camera body having an image-capturing lens for receiving light to form an image of a subject and a display unit having a display screen for displaying the image. The display unit is slidably supported by the camera body. A surface of the display unit opposite a surface having the display screen disposed thereon faces a surface of the camera body opposite a surface having the image-capturing lens disposed thereon. An image capture button is disposed on the surface of the camera body opposite the surface having the image-capturing lens disposed thereon. The image capture button is exposed when the display unit is slid over the camera body in a first direction and the image capture button is covered by the display unit when the display unit is slid over the camera body in a second direction opposite the first direction.

Accordingly, in the closed configuration, unnecessary buttons for taking a picture are not exposed.

Additionally, in the closed configuration, the image capturing apparatus can be used with the size being compact. In addition, when the image capturing apparatus is not used, the image capturing apparatus can maintain the small size.

The image capturing apparatus can further include a lens cover configured to cover and uncover the image-capturing lens. The lens cover is slidable with respect to the camera body together with the display unit. The lens cover uncovers the image-capturing lens when the display unit is slid in the first direction and the lens cover covers the image-capturing lens when the display unit is slid in the second direction. Accordingly, in a closed configuration, the image-capturing lens can be protected. In addition, a dedicated lens cover for protecting the image-capturing lens is not needed, and therefore, the number of components of the image capturing apparatus can be reduced.

In the image capturing apparatus, when the display unit is slid in the first direction, the center of the display screen can move in a direction towards the image-capturing lens. Accordingly, during capturing of an image of the subject, the shift of the center of the display screen from the position of the image capturing lens can be reduced. Consequently, the image capturing apparatus can easily enable taking of a photograph with reduced parallax.

In the image capturing apparatus, when the display unit is slid in the first direction and the image capture button is exposed, the center of the display screen is located on the optical axis of the image-capturing lens. Consequently, the image capturing apparatus can enable taking of a photograph without parallax.

In the image capturing apparatus, when the direction of the image-capturing lens is defined as a Z-axis direction and two directions that are mutually perpendicular and that are perpendicular to the Z-axis direction are defined as an X-axis direction and a Y-axis direction, the display unit can be slid in the XY plane in a direction that is oblique to the X-axis direction and the Y-axis direction. Accordingly, the freedom of design of the position of the image-capturing lens relative to the camera body and the distance by which the display unit is opened with respect to the camera body can be increased. Accordingly, the image capturing apparatus can easily enable taking of a photograph with reduced parallax.

In the image capturing apparatus, when the display unit is slid and the image capture button is exposed, the center of the display screen can be located on the optical axis of the image-capturing lens. Consequently, the image capturing apparatus can enable taking of a photograph without parallax.

As described above, according to an embodiment of the present invention, an image capturing apparatus includes a camera body having an image-capturing lens for receiving light to form an image of a subject and a display unit having a display screen for displaying the image. The display unit is slidably supported by the camera body. A surface of the display unit opposite a surface having the display screen disposed thereon faces a surface of the camera body opposite a surface having the image-capturing lens disposed thereon. An image capture button used for capturing the image is disposed on the surface of the camera body opposite the surface having the image-capturing lens disposed thereon. The image capture button is exposed and an image capture mode for capturing the image of a subject is set when the display unit is slid over the camera body in a first direction.

Since the image capture mode is set at the same time as the image capture button is exposed, a user can immediately start capturing an image. Thus, the ease of use of the image capturing apparatus can be improved. In addition, in the image capturing apparatus, when the display unit is slid over the camera body in a second direction opposite the first direction, a playback mode for displaying the captured image on the display screen can be set. Accordingly, a user can immediately start playing back an image. Thus, the ease of use of the image capturing apparatus can be improved.

In the image capturing apparatus, when the display unit is slid over the camera body in the first direction, the image capturing apparatus can be powered on. Thus, a user can easily determine whether the image capturing apparatus is powered on or not on the basis of the mode or the shape of the image capturing apparatus. Thus, the ease of use of the image capturing apparatus can be improved.

BRIEF DESCRIPTION OF THE DRAWINGS

FIG. 17A is a front perspective view of an image capturing apparatus according to a third exemplary embodiment of the present invention;

FIG. 17B is a rear perspective view of the image capturing apparatus according to the third exemplary embodiment of the present invention;

FIG. 33 is a view in the direction of arrows XXXIII-XXXIII of FIG. 32;

FIG. 34 is a view in the direction of arrows XXXIV-XXXIV of FIG. 32;

FIG. 37A is a front perspective view of an image capturing apparatus 1000 according to a fifth exemplary embodiment;

FIG. 37B is a rear perspective view of the image capturing apparatus 1000;

DESCRIPTION OF THE PREFERRED EMBODIMENTS

Image capturing apparatuses according to first to sixth exemplary embodiments of the present invention are described below with reference to the accompanying drawings. In these exemplary embodiments, the image capturing apparatuses are applied to cameras that are capable of capturing a moving image and a still image.

The exemplary embodiments of the present invention are applicable to a variety of image capturing apparatuses having a function of capturing a moving image and a still image (such as cell phones, video cameras, and still cameras).

First Exemplary Embodiment

A first exemplary embodiment is described next with reference to FIGS. 1 through 16.

Figure 1:
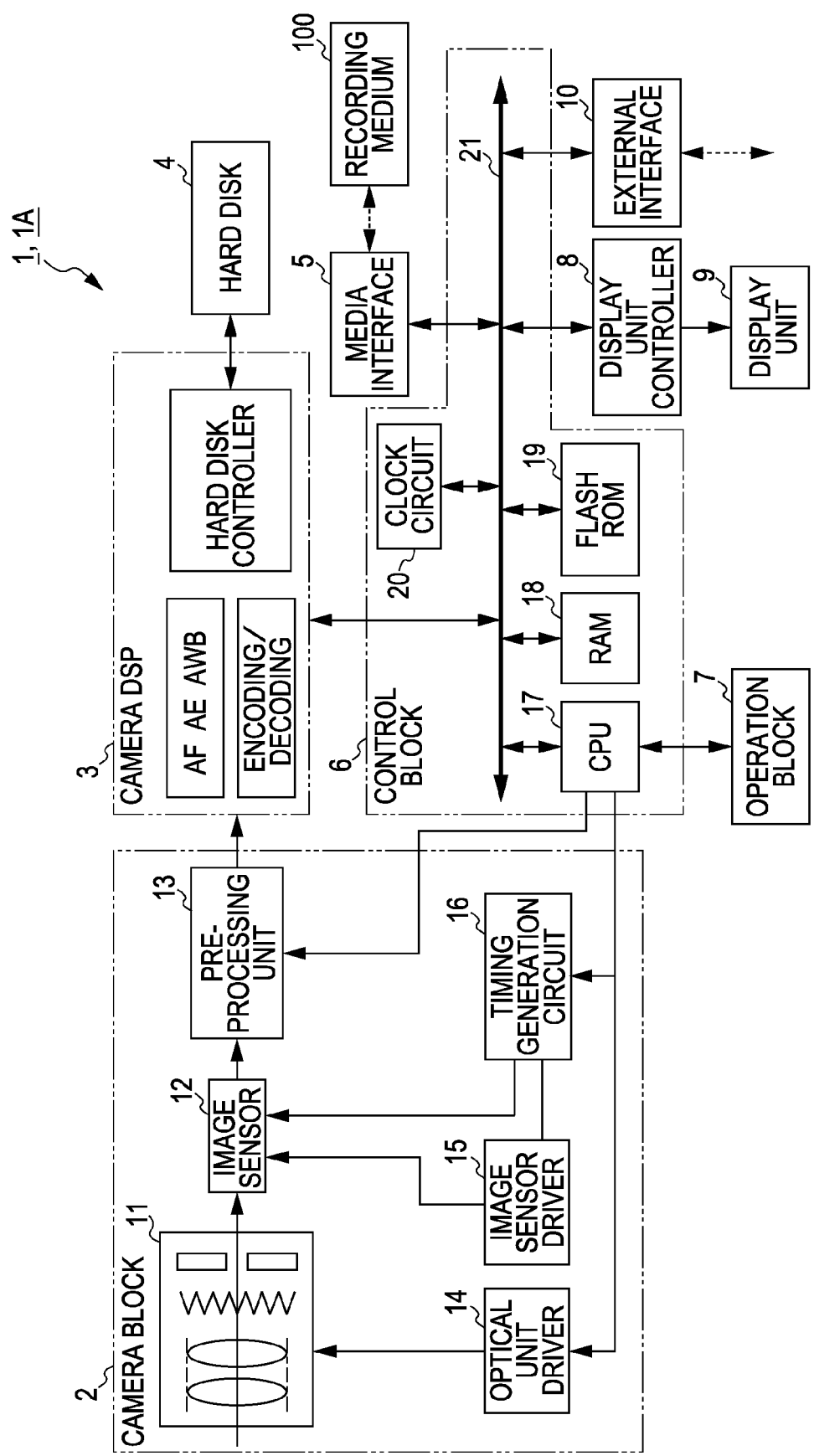
FIG. 1 is a block diagram of an image capturing apparatus according to a first or a second exemplary embodiment of the present invention.

First, the architecture of an image capturing apparatus 1 (or 1A) is described with reference to FIG. 1. The image capturing apparatus 1 is an image capturing apparatus according to the first exemplary embodiment whereas the image capturing apparatus 1A is an image capturing apparatus according to a second exemplary embodiment, which will be described below.

The image capturing apparatus 1 (or 1A) includes a camera block 2, a camera digital signal processor (DSP) 3, a hard disk 4, a media interface 5, a control block 6, an operation block 7, a display unit controller 8, a display unit 9, and an external interface 10. A recording medium 100 is removably mounted on the image capturing apparatus 1 (or 1A). The display unit 9 includes, for example, a liquid crystal display (LCD).

Examples of the recording medium 100 include a memory card incorporating a semiconductor memory, an optical recording medium (such as a recordable digital versatile disc (DVD) or a recordable compact disc (CD)), and a magnetic disk.

The camera block 2 includes an optical unit 11, an image sensor 12 (such as a charge-coupled device (CCD)), a pre-processing unit 13, an optical unit driver 14, an image sensor driver 15, and a timing generation circuit 16.

The optical unit 11 includes a lens, a zoom mechanism, a focus mechanism, a shutter mechanism, and an iris mechanism.

The control block 6 is a microcomputer including a central processing unit (CPU) 17, a random access memory (RAM) 18, a flash read only memory (flash ROM) 19, and a clock circuit 20, all of which are connected to a system bus 21. The control block 6 controls each of the components of the image capturing apparatus 1 (or 1A).

The RAM 18 is used as a work area. For example, the RAM 18 temporarily stores the intermediate result of processing. The flash ROM 19 stores a variety of programs running on the CPU 17 and data required for the processing of the programs.

The clock circuit 20 provides the current date and time, the current day of week, the current time, and the date and time of image capture.

When capturing an image, the optical unit driver 14 generates a driving signal for driving the optical unit 11 under the control of the control block 6. The optical unit driver 14 then delivers the generated driving signal to the optical unit 11 so as to operate the optical unit 11. The optical unit 11 controls the zoom mechanism, the focus mechanism, the shutter mechanism, and the iris mechanism in response to the driving signal delivered from the optical unit driver 14 so as to capture the image of a subject. Thereafter, the optical unit 11 outputs the image of a subject to the image sensor 12.

The image sensor 12 photoelectrically converts the image information input from the optical unit 11 and outputs the converted image information. The image sensor 12 operates in response to a driving signal delivered from the image sensor driver 15. The image sensor 12 receives the image of a subject output from the optical unit 11 and outputs the received image of a subject (the image information) to the preprocessing unit 13 as an electric signal on the basis of a timing signal delivered from the timing generation circuit 16.

The timing generation circuit 16 generates a timing signal that provides a predetermined timing under the control of the control block 6. The image sensor driver 15 generates the driving signal delivered to the image sensor 12 on the basis of the timing signal output from the timing generation circuit 16.

The preprocessing unit 13 carries out CDS (correlated double sampling) processing on the delivered electric signal of the image information so as to maintain a sufficient S/N ratio. The preprocessing unit 13 then carries out AGC (automatic gain control) processing on the electric signal so as to control the gain. Subsequently, the preprocessing unit 13 carries out A/D (analog to digital) conversion so as to generate image data, which is a digital signal.

The image data converted to a digital signal is delivered from the preprocessing unit 13 to the camera DSP 3. The camera DSP 3 carries out camera signal processing (such as auto focus (AF) processing, auto exposure (AE) processing, and auto white balance (AWB) processing) on the delivered image data. Thus, the image data is subjected to such adjustments. Thereafter, the image data is encoded according to a predetermined encoding method. The encoded image data is delivered to the recording medium 100 via the system bus 21 and the media interface 5. Finally, the image data is recorded on the recording medium 100 in the form of a file.

The image data recorded on the recording medium 100 is read out via the media interface 5 as needed in response to an operation signal input from a user via the operation block 7. The operation block 7 includes a variety of operation buttons, which are described below. The readout image data is delivered to the camera DSP 3.

The camera DSP 3 decodes (decompresses) the encoded image data read out of the recording medium 100 and delivered via the media interface 5. The camera DSP 3 then delivers the decoded image data to the display unit controller 8 via the system bus 21.

The display unit controller 8 generates an image signal from the delivered image data and delivers the image signal to the display unit 9. Upon receiving the image signal, the display unit 9 displays an image in accordance with the image data recorded on the recording medium 100 on a display screen of the display unit 9.

The external interface 10 is connected to, for example, an external apparatus (e.g., a personal computer). After a personal computer is connected to the external interface 10, image data acquired from the personal computer can be recorded on the recording medium 100 or image data recorded on the recording medium 100 can be output to the personal computer.

In addition, when a communication module is connected to the external interface 10, a variety of image data and other information can be retrieved from a network (such as the Internet) and can be stored on the recording medium 100, for example. Also, data recorded on the recording medium 100 can be transmitted to the other end of communication.

The external interface 10 can be a wired interface, such as an Institute of Electrical and Electronics Engineers (IEEE) 1394 interface or a Universal Serial Bus (USB) interface. Alternatively, the external interface 10 can be a wireless interface using light or radio waves.

As noted above, the image capturing apparatus 1 (or 1A) can capture the image of a subject and record the data of the image on the recording medium 100. In addition, the image capturing apparatus 1 (or 1A) can read out the image data recorded on the recording medium 100 to play back the image. Furthermore, the image capturing apparatus 1 (or 1A) can receive image data from an external personal computer or a network and record the image data on the recording medium 100. In addition, the image capturing apparatus 1 (or 1A) can read out the image data recorded on the recording medium 100 to play back the image.

An exemplary structure of the image capturing apparatus 1 (or 1A) is described next.

In the following description, all directions (upward, downward, right, and left directions) are defined from the viewpoint of a photographer. The direction towards a subject is defined as a forward direction whereas the direction toward the photographer is defined as a backward direction.

First, an exemplary structure of the image capturing apparatus 1 according to the first exemplary embodiment is described with reference to FIGS. 2 through 12.

As shown in FIGS. 2 to 5, the image capturing apparatus 1 has a flat, horizontally long, substantially rectangular-parallelepiped shape. The image capturing apparatus 1 includes a camera body 22 and a display unit 23 that is slidable with respect to the camera body 22 in, for example, the right-left direction. Note that the display unit 23 corresponds to the above-described display unit 9.

Figure 2:
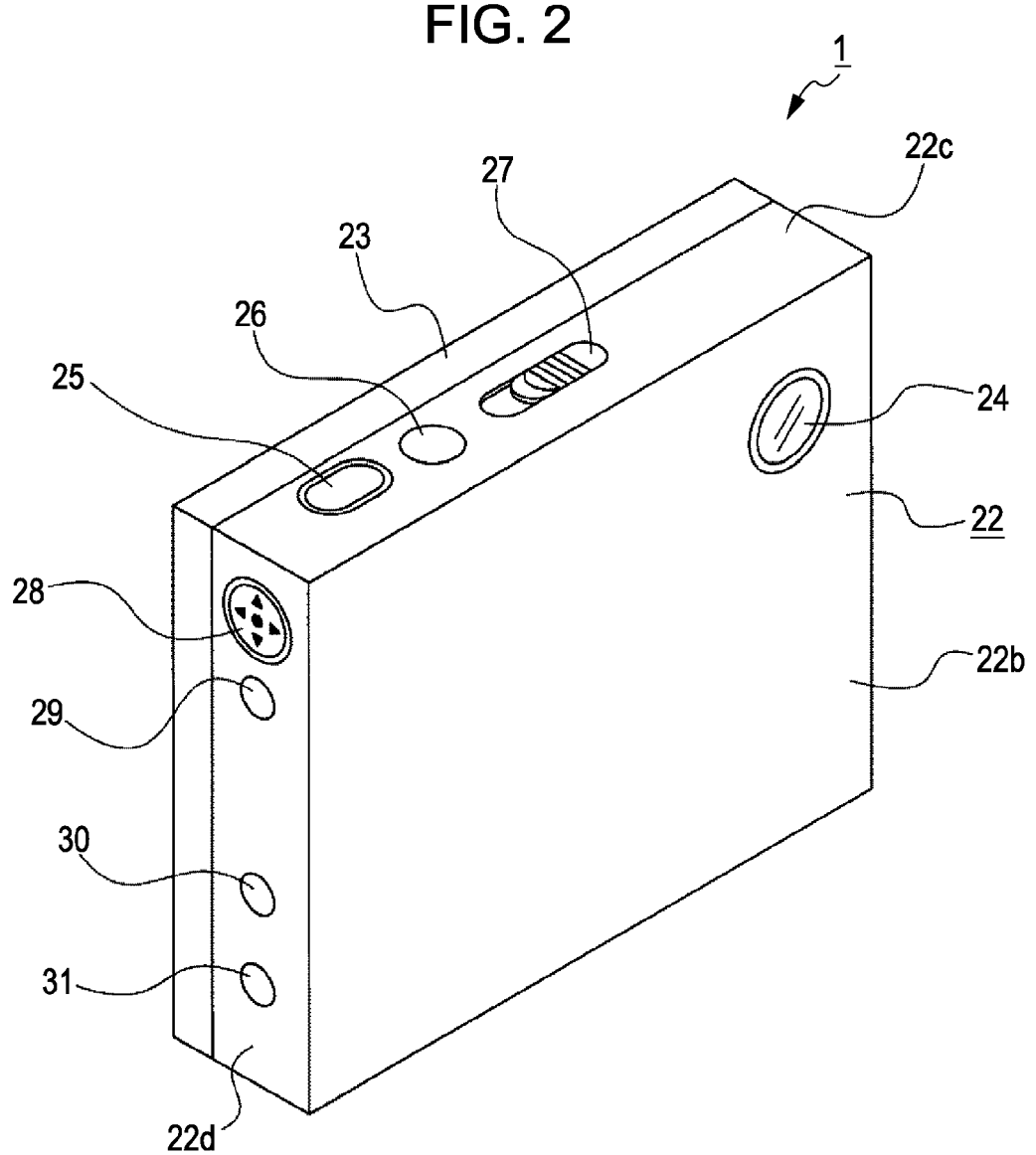
FIG. 2 is a perspective view of the image capturing apparatus in a closed configuration according to the first or second exemplary embodiment of the present invention.
Figure 3:
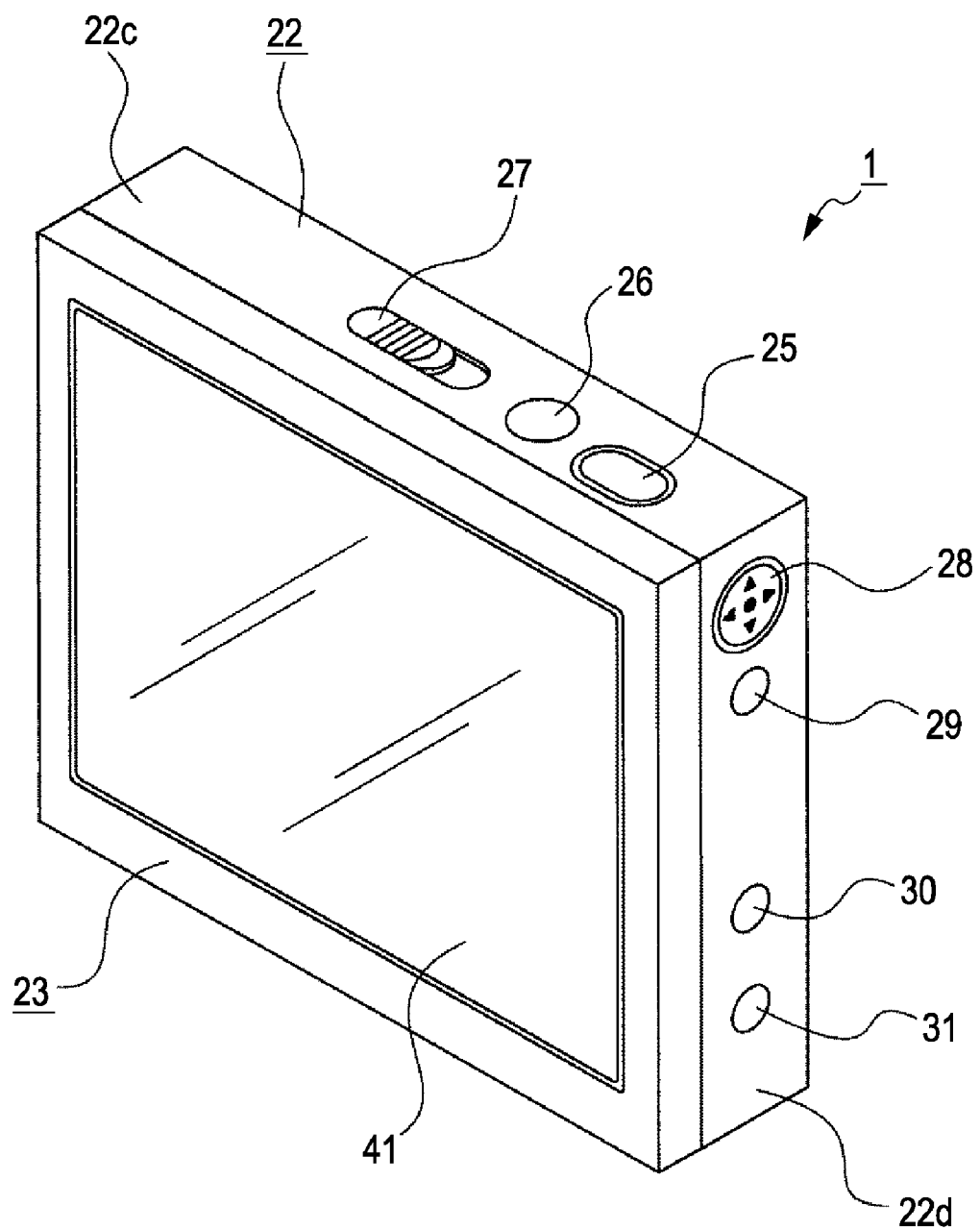
FIG. 3 is a perspective view of the image capturing apparatus in a closed configuration, viewed in a direction different from that of FIG. 2.

The size and the shape of the camera body 22 are substantially the same as those of the display unit 23. As shown in FIGS. 2 and 3, before the display unit 23 slides along the camera body 22, the entire back surface 22a of the camera body 22 faces the entire front surface 23a of the display unit 23. This configuration is referred to as a "closed configuration" of the image capturing apparatus 1.

An image-capturing lens 24 for capturing the image of a subject is disposed, for example, on the upper left corner of a front surface 22b of the camera body 22.

A shutter button 25, a power switch button 26, and a slide knob 27 are disposed on an upper surface 22c of the camera body 22.

The shutter button 25 is depressed for taking a picture. The power switch button 26 is depressed for powering on or off. The slide knob 27 is used for sliding the display unit 23 with respect to the camera body 22.

A four-way arrow pad 28, a back button 29, an auxiliary menu button 30, and a menu button 31 are disposed on a right side surface 22d of the camera body 22 in this order from the top.

By operating the up, down, right, or left arrow key on the four-way arrow pad 28, a thumbnail on a display screen (described below) of the display unit 23, for example, can be selected. Subsequently, by depressing the center key of the four-way arrow pad 28, the selected thumbnail, for example, can be enlarged on the screen. The back button 29 is used for canceling the selection of a display item, and the previous display item is selected again. The menu button 31 is used for selecting a certain menu. The auxiliary menu button 30 is used for selecting one of sub menus in the lower layer of the selected menu.

These four-way arrow pad 28, the back button 29, auxiliary menu button 30, and menu button 31 are frequently used in a playback mode for playing back a captured image.

Figure 5:
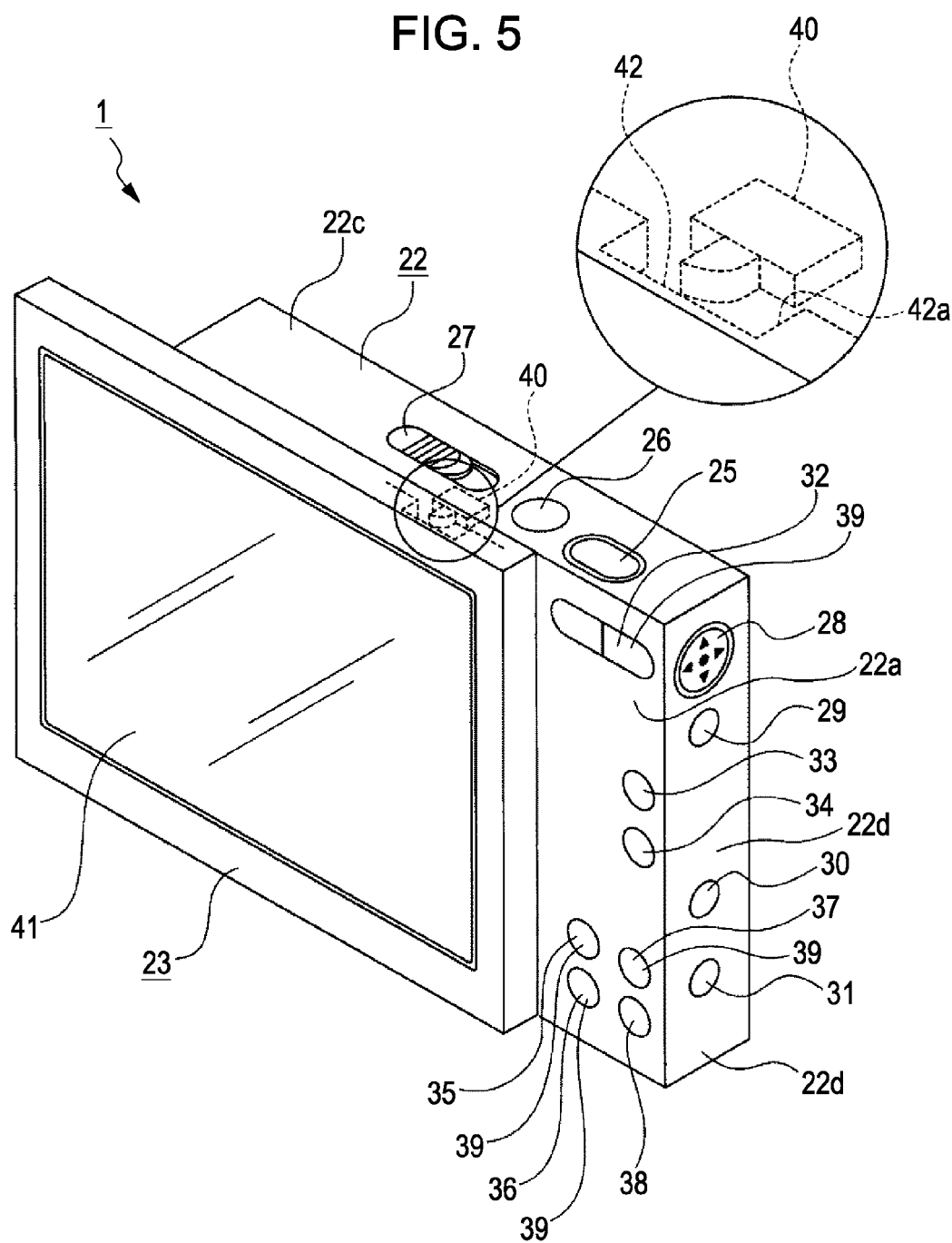
FIG. 5 is a perspective view of the image capturing apparatus in an open configuration, viewed in a direction different from that of FIG. 4.

As shown in FIG. 5, a zoom key 32, a playback button 33, a mode switch button 34, a timer button 35, a flash button 36, a macro mode button 37, and a delete button 38 are disposed on the back surface 22a of the camera body 22 in the vicinity of the right side of the back surface 22a.

The zoom key 32 is used for changing the angle of view of the image. The playback button 33 is used for playing back a captured image. The mode switch button 34 is used for, for example, switching between modes (such as a playback mode, a still image capture mode, and a video capture mode). The timer button 35 is used for activating a self timer. The flash button 36 is used for triggering emittance of light during image capture. The macro mode button 37 is used for taking a macrophotograph (a closeup picture). The delete button 38 is used for deleting a captured image.

These zoom key 32, timer button 35, flash button 36, and macro mode button 37 are correctively referred to as "image capture buttons 39". The image capture buttons 39 are mainly used in an image capture mode for capturing the image of a subject.

The image capture buttons 39 are not limited to the above-described buttons. The image capture buttons 39 can further include a backlight adjustment button for automatic backlight adjustment, an image-blur adjustment button for correcting image blur, a red-eye preventing button for preventing the red-eye effect, and a white balance button for auto color balance, all of which are used during image capture.

As shown in FIG. 5, an open/close detection switch is disposed, for example, in the upper portion of the interior of the camera body 22.

As shown in FIGS. 3 and 5, a display screen 41 is provided on a back surface 23b of the display unit 23. The display screen 41 occupies the entirety of the back surface 23b except for the peripheral portion of the back surface 23b.

As shown in FIG. 5, an operation notch 42 is formed in the upper portion of the interior of the display unit 23. One peripheral edge of the operation notch 42 serves as an operation edge portion 42a. The operation notch 42 is located so as to correspond to the open/close detection switch 40 disposed in the interior of the camera body 22.

When the display unit 23 slides with respect to the camera body 22 in a closed configuration in which the entire back surface 22a of the camera body 22 faces the entire front surface 23a of the display unit 23, the open/close detection switch 40 is operated by the operation edge portion 42a. When the open/close detection switch 40 is operated, the image capturing apparatus 1 enters the image capture mode in which the image of a subject can be captured. When the operation to the open/close detection switch 40 is released, the image capturing apparatus 1 enters a playback mode in which a captured image is played back and is displayed on the display screen 41.

Figure 6:
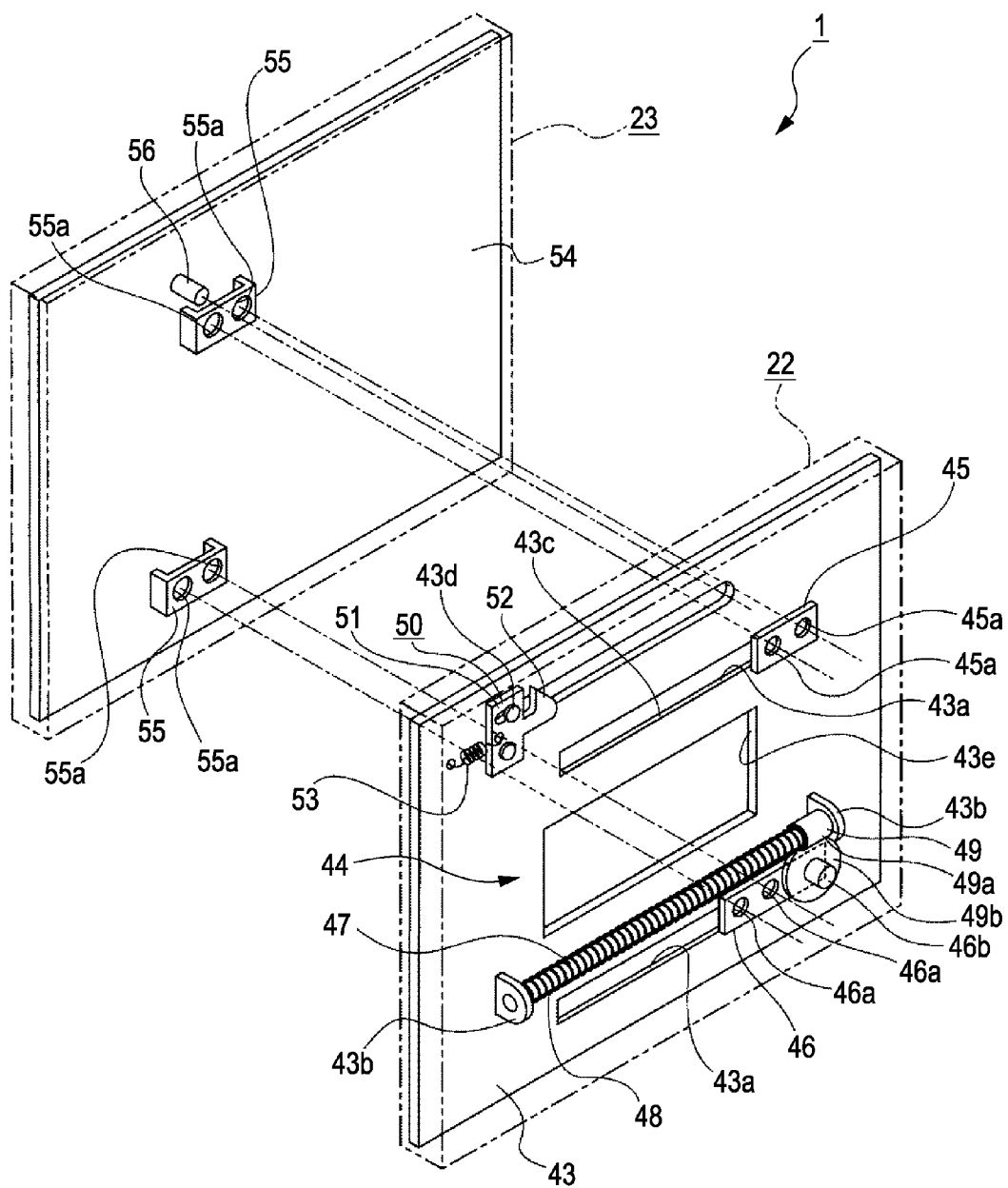
FIG. 6 is an exploded perspective view of the internal structure of a camera body.
Figure 7:
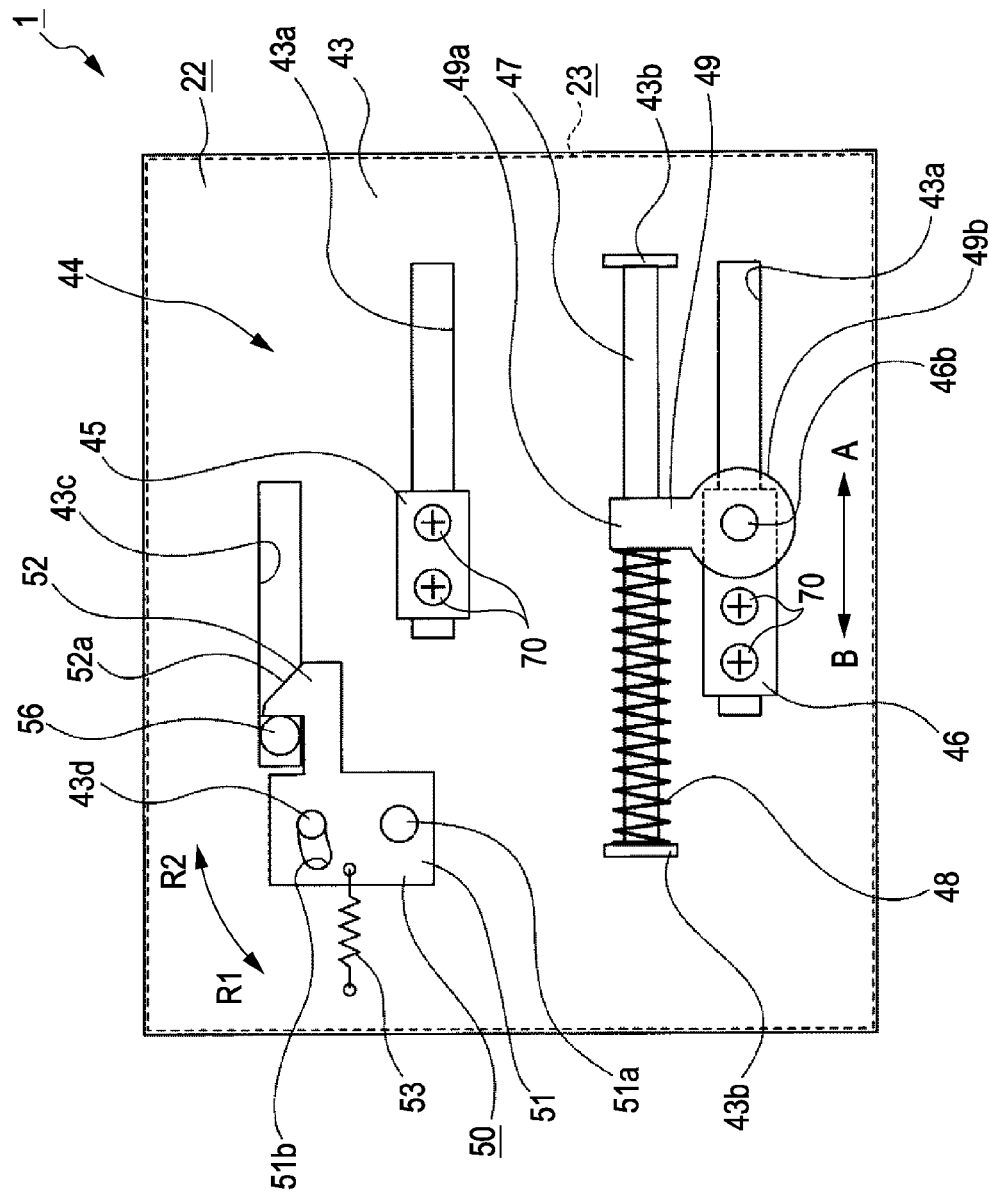
FIG. 7 is an enlarged front view of a display unit of the image capturing apparatus in the closed configuration during a sliding operation.

A chassis 43 is disposed in the camera body 22. As shown in FIGS. 6 and 7, a sliding mechanism 44 is provided on the chassis 43. When viewed from the front of the image capturing apparatus 1, the display unit 23 is located on the back of the camera body 22, and therefore, the display unit 23 is hidden by the camera body 22. Thus, the outer periphery of the camera body 22 overlaps the outer periphery of the display unit 23. However, in FIG. 7, for ease of understanding of the positional relationship between the camera body 22 and the display unit 23, the outer periphery of the display unit 23 is shown by a dotted line (this is the same in FIGS. 9 and 12).

The sliding mechanism 44 includes slide plates 45 and 46 and a spring support shaft 47, and a spring member 48.

Two vertically spaced support holes 43a, each extending horizontally, are formed in the chassis 43.

The slide plate 45 is movably supported by the upper support hole 43a. The slide plate 45 includes two connection holes 45a.

The slide plate 46 is movably supported by the lower support hole 43a. The slide plate 46 includes two connection holes 46a and a connection pin 46b on the left side of the slide plate 46. The connection pin 46b extends toward the front side.

Two horizontally separated support protrusions 43b are provided on the chassis 43 at left and right positions in the vicinity of the lower edge of the chassis 43. The support protrusions 43b extend toward the front side. The spring support shaft 47 is disposed between the two support protrusions 43b. The spring support shaft 47 supports the spring member 48, which is a compression coil spring.

A connection member 49 is slidably supported by the spring support shaft 47 at an end of the spring member 48. The connection member 49 includes a cylindrical supported portion 49a and a ring-shaped connection portion 49b formed in an integrated fashion. The cylindrical supported portion 49a of the connection member 49 is supported by the spring support shaft 47. The connection pin 46b of the slide plate 46 is disposed through the center hole of the ring-shaped connection portion 49b so that the connection member 49 is connected to the slide plate 46.

When the connection member 49 is supported by the spring support shaft 47, an end surface of the spring member 48 is in contact with an end surface of the supported portion 49a in the axis direction of the spring support shaft 47. The connection member 49 is pressed by the spring member 48 to the left (in a direction indicated by arrow A in FIG. 7). Hereinafter, the A direction is referred to as a "first direction".

A horizontally extending pin guide hole 43c is formed in the chassis 43 at a position in the vicinity of the upper edge of the chassis 43. The chassis 43 supports a lock lever 50 on the right of the pin guide hole 43c. The lock lever 50 includes a base 51 and a lock portion 52 extending sideway from the base 51. For example, a pivot point 51a is provided to the lower end of the base 51 and the lock lever 50 is pivotable about the pivot point 51a relative to the chassis 43.

A supported hole 51b having a gently curved arc shape is formed on the upper end of the base 51. A support pin 43d provided on the chassis 43 is disposed in the supported hole 51b.

The lock portion 52 has a substantially inverted L shape. The lock portion 52 has a slanted edge 52a that extends closer to the base 51 towards the top end of the lock portion 52.

The lock lever 50 is disposed so that the base 51 is located at the right of the pin guide hole 43c and the lock portion 52 overlaps the right end portion of the pin guide hole 43c.

The base 51 of the lock lever 50 is connected to the chassis 43 with a biasing spring 53, which is a tension coil spring. The biasing spring 53 biases the lock lever 50 in an R1 direction shown in FIG. 7 with the pivot point 51a being the fulcrum.

The lock lever 50 is connected to the slide knob 27 disposed on the upper surface 22c of the camera body 22 by means of a link mechanism (not shown). When the slide knob 27 is operated to slide, the lock lever 50 rotates in an R2 direction shown in FIG. 7 with the pivot point 51*a* being the fulcrum. When the operation of the slide knob 27 is released, the slide knob 27 returns to the original position, and therefore, the lock lever 50 rotates in the R1 direction due to the biasing force of the biasing spring 53. Thus, the lock lever 50 also returns to the original position.

As shown in FIG. 6, a through-hole 43*e* is formed in the chassis 43 between the two support holes 43*a*. A flexible printed circuit board (not shown) that connects a control circuit board (not shown) disposed inside the camera body 22 to a circuit board (not shown) disposed inside the display unit 23 is disposed in the through-hole 43*e*.

A base plate 54 is disposed in the display unit 23. Two vertically spaced connection protrusions 55, each extending to the front side, are provided on the base plate 54. Two mounting holes 55*a* are formed in each of the connection protrusions 55.

A lock pin 56, which extends to the front side, is provided on the base plate 54 at a position in the vicinity of the upper edge of the base plate 54.

As shown in FIG. 7, two mounting screws 70 that pass through the connection holes 45*a* of the slide plate 45 of the camera body 22 are screwed to the mounting holes 55*a* of one of the connection protrusions 55. Also, two mounting screws 70 that pass through the connection holes 46*a* of the slide plate 46 of the camera body 22 are screwed to the mounting holes 55*a* of the other of the connection protrusions 55. When the camera body 22 is overlapped with the display unit 23, the lock pin 56 of the display unit 23 is disposed in the pin guide hole 43*c* of the camera body 22.

When the camera body 22 is overlapped with the display unit 23, the display unit 23 is pressed by the spring member 48 via the slide plate 46 and the connection member 49 in the direction A shown in FIG. 7 with respect to the camera body 22.

In the closed configuration in which the entire back surface 22*a* of the camera body 22 faces the entire front surface 23*a* of the display unit 23, the lock pin 56 of the display unit 23 is engaged with the lock portion 52 of the lock lever 50 of the camera body 22. Thus, the display unit is locked to the camera body 22 (see FIG. 7). At that time, the connection member 49 is placed in the middle of the spring support shaft 47.

Figure 8:
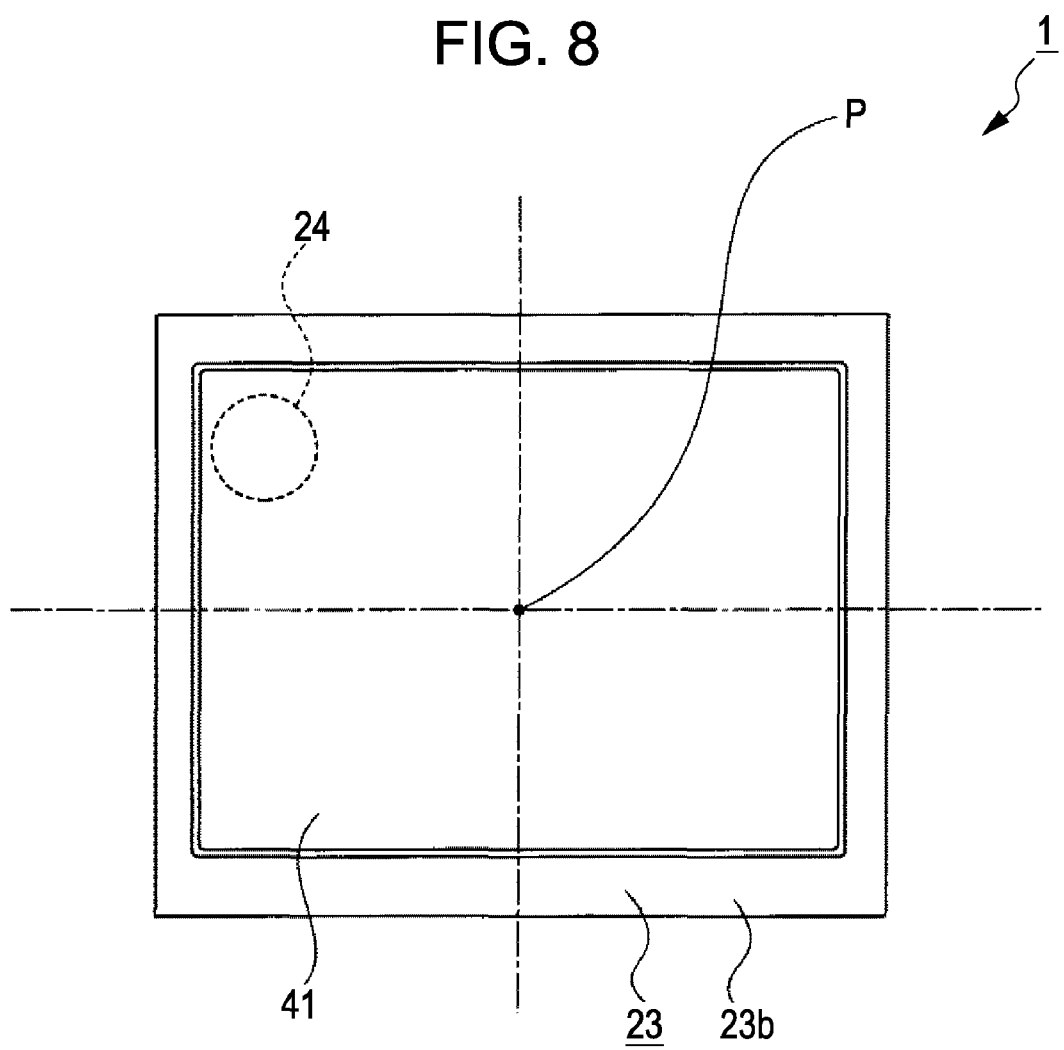
FIG. 8 is a rear view of the image capturing apparatus illustrating the positional relationship between an image-capturing lens and a display screen in a closed configuration during a sliding operation.
Figure 9:
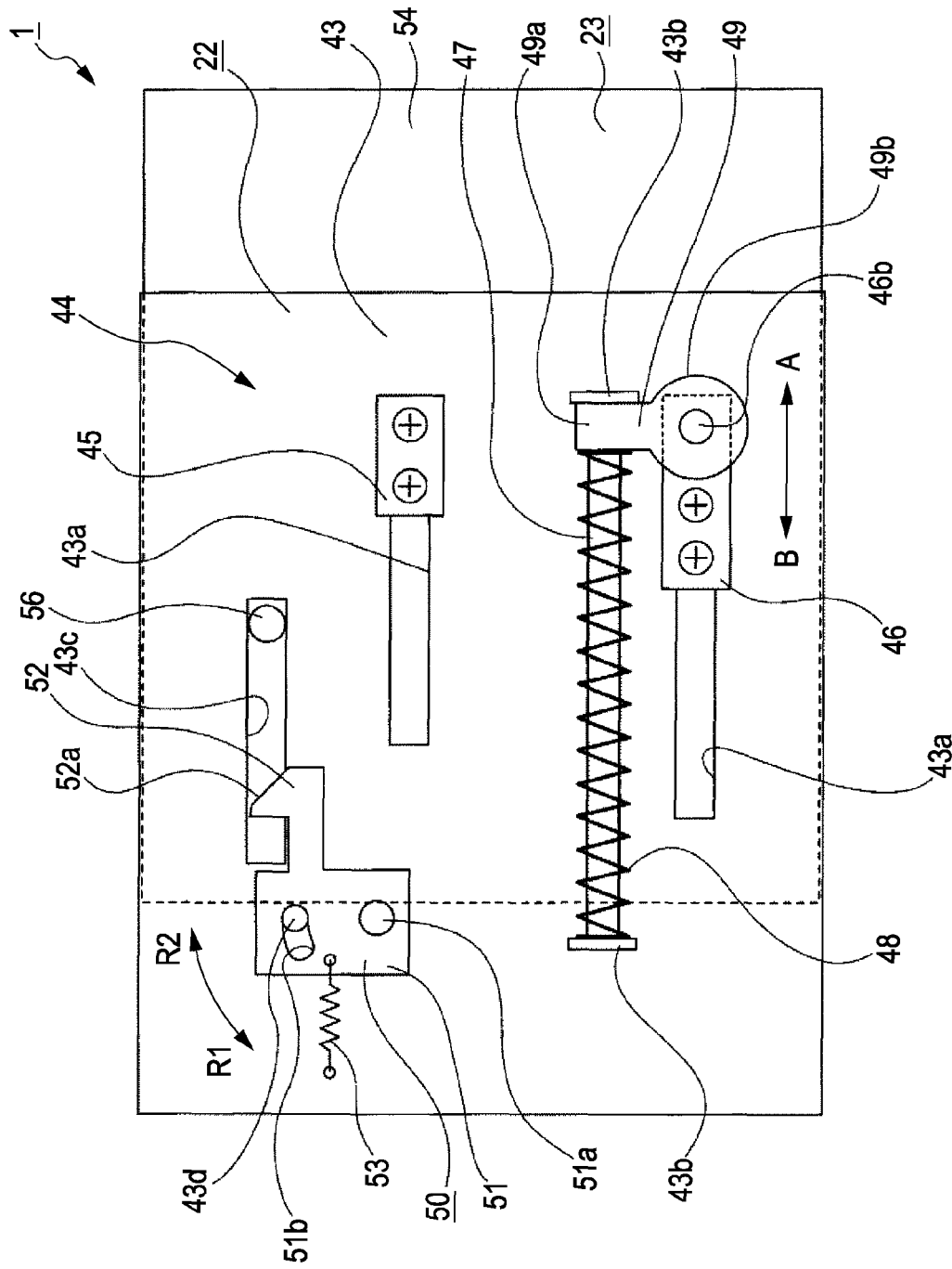
FIG. 9 is an enlarged front view of the display unit of the image capturing apparatus in an open configuration during a sliding operation.

As shown in FIG. 8, when the image capturing apparatus 1 is in the closed configuration and is viewed in the forward-backward direction, the image-capturing lens 24 is located at a position separated from a center point P of the display screen 41.

In the closed configuration, as noted above, when the slide knob 27 is operated, the lock lever 50 rotates in the R2 direction. Accordingly, the engagement of the lock lever 50 with the lock pin 56 is released. The connection member 49 is moved in the direction A shown in FIG. 7 due to the biasing force of the spring member 48. As the connection member 49 moves, the display unit 23 slides with respect to the camera body 22 (see FIG. 8).

Figure 4:
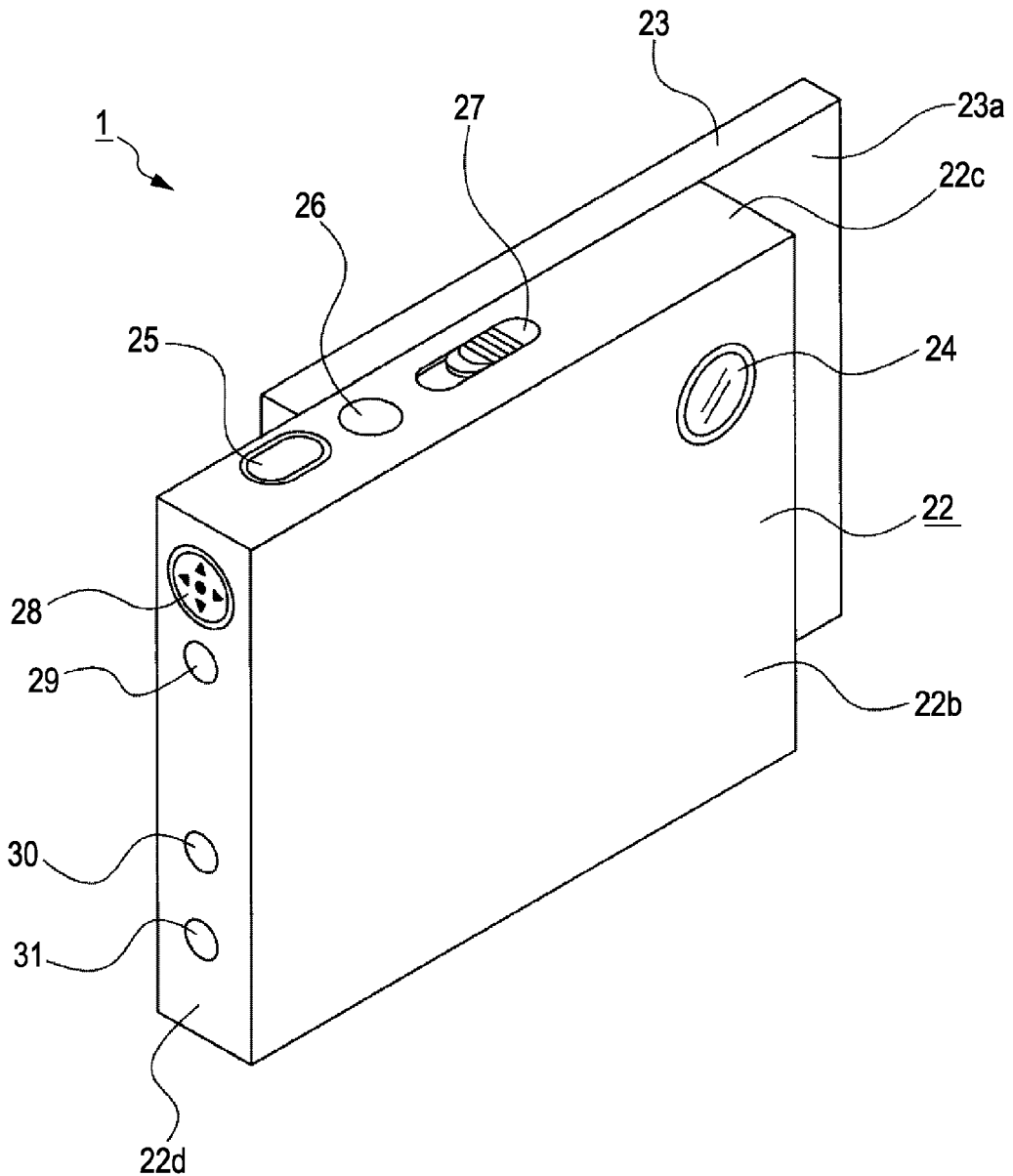
FIG. 4 is a perspective view of the image capturing apparatus in an open configuration.

The movement of the connection member 49 in the direction A stops when the supported portion 49*a* of the connection member 49 is in contact with one of the support protrusions 43*b*. When the movement of the connection member 49 stops, the slide of the display unit 23 in the direction A also stops. At that time, as shown in FIGS. 4 and 5, the image capturing apparatus 1 moves to an open configuration in which the display unit 23 is partially open with respect to the camera body 22. In the open configuration, as noted above, the image capture buttons 39 disposed on the back surface 22*a* of the camera body 22 are exposed.

In the open configuration, since the supported portion 49*a* of the connection member 49 is pressed against one of the support protrusions 43*b*, this open configuration is maintained.

As noted above, when the display unit 23 slides in the direction A with respect to the camera body 22, the open/close detection switch 40 is operated by the operation edge portion 42*a* of the operation notch 42, and therefore, the image capturing apparatus 1 enters the image capture mode. If the image capturing apparatus 1 is not powered on at that time, the image capturing apparatus 1 is powered on at the same time.

Thus, each time the image capturing apparatus 1 enters the open configuration, the image capturing apparatus 1 is powered on. Accordingly, a user can easily recognize that the image capturing apparatus 1 is powered on on the basis of the mode or the shape of the image capturing apparatus 1, thereby increasing the ease of use of the image capturing apparatus 1.

In the open configuration of the image capturing apparatus 1, the user can take a picture of a subject by operating the image capture buttons 39 and the shutter button 25 while holding the left end portion of the display unit 23 extending sideway from the camera body 22 and the right end portion of the camera body 22 extending to the right from the display unit 23. In addition, since all the buttons including the image capture buttons 39 provided to the image capturing apparatus 1 are exposed in the open configuration, the user can operate each of the buttons.

Furthermore, in the open configuration, the user can switch between the modes, such as a playback mode, a still image capture mode, and a video capture mode, by using the mode switch button 34 or the menu button 31. The user can manually select any mode and carry out a desired operation.

Figure 10:
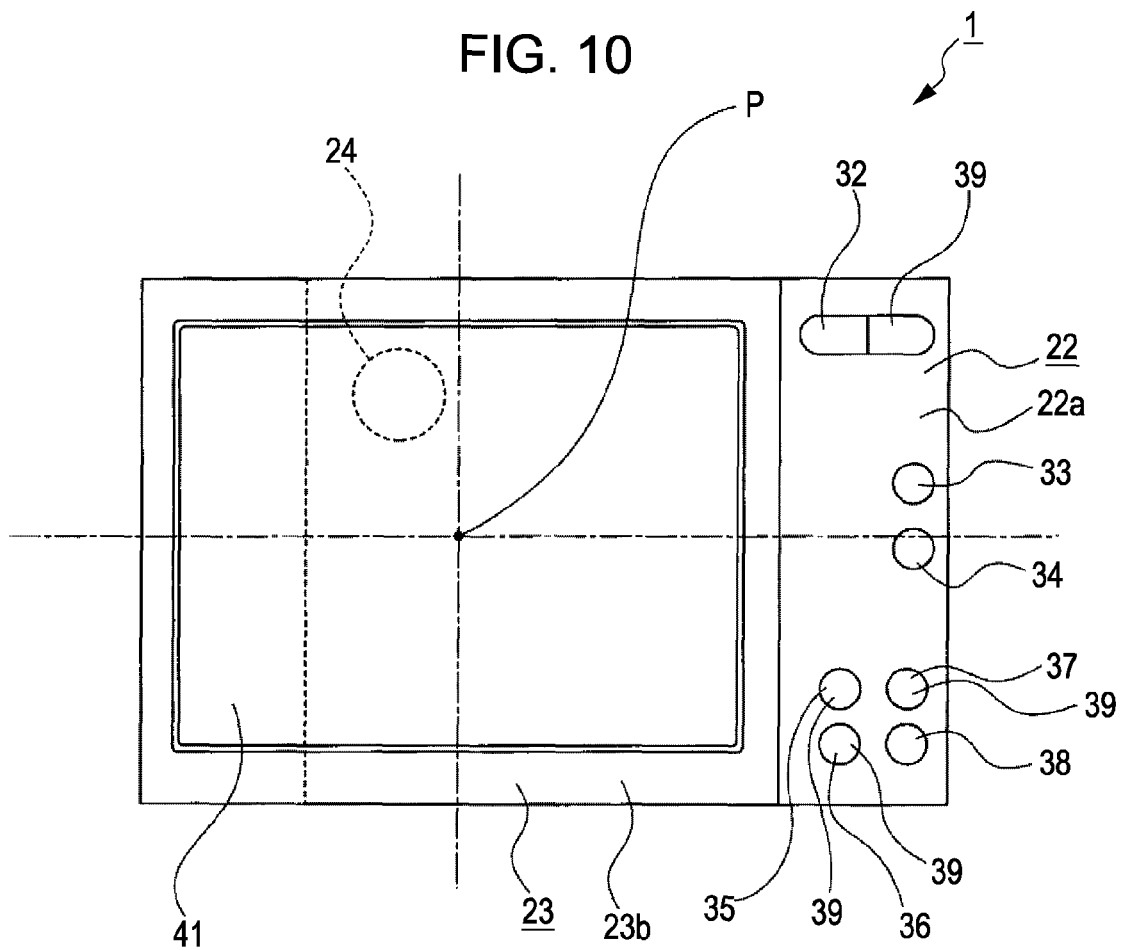
FIG. 10 is a rear view of the image capturing apparatus illustrating the positional relationship between an image-capturing lens and a display screen in an open configuration during a sliding operation.

As noted above, in the closed configuration of the image capturing apparatus 1, the image-capturing lens 24 is located at a position spaced from the center point P of the display screen 41 when viewed in the forward-backward direction as shown in FIG. 8. However, as shown in FIG. 10, in the open configuration, the display unit 23 is slid with respect to the camera body 22 so that the image-capturing lens 24 moves close to the center point P of the display screen 41.

Accordingly, during capturing of an image of the subject, the distance between the center point P of the display screen 41 and the location of the image-capturing lens 24 is small. Therefore, an image can be viewed and captured with little parallax.

In addition, according to the image capturing apparatus 1, by changing the position of the image-capturing lens 24 relative to the camera body 22 and the distance by which the display unit 23 is opened with respect to the camera body 22, the center of the image-capturing lens 24 can be made coincidence with the center point P of the display screen 41.

If the center of the image-capturing lens 24 is made coincidence with the center point P of the display screen 41, an image can be captured with no parallax.

Figure 11:
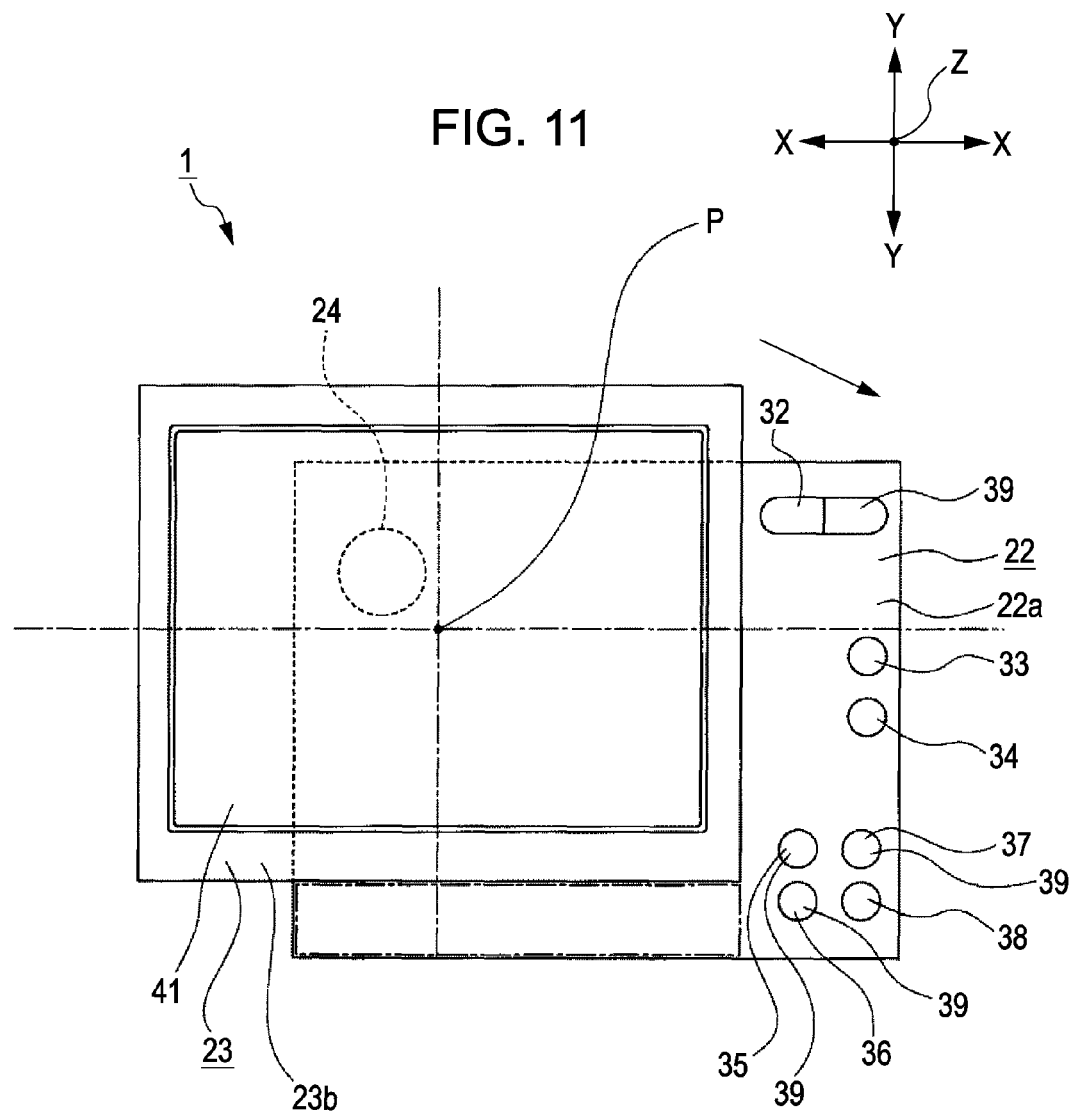
FIG. 11 is a rear view of the image capturing apparatus illustrating the positional relationship between an image-capturing lens and a display screen when the display unit moves in the oblique direction during a sliding operation.

In addition, as shown in FIG. 11, let the direction of the optical axis (the forward-backward direction) be a z-axis direction, the horizontal direction be an X-axis direction, and the vertical direction be a Y-axis direction. Then, the image capturing apparatus 1 may be configured so that the display unit 23 slides in the X-Y plane in a direction oblique to the X-axis direction and the Y-axis direction. When the closed configuration is changed to the open configuration, the display unit 23 can slide so that the center point P of the display screen 41 moves closer to the image-capturing lens 24.

By sliding the display unit 23 in a direction oblique to both the X-axis direction and the Y-axis direction, the freedom of design of the position of the image-capturing lens 24 relative to the camera body 22 and the distance by which the display unit 23 is opened with respect to the camera body 22 can be increased. Accordingly, the image capturing apparatus 1 can easily enable taking of a photograph with reduced parallax.

Furthermore, even when the display unit 23 is slid in a direction oblique to both the X-axis direction and the Y-axis direction, the center of the image-capturing lens 24 can be made coincidence with the center point P of the display screen 41 in the open configuration by changing the position of the image-capturing lens 24 relative to the camera body 22 and the distance by which the display unit 23 is opened with respect to the camera body 22.

By bringing the center of the image-capturing lens into coincidence with the center point P of the display screen 41, an image can be captured without parallax.

In the above-described structure in which the display unit 23 can slide in a direction oblique to the X-axis direction and the Y-axis direction, since one of the right and left end portions of the back surface 22a of the camera body and one of the upper and lower end portions of the back surface 22a are exposed, a variety of buttons including the image capture buttons 39 can be disposed in these exposed end portions. In FIG. 11, an example of a space where the buttons are to be disposed is shown in the lower portion of the back surface 22a of the camera body 22 by a chain line.

Figure 12:
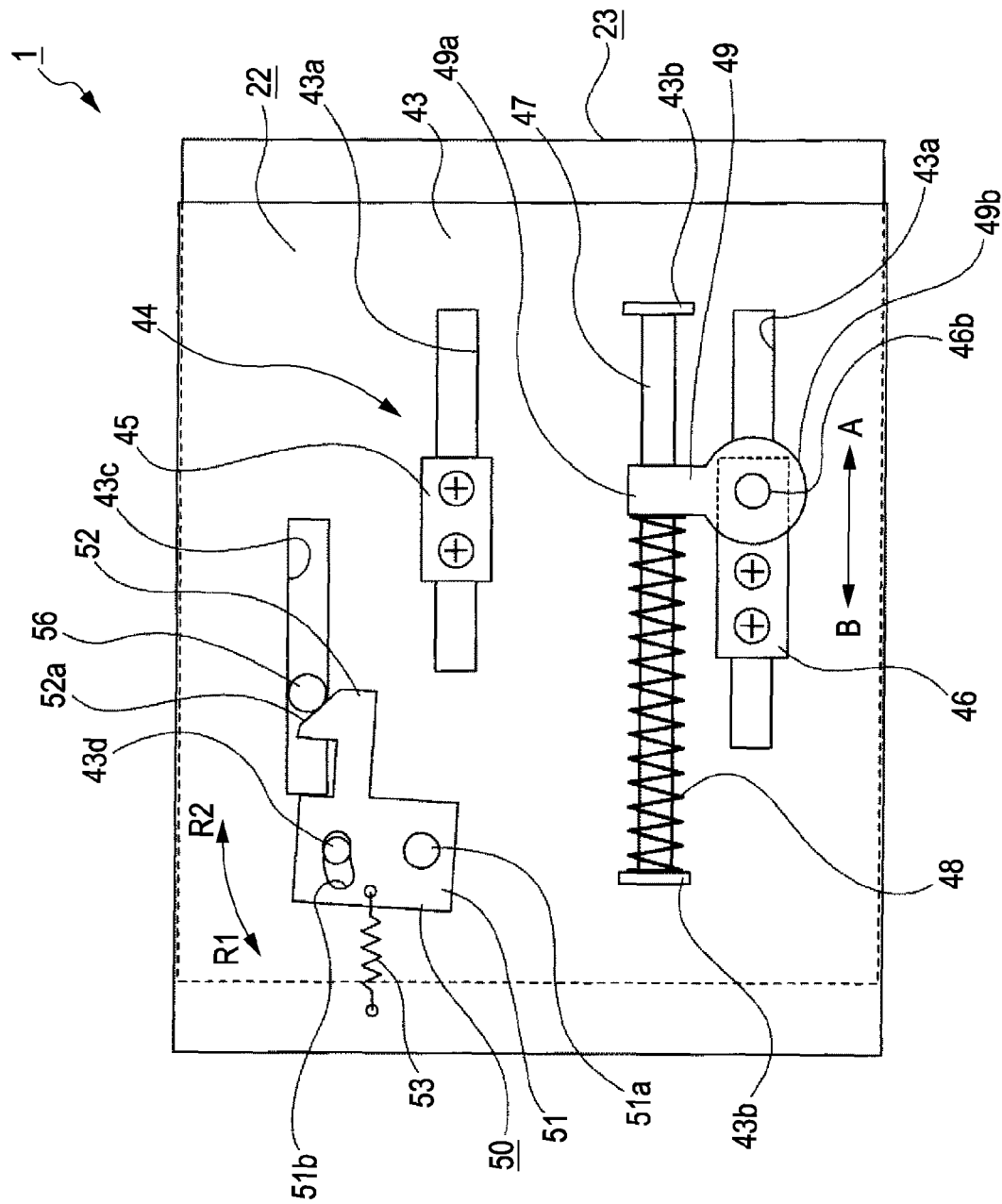
FIG. 12 is an enlarged front view of the image capturing apparatus while the image capturing apparatus is moving from the closed configuration to the open configuration.

In the open configuration, when the user manually presses the display unit 23 in a direction B (a second direction) shown in FIG. 8 to slide the display unit 23 with respect to the camera body 22, the lock pin 56 is in contact with the slanted edge 52a of the lock portion 52 of the lock lever 50 (see FIG. 12). At that time, the connection member 49 moves in the direction B together with the slide plates 45 and 46 while compressing the spring member 48.

When the display unit 23 further slides in the direction B, the lock pin 56 presses against the slanted edge 52a in the direction B. The lock lever 50 pivots in an R2 direction with the pivot point 51a being the fulcrum while resisting the biasing force of the biasing spring 53.

When the lock lever 50 rotates in the R2 direction and the lock pin 56 moves in the direction B, the contact between the lock pin 56 and the lock portion 52 is released, and therefore, the lock lever 50 rotates about the pivot point 51a in the R1 direction and returns to the original position due to the biasing force of the biasing spring 53.

Thus, the image capturing apparatus 1 enters the closed configuration in which the entire back surface 22a of the camera body 22 faces the entire front surface 23a of the display unit 23 (see FIGS. 2 and 3). Since the pressing force against the camera body 22 in the direction B is stopped, the lock pin 56 is engaged with the lock portion 52 of the lock lever 50. Therefore, the display unit 23 is locked in the closed configuration.

When the display unit 23 slides with respect to the camera body 22 in the direction B, the operation of the operation edge portion 42a of the operation notch with respect to the open/close detection switch 40 is released and the playback mode is set.

In the closed configuration of the image capturing apparatus 1, the user can operate the buttons disposed on the right side surface 22d of the camera body 22 to carry out desired control in the playback mode. Additionally, in the closed configuration, the user can switch between the modes, such as a playback mode, a still image capture mode, and a video capture mode, by using the buttons including the menu button 31. The user can manually select any mode and carry out a desired operation.

For example, by switching to a still image capture mode or a video capture mode and depressing the shutter button 25, the user can capture the image of a subject.

Second Exemplary Embodiment

The image capturing apparatus 1A according to a second exemplary embodiment is described next with reference to FIGS. 13 to 16.

In the following description, the components of the image capturing apparatus 1A which correspond to those of the image capturing apparatus 1 according to the first exemplary embodiment have the same reference numerals and detailed descriptions thereof are not repeated. Only the difference between the image capturing apparatus 1A and the image capturing apparatus 1 is described.

The image capturing apparatus 1A has a flat, horizontally long, substantially rectangular-parallelepiped shape. The image capturing apparatus 1A includes a camera body 57 and a slide operation unit 58 that is slidable, for example, in the right-left direction with respect to the camera body 57.

Figure 15:
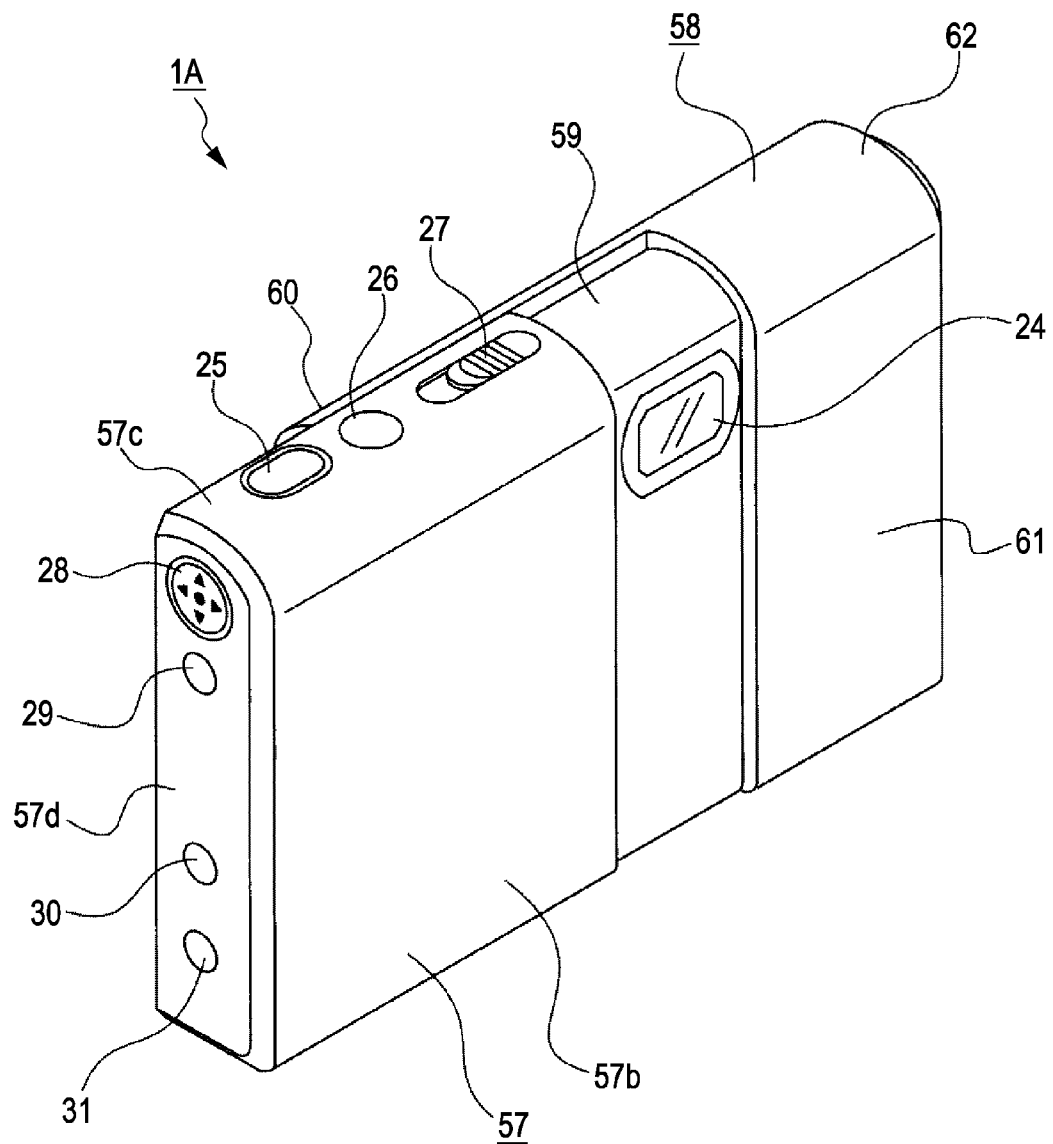
FIG. 15 is a perspective view of the image capturing apparatus in an open configuration according to the second exemplary embodiment of the present invention.

As shown in FIG. 15, an image-capturing lens 24 for capturing the image of a subject is disposed, for example, on the upper left corner of a front surface 57b of the camera body 57.

The camera body 57 has a flat and a substantially rectangular-parallelepiped shape. The left end portion of the camera body 57 is slightly stepped backwardly and downwardly to form a recess 59. The image-capturing lens 24 is disposed in the recess 59.

A shutter button 25, a power switch button 26, and a slide knob 27 are disposed on an upper surface 57c of the camera body 57.

A four-way arrow pad 28, a back button 29, an auxiliary menu button 30, and a menu button 31 are disposed on a right side surface 57d of the camera body 57 in this order from the top.

A zoom key 32, a playback button 33, a mode switch button 34, a timer button 35, a flash button 36, a macro mode button 37, and a delete button 38 are disposed on the back surface 57a of the camera body 57 in the vicinity of the right side of the back surface 57a.

These zoom key 32, timer button 35, flash button 36, and macro mode button 37 are correctively referred to as "image capture buttons 39". The image capture buttons 39 are mainly used in an image capture mode for capturing the image of a subject. However, the image capture buttons 39 are not limited to the above-described buttons.

An open/close detection switch 40 is disposed, for example, in the upper portion of the interior of the camera body 57.

The slide operation unit 58 includes a display unit (corresponding to the above-described display unit 9), a lens cover 61, and a connection plate 62 formed in an integrated fashion.

Each of the camera body 57 and the display unit 60 has a flat, substantially rectangular-parallelepiped shape. The size and the shape of the camera body 57 are substantially the same as those of the display unit 60. Before the display unit 60 is slid along the camera body 57, the entire back surface 57a of the camera body 57 faces the entire front surface 60a of the display unit 60. This configuration is referred to as a "closed configuration" of the image capturing apparatus 1A.

A display screen 41 is provided on a back surface 60b of the display unit 60. The display screen 41 occupies the entirety of the back surface 60b except for the peripheral portion of the back surface 23b.

An operation notch 42 is formed in the upper portion of the interior of the display unit 60. One peripheral edge of the operation notch 42 serves as an operation edge portion 42a.

Figure 13:
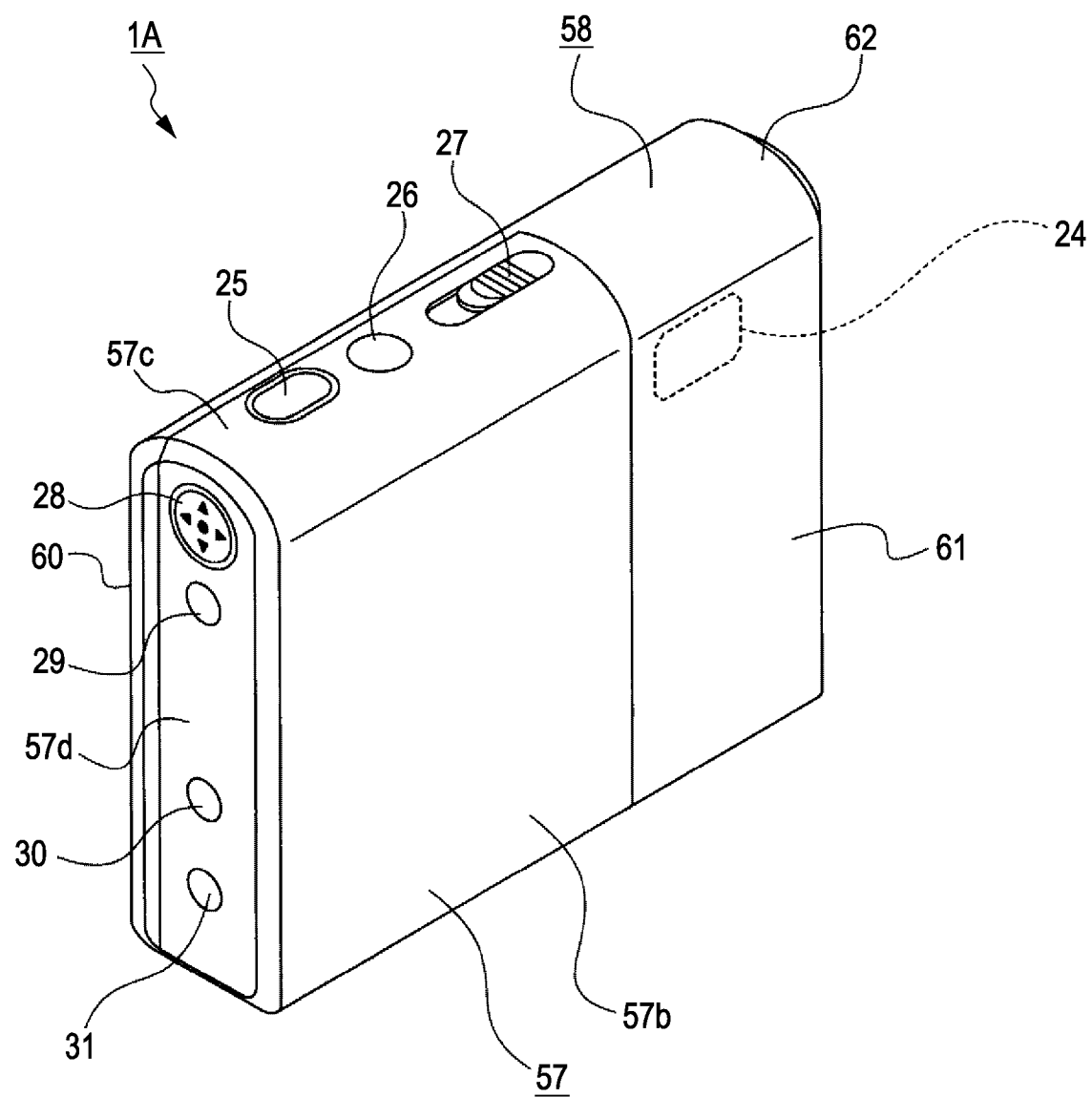
FIG. 13 is a perspective view of an image capturing apparatus in a closed configuration according to the second exemplary embodiment of the present invention.
Figure 14:
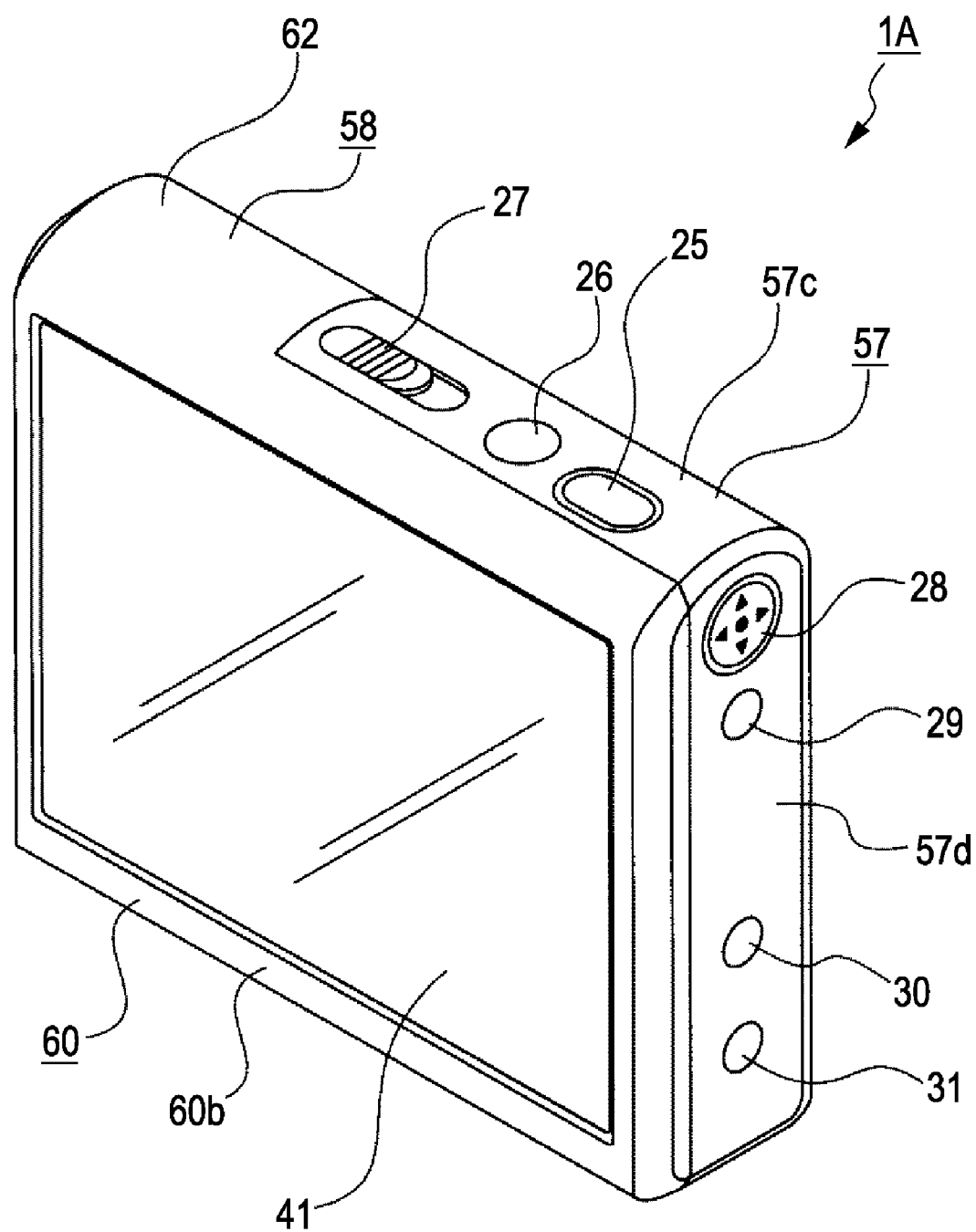
FIG. 14 is a perspective view of the image capturing apparatus in the closed configuration, viewed in a direction different from that of FIG. 13.

The lens cover 61 is formed so as to be a flat rectangular plate. In the closed configuration, the entire surface of the lens cover 61 is in contact with the front surface 57b of the camera body 57. Accordingly, as shown in FIG. 13, in the closed configuration, the image-capturing lens 24 is covered by the lens cover 61.

In the closed configuration, the connection plate 62 is disposed so that the entire surface of the connection plate 62 is in contact with the upper surface 57c of the camera body 57.

When the slide operation unit 58 is slid with respect to the camera body 57 in the closed configuration in which the entire back surface 57a of the camera body 57 faces the entire front surface 60a of the display unit 60, the open/close detection switch 40 is operated by the operation edge portion 42a. Thus, the image capturing apparatus 1A enters an image capture mode. When the slide operation unit 58 slides with respect to the camera body 57 in the opposite direction, the operation to the open/close detection switch 40 is released. Thus, the image capturing apparatus 1A enters a playback mode.

A sliding mechanism 44 is provided in the camera body 57.

Two connection protrusions 55 and a lock pin 56 are provided in the display unit 60.

One of the two connection protrusions 55 of the display unit 60 is attached to a slide plate 45 of the camera body 57. The other of the two connection protrusions 55 is attached to a slide plate 46 of the camera body 57. Thus, the camera body 57 is overlapped with the slide operation unit 58. The lock pin 56 of the display unit 60 is disposed in a pin guide hole 43c of the camera body 57.

Figure 16:
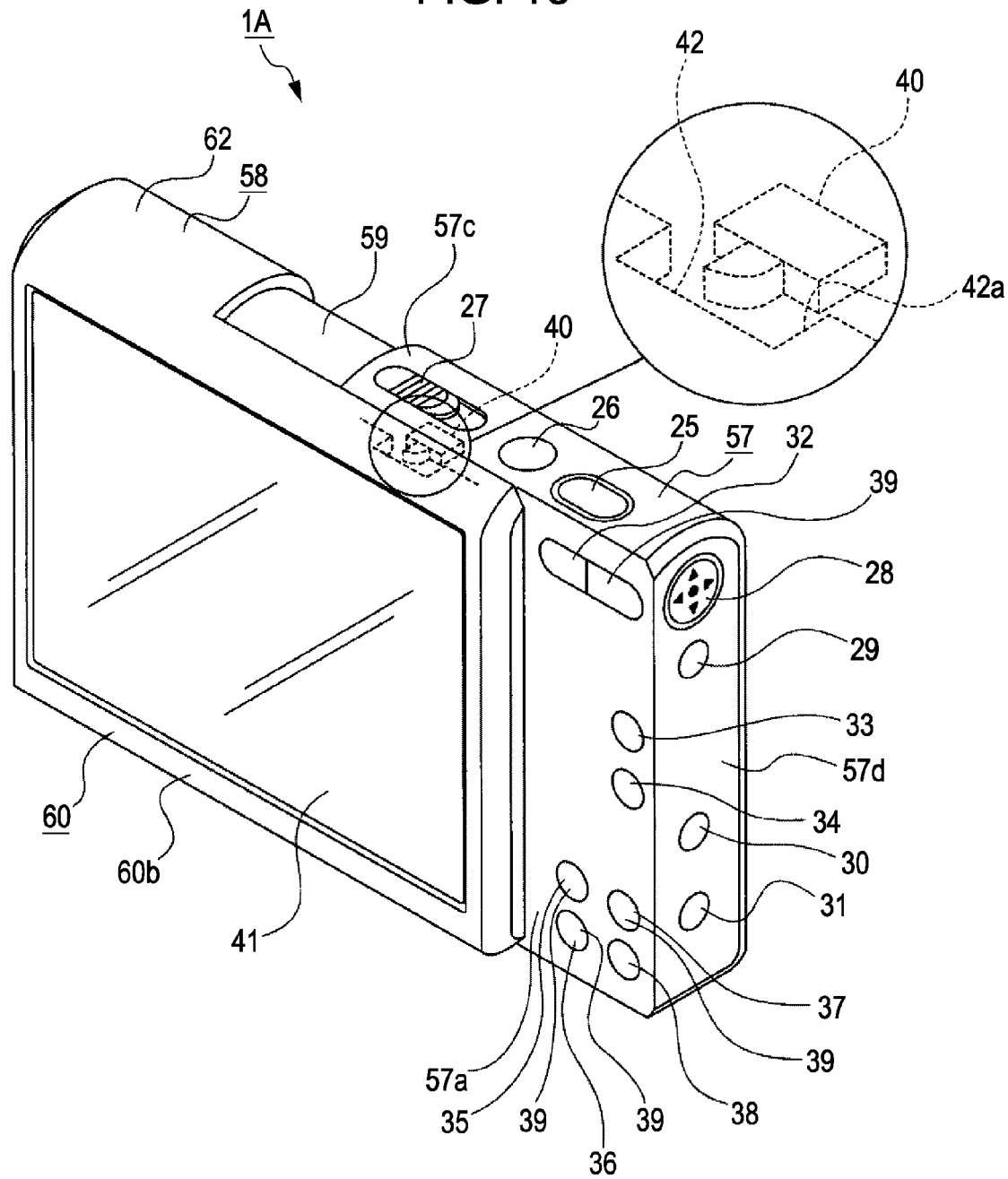
FIG. 16 is a perspective view of the image capturing apparatus in the open configuration, viewed in a direction different from that of FIG. 15.

When the slide knob 27 is operated in the closed configuration, the slide operation unit 58 slides along the camera body 57. Thus, as shown in FIGS. 15 and 16, the image capturing apparatus 1A moves to an open configuration in which the slide operation unit 58 is partially open with respect to the camera body 57. In the open configuration, the image capture buttons 39 disposed on the back surface 57a of the camera body 57 are exposed. At the same time, the closed configuration of the image-capturing lens 24 caused by the lens cover 61 of the slide operation unit 58 is released. Accordingly, the image-capturing lens 24 is exposed.

When the display unit 60 slides with respect to the camera body 57 so that the display unit 60 and the camera body are in the open configuration, the open/close detection switch 40 is operated by the operation edge portion 42a of the operation notch 42, and therefore, the image capturing apparatus 1A enters the image capture mode. If the image capturing apparatus 1A is not powered on at that time, the image capturing apparatus 1A is powered on at the same time.

In the open configuration of the image capturing apparatus 1A, the user can take a picture of a subject by operating the image capture buttons 39 and the shutter button 25 while holding the left end portion of the display unit 60 extending sideway from the camera body 57 and the right end portion of the camera body 57 extending from the display unit 60. In addition, since all the buttons including the image capture buttons 39 provided to the image capturing apparatus 1A are exposed in the open configuration, the user can operate each of the buttons.

In the open configuration, the user can switch between the modes, such as a playback mode, a still image capture mode, and a video capture mode, by using the mode switch button 34 or the menu button 31. The user can manually select any mode and carry out a desired operation.

In the open configuration, when the user manually presses and slides the slide operation unit 58 with respect to the camera body 57 to the right, the image capturing apparatus 1A enters the closed configuration.

When the slide operation unit 58 slides with respect to the camera body 57 to the right, the operation of the operation edge portion 42a of the operation notch with respect to the open/close detection switch 40 is released and the playback mode is set.

In the closed configuration of the image capturing apparatus 1A, the user can operate the buttons disposed on the right side surface 57d of the camera body 57 to carry out desired control in the playback mode. Additionally, in the closed configuration, the user can switch between the modes, such as a playback mode, a still image capture mode, and a video capture mode, by using the buttons including the menu button 31. The user can manually select any mode and carry out a desired operation.

For example, by switching to a still image capture mode or a video capture mode and depressing the shutter button 25, the user can capture the image of a subject.

As noted above, according to the image capturing apparatus 1A, when the slide operation unit 58 is slid so that the image capturing apparatus 1A is in the open configuration, the image-capturing lens 24 is exposed. Therefore, in the closed configuration, the image-capturing lens 24 can be protected.

Moreover, since the lens cover 61 and the display unit 60 that are formed in an integrated fashion slide so as to cover and uncover the image-capturing lens 24, a dedicated lens cover to protect the image-capturing lens 24 is not required. Thus, the number of components can be reduced.

Furthermore, since the image-capturing lens 24 and the image capture buttons 39 are exposed by just one operation, the ease of use of the image capturing apparatus 1A can be improved.

Like the above-described image capturing apparatus 1, when the slide operation unit 58 of the image capturing apparatus 1A slides from the closed configuration to the open configuration, the center point P of the display screen 41 moves closer to the image-capturing lens 24.

Accordingly, during capturing of an image of the subject, the distance between the center point P of the display screen 41 and the image-capturing lens 24 can be small. Thus, an image can be captured with reduced parallax.

Furthermore, like the image capturing apparatus 1, the image capturing apparatus 1A may be configured so that the slide operation unit 58 is slidable in the XY plane in a direction oblique to both the X-axis direction and the Y-axis direction. In addition, the image capturing apparatus 1A may be configured so that the center of the image-capturing lens 24 coincides with the center point P of the display screen 41 in the open configuration.

As noted above, in the image capturing apparatuses 1 and 1A, by sliding the display unit 23 and the display unit 60, the image capture buttons 39 are exposed in the open configuration and are covered by the display unit 23 or the display unit 60 in the closed configuration.

Accordingly, when the playback mode is set in the closed configuration, the unnecessary image capture buttons 39 are not exposed, thus preventing performance of an inadvertent operation of the image capture buttons 39 by the user.

Additionally, in the closed configuration, the image capturing apparatuses 1 and 1A can be used while maintaining a compact shape. Also, the image capturing apparatuses 1 and 1A can be compact even when not used.

Furthermore, according to the image capturing apparatuses 1 and 1A, when the display unit 23 and the display unit 60 slide and the image capture buttons 39 are exposed, the image capture mode is set for capturing an image of the subject. Since the image capture mode is set at the same time as the image capture buttons 39 are exposed, the user can immediately start capturing an image. Thus, the ease of use of the image capturing apparatuses 1 and 1A can be improved.

In contrast, according to the image capturing apparatuses 1 and 1A, when the display unit 23 and the display unit 60 are slid and the image capture buttons 39 are covered, the playback mode is set in order to display the captured image on the display screen 41. Since the playback mode is set at the same time as the image capture buttons 39 are covered, playback of the captured image can be immediately started. Thus, the ease of use of the image capturing apparatuses 1 and 1A can be improved.

Additionally, according to the image capturing apparatuses 1 and 1A, an image can be displayed on the display screen 41 regardless of the open/close operation of the display unit 23 and the display unit 60. Thus, the ease of use of the image capturing apparatuses 1 and 1A can be improved in terms of the use of the display screen 41.

While the above-described embodiments have been described with reference to the image capturing apparatuses 1 and 1A in which the spring member 48 serving as a compression coil spring is used as a biasing mechanism for pressing the display unit 23 and the slide operation unit 58 in the direction from the closed configuration to the open configuration, the spring member 48 may press the display unit 23 and the slide operation unit 58 in the opposite direction, namely, in the direction from the open configuration to the closed configuration as needed.

The biasing mechanism is not limited to a compression coil spring. For example, a variety of resilient materials, such as an extension coil spring, a leaf spring, or rubber, may be used as the biasing mechanism. Alternatively, a toggle spring that changes the biasing direction while the display unit 23 or the slide operation unit 58 is sliding may be used as the biasing mechanism. In this case, the biasing mechanism can press the display unit 23 and the slide operation unit 58 in the direction from the closed configuration to the open configuration or from the open configuration to the closed configuration depending on the slide position of the display unit 23 and the slide operation unit 58 with respect to the camera body 22 and the camera body 57, respectively.

Third Exemplary Embodiment

Image capturing apparatuses according to third to sixth embodiments of the present invention are described next with the accompanying drawings.

Figure 18A:
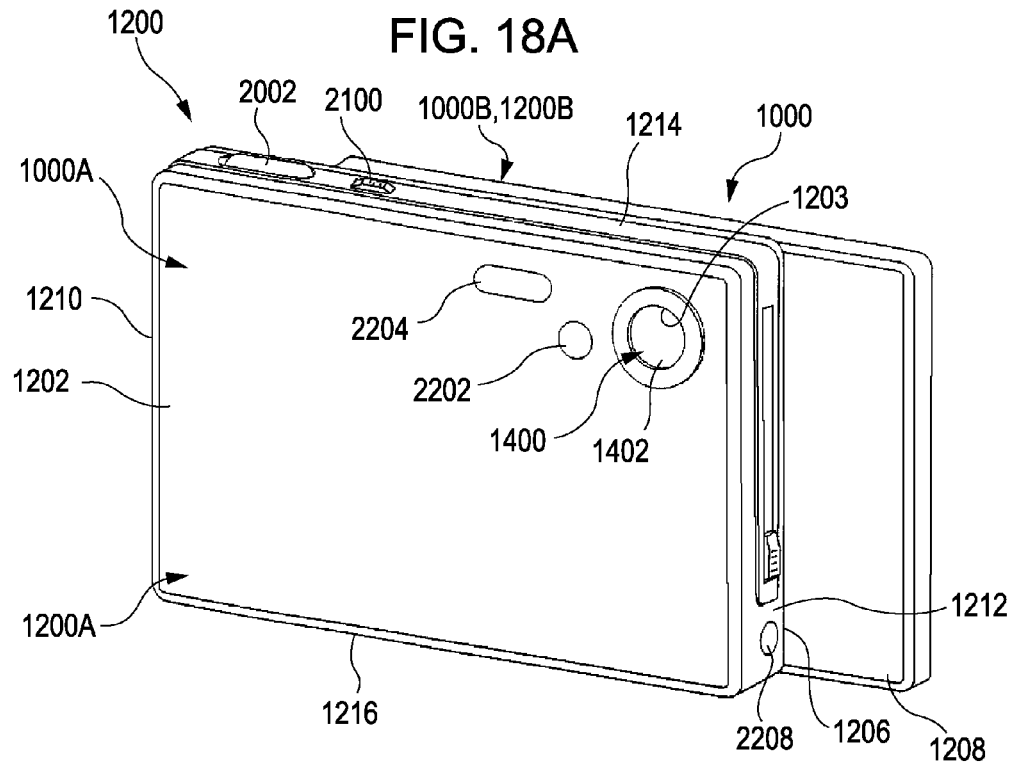
FIG. 18A is a front perspective view of an image capturing apparatus according to a fourth exemplary embodiment of the present invention.
Figure 18B:
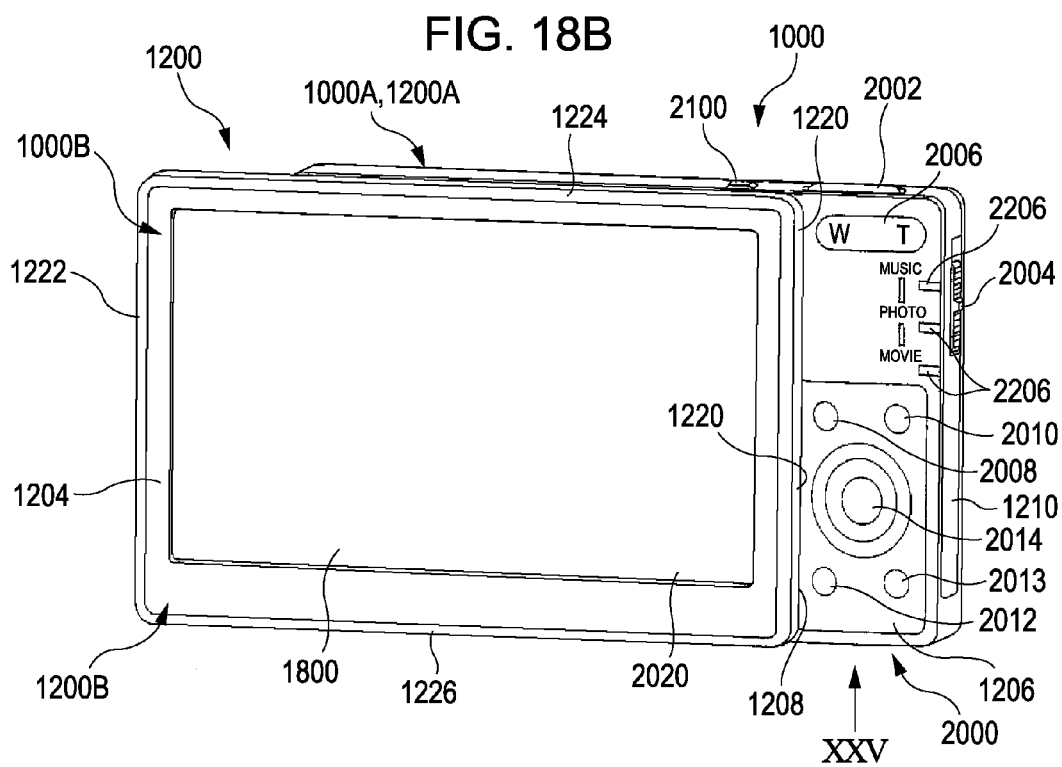
FIG. 18B is a rear perspective view of the image capturing apparatus according to the fourth exemplary embodiment of the present invention.
Figure 19A:
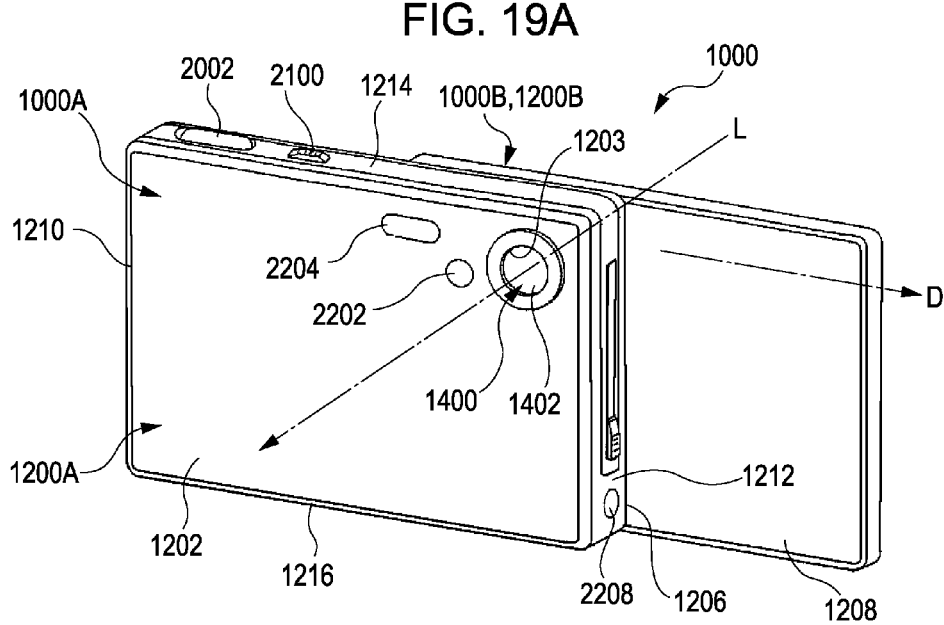
FIG. 19A is a front perspective view of an image capturing apparatus according to a fifth exemplary embodiment.
Figure 19B:
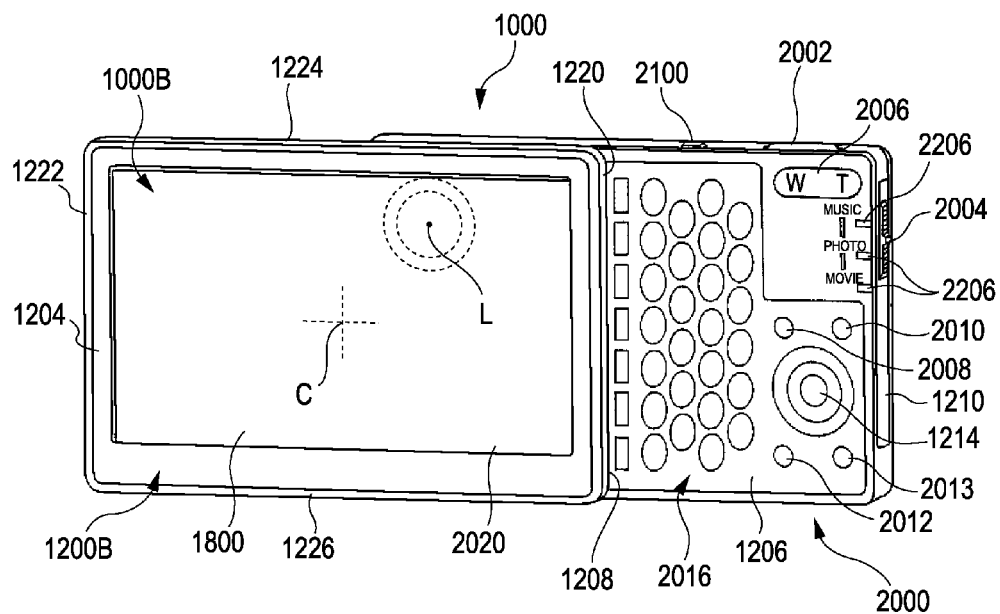
FIG. 19B is a rear perspective view of the image capturing apparatus according to the fifth exemplary embodiment.

FIG. 17A is a front perspective view of an image capturing apparatus 1000 according to a third exemplary embodiment. FIG. 17B is a rear perspective view of the image capturing apparatus 1000 according to the third exemplary embodiment. FIG. 18A is a front perspective view of an image capturing apparatus 1000 according to a fourth exemplary embodiment. FIG. 18B is a rear perspective view of the image capturing apparatus 1000 according to the fourth exemplary embodiment. FIG. 19A is a front perspective view of an image capturing apparatus 1000 according to a fifth exemplary embodiment. FIG. 19B is a rear perspective view of the image capturing apparatus 1000 according to the fifth exemplary embodiment.

As shown in FIGS. 17A and 17B, the image capturing apparatus 1000 according to the present embodiment is a digital still camera.

In the following description, all directions (upward, downward, right, and left directions) are defined when the image capturing apparatus 1000 is viewed from the front side. The direction along the optical axis of an optical system towards a subject is defined as a forward direction whereas the direction along the optical axis toward an image sensor is defined as a backward direction.

The image capturing apparatus 1000 includes a chassis 1200, a photographing optical system 1400, an image sensor 1600 (see FIG. 26), a display panel 1800, and an operation unit 2000 including a variety of components used for an image capturing operation.

The image capturing apparatus 1000 includes a camera body 1000A and a display unit 1000B arranged in the thickness direction.

Each of the camera body 1000A and the display unit 1000B is formed so as to be a thin cuboidal plate having a certain thickness, the left and right widths greater than that thickness, and the height (in the vertical direction) greater than that thickness. As shown in FIGS. 17A and 17B, the camera body 1000A and the display unit 1000B have the same width and the same height.

A chassis 1200 is formed so as to be a thin cuboidal plate having a certain thickness, the left and right widths greater than that thickness, and the height (in the vertical direction) greater than that thickness.

The chassis 1200 includes a camera body chassis 1200A serving as the chassis of the camera body 1000A and a display unit chassis 1200B serving as the chassis of the display unit 1000B.

Each of the camera body chassis 1200A and the display unit chassis 1200B is formed so as to have a horizontally long cuboidal shape having a certain thickness, the height greater than that thickness, and the left and right width greater than that height.

The camera body chassis 1200A has a front surface 1202 and a back surface 1206 on either side thereof in the thickness direction. Also, the camera body chassis 1200A has a left end surface 1210 and a right end surface 1212 on either side thereof in the left-right width direction. Moreover, the camera body chassis 1200A has an upper end surface 1214 and a bottom end surface 1216 on either side thereof in the height direction.

The display unit chassis 1200B has a front surface 1208 and a back surface 1204 on either side thereof in the thickness direction. Also, the display unit chassis 1200B has a left end surface 1220 and a right end surface 1222 on either side thereof in the left-right width direction. Moreover, the display unit chassis 1200B has a top end surface 1224 and a bottom end surface 1226 on either side thereof in the height direction.

As shown in FIGS. 18A and 18B, the back surface 1206 of the camera body chassis 1200A is in contact with the front surface 1208 of the display unit chassis 1200B.

Figure 26:
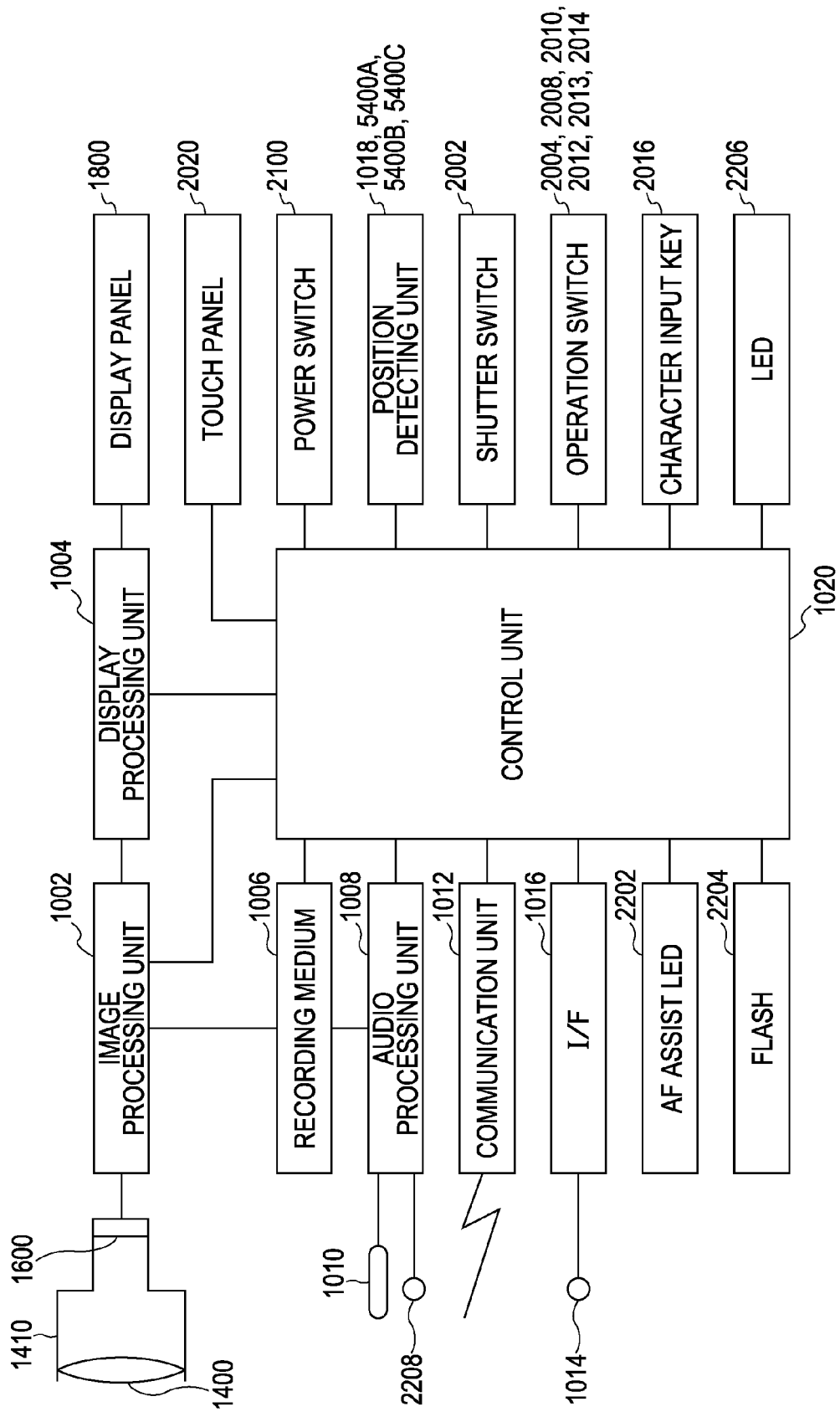
FIG. 26 is a block diagram of the configuration of a control system of the image capturing apparatus 1000.

As shown in FIG. 26, the photographing optical system 1400 leads the image of a subject to the image sensor 1600. The photographing optical system 1400 is disposed at the upper right of the camera body chassis 1200A. An optical member (an objective lens) 1402 that is the frontmost member of the photographing optical system 1400 is disposed so as to face a window 1203 disposed at the upper right of the front surface 1202 of the camera body chassis 1200A.

An autofocus (AF) light emitting diode (LED) 2202 for emitting an AF-assist beam to a subject and a flash 2204 for emitting light to illuminate the subject are disposed on the front surface 1202 at the left of the photographing optical system 1400.

Figure 20:
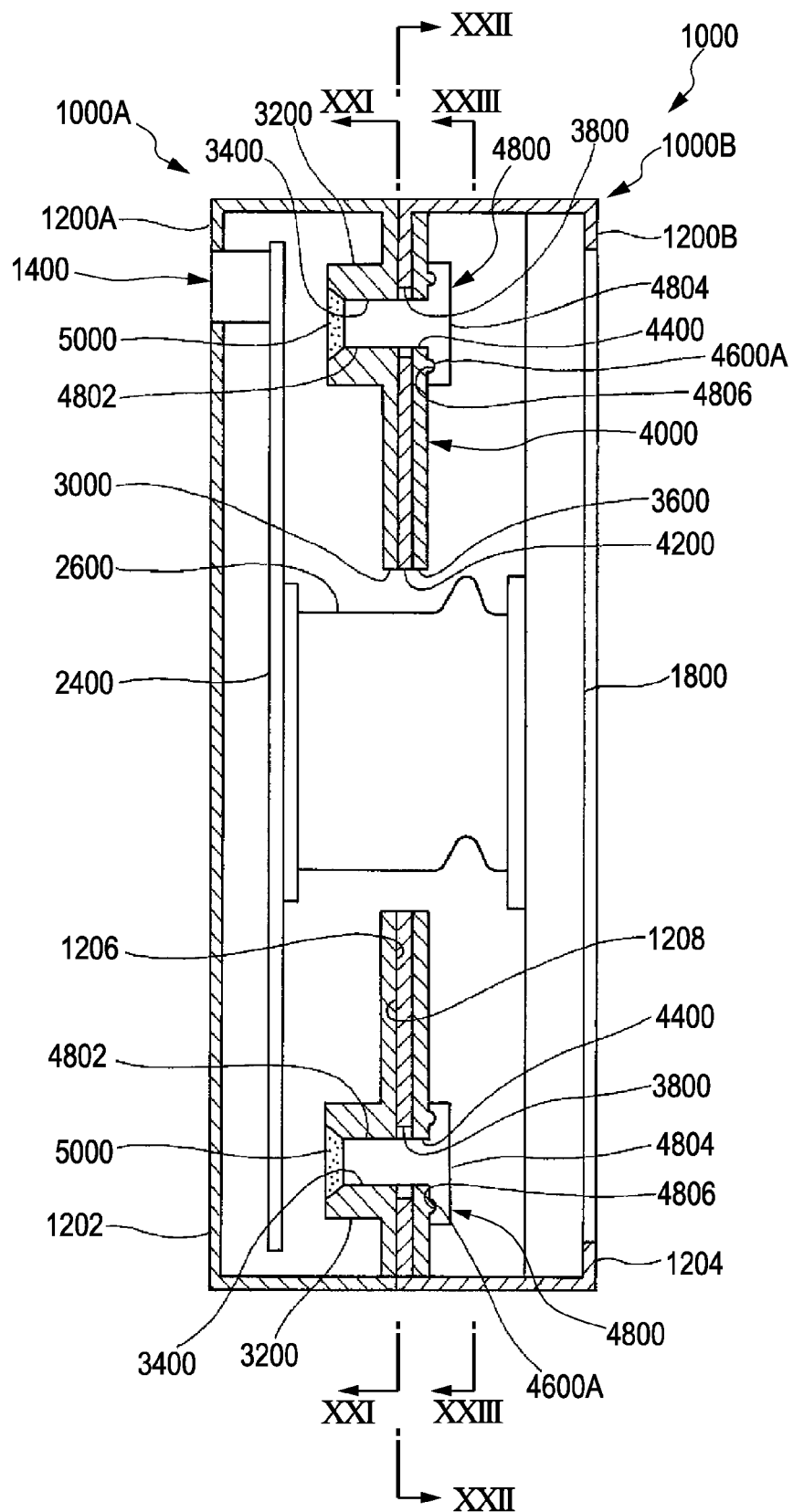
FIG. 20 is a cross-sectional view of the image capturing apparatus according to the third exemplary embodiment of the present invention.

As shown in FIG. 20, a tabular board 2400 having the photographing optical system 1400 and the image sensor 1600 mounted thereon is incorporated in the camera body chassis 1200A. The display panel 1800 is incorporated in the display unit chassis 1200B. The board 2400 is electrically connected to the display panel 1800 using a flexible board 2600.

An operation unit relating to the operation of the image capturing apparatus 1000 is described next.

As shown in FIG. 19B, the operation unit 2000 relating to the operation of the image capturing apparatus 1000 includes, for example, a shutter switch 2002, a video/still-image/music mode change switch 2004, a zoom operation switch 2006, a recording/playback switch 2008, a menu switch 2010, a back key 2012, an image capture mode switch 2013, a four-way arrow operation keypad 2014, a character input key 2016, and a power switch 2100.

The shutter switch 2002 is used for capturing a still image.

The zoom operation switch 2006 is used for zooming the lens of the photographing optical system 1400 from a telephoto to a wideangle (or vice versa).

The recording/playback switch 2008 is used for switching the operating mode of the image capturing apparatus 1000 between the image capture mode for recording an image and a playback mode for playing back a recorded image.

The video/still-image/music mode change switch 2004 is used for switching between a video mode for capturing the image of a subject in a video format and a still image mode for capturing the image of a subject in a still image format when the image capturing apparatus 1000 stays in the image capture mode set by the operation of the recording/playback switch 2008.

In addition, when a music mode is selected by operating the video/still image/music mode change switch 2004, the image capturing apparatus 1000 enters a mode for playing back a music file recorded on a recording medium 1006 (see FIG. 26) regardless of the mode set by the recording/playback switch 2008.

The menu switch 2010 is used for instructing the image capturing apparatus 1000 to display a variety of operation menus on the display panel 1800 or is used for changing the operation menus. Note that the operation menus are used for setting a variety of setting items relating to the operation of the image capturing apparatus 1000.

The back key 2012 is used for changing back the currently displayed operation menus to the previously displayed operation menus.

The image capture mode switch 2013 is used for switching between the image capture modes, such as a macro mode and a sport mode.

The four-way arrow operation keypad 2014 is used for moving a cursor (or an item displayed with its black and white portions reversed) in four directions orthogonal to each other in order to select a menu displayed on the display panel 1800. Also, the four-way arrow operation keypad 2014 is used for confirming (executing) the selected operation menu.

The character input key 2016 is used for inputting a character including a number and a symbol. More specifically, the character input key 2016 is used for inputting a comment to be added to the data of a captured image, a uniform resource locator (URL) when the image capturing apparatus 1000 is connected to the Internet (described below), or character string data to be uploaded to a web page and a blog page together with the image data.

The power switch 2100 is used for powering on and off the image capturing apparatus 1000.

The display panel 1800 displays an image captured by the image sensor 1600 or a variety of operation menus. In the present embodiment, the display panel 1800 includes a liquid crystal display.

In the present embodiment, a touch panel 2020 is attached to the display panel 1800 so as to cover a surface of display panel 1800. The touch panel 2020 serves as part of the operation unit 2000. When a user touches the touch panel 2020 with their finger, the touch panel 2020 can provide functions similar to those of, for example, the recording/playback switch 2008, the menu switch 2010, the back key 2012, and the four-way arrow operation keypad 2014.

As shown in FIG. 17B, the display panel 1800 occupies substantially the entirety of the back surface 1204 of the display unit 1000B.

The display unit chassis 1200B includes upper and lower peripheral portions 1230 extending horizontally and having a small width. The upper and lower peripheral portions 1230 press against the upper and lower edges of the display panel 1800. The display unit chassis 1200B further includes left and right peripheral portions 1232 extending vertically and having a small width. The left and right peripheral portions 1232 press against the left and right edges of the display panel 1800.

The back surface 1206 of the camera body chassis 1200A is overlapped with the front surface 1208 of the display unit chassis 1200B so that the back surface 1206 and the front surface 1208 are relatively moved with respect to each other and exhibit the following two states. In a first state, as shown in FIGS. 17A and 17B, the camera body chassis 1200A overlaps the display unit chassis 1200B so that the outline of the image capturing apparatus 1000 is minimized when viewed in the thickness direction. In a second state, as shown in FIGS. 18A and 18B or FIGS. 19A and 19B, the back surface 1206 of the camera body chassis 1200A is partially exposed from the display unit chassis 1200B so that the outline of the image capturing apparatus 1000 is larger than that in the first state when viewed in the thickness direction.

Figure 21:
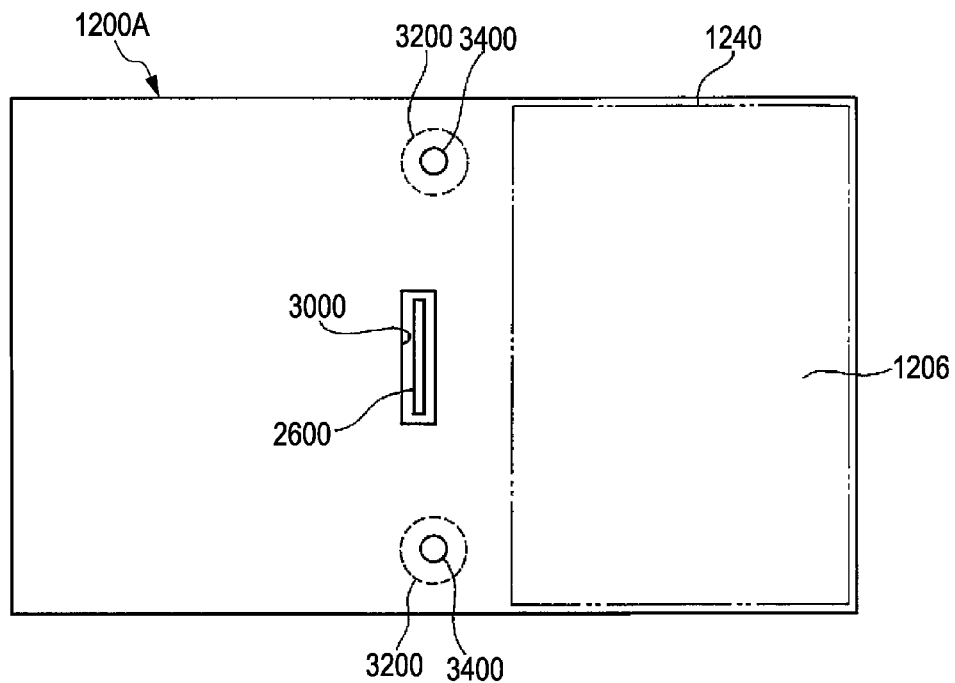
FIG. 21 is a view in the direction of arrows XXI-XXI of FIG. 20.
Figure 22:
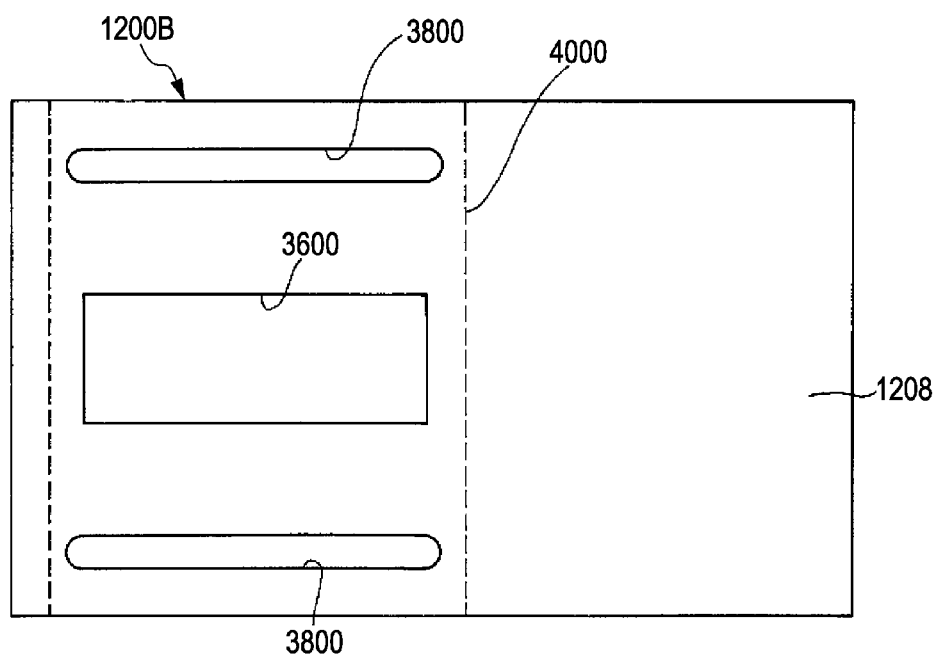
FIG. 22 is a view in the direction of arrows XXII-XXII of FIG. 20.
Figure 23:
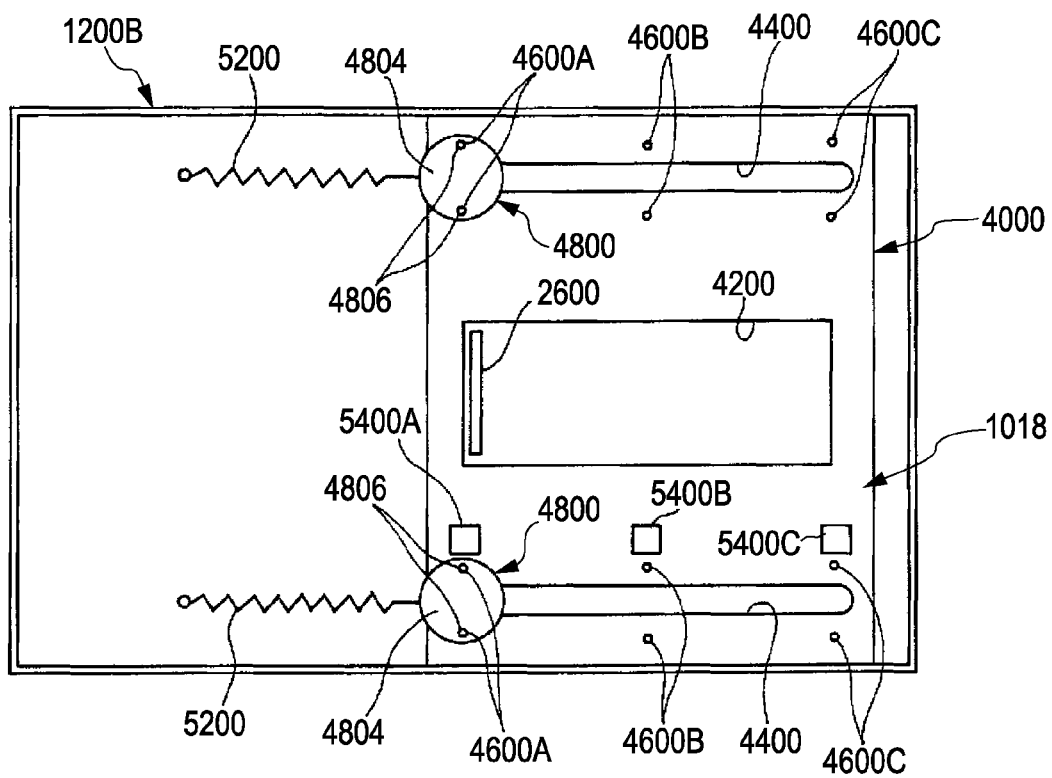
FIG. 23 is a view in the direction of arrows XXIII-XXIII of FIG. 20.
Figure 24:
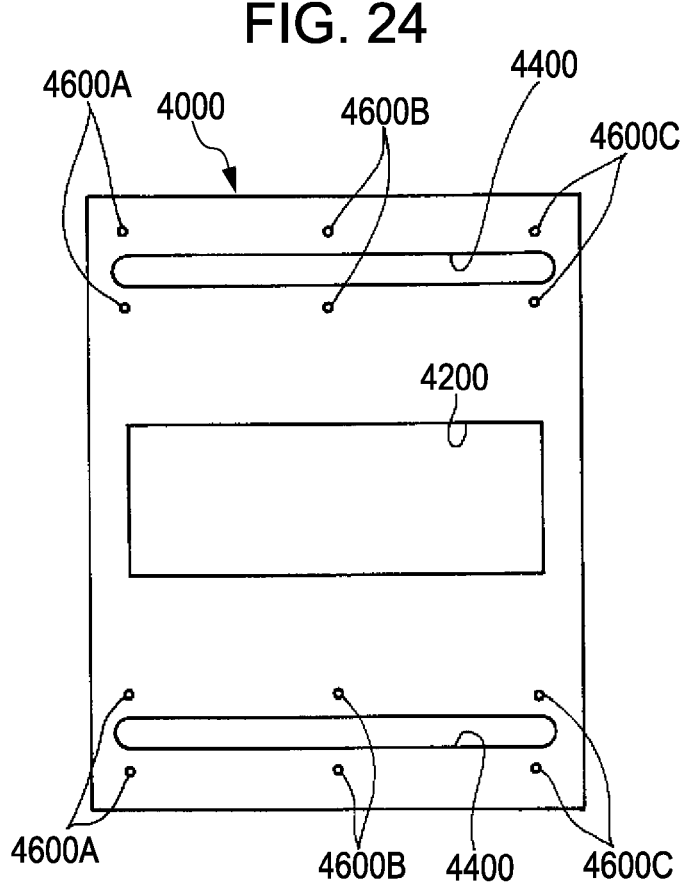
FIG. 24 is a plan view of a guide plate.
Figure 25:
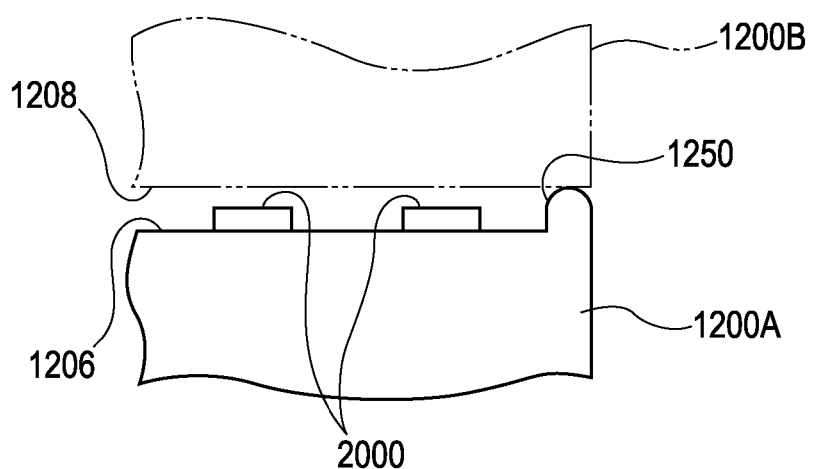
FIG. 25 is a view on arrow XXV of FIG. 18B.

FIG. 20 is a cross-sectional view of the image capturing apparatus 1000. FIG. 21 is a view in the direction of arrows XXI-XXI of FIG. 20. FIG. 22 is a view in the direction of arrows XXII-XXII of FIG. 20. FIG. 23 is a view in the direction of arrows XXIII-XXIII of FIG. 20. FIG. 24 is a plan view of a guide plate. FIG. 25 is a view on arrow XXV of FIG. 18B.

More particularly, as shown in FIGS. 20 and 21, a groove 3000 for allowing the flexible board 2600 to pass therethrough is formed in the center area of the back surface 1206 of the camera body chassis 1200A (in the horizontal and vertical directions). In addition, two boss portions 3200 are formed so as to protrude from the center in the right-left direction of the upper and lower areas of the inner back surface 1206 of the camera body chassis 1200A. A pin fitting hole 3400 is formed in each of the boss portions 3200.

In contrast, as shown in FIG. 22, a groove 3600 for allowing the flexible board 2600 to pass therethrough is formed in the vertical center area of the left half area of the front surface 1208 of the display unit chassis 1200B so as to extend horizontally.

Additionally, two pin insertion grooves 3800 are formed in the upper and lower areas of the left half area of the front surface 1208 of the display unit chassis 1200B so as to extend horizontally.

Furthermore, as shown in FIGS. 22 to 24, a guide plate 4000 is mounted on the inner side of the left half area of the front surface 1208 of the display unit chassis 1200B. The guide plate 4000 is formed from a material having strength and rigidity higher than those of the material of the display unit chassis 1200B.

A groove 4200 and a guide groove 4400 are formed in the guide plate 4000 at positions corresponding to the groove 3600 and the pin insertion groove 3800, respectively.

Additionally, first to third protrusions 4600A, 4600B, and 4600C are formed with a predetermined spacing therebetween in the direction in which the guide groove 4400 extends (i.e., in the right-left direction) on each of the upper and lower sides of the guide groove 4400.

That is, the first protrusions 4600A are formed above and under the right end area of each of the guide grooves 4400. Similarly, the second protrusions 4600B are formed above and under the middle area of each of the guide grooves 4400. The third protrusions 4600C are formed above and under the left end area of each of the guide grooves 4400.

As shown in FIG. 20, the back surface 1206 of the camera body chassis 1200A is overlapped with the front surface 1208 of the display unit chassis 1200B. A shaft 4802 of a guide pin 4800 passes through the guide groove 4400 of the guide plate 4000 and the pin insertion groove 3800 of the front surface 1208 and fits the pin fitting hole 3400 of the boss portions 3200 of the camera body chassis 1200A. The orientation of a head 4804 of the guide pin 4800 is adjusted so that fitting recesses 4806 formed on the lower surface of the head 4804 of the guide pin 4800 fit the first to third protrusions 4600A, 4600B, and 4600C of the guide plate 4000. After the orientation of the head 4804 is adjusted, the guide pin 4800 is secured to the boss portion 3200 using an adhesive agent 5000.

In this way, the back surface 1206 of the camera body chassis 1200A is overlapped with the front surface 1208 of the display unit chassis 1200B such that the back surface 1206 of the camera body chassis 1200A is movable over the front surface 1208 of the display unit chassis 1200B.

Additionally, the flexible board 2600 passes through the groove 3000 of the back surface 1206 of the camera body chassis 1200A and the groove 3600 of the front surface 1208 of the display unit chassis 1200B so as to extend between the camera body chassis 1200A and the display unit chassis 1200B.

Furthermore, as shown in FIG. 23, a coil spring 5200 is provided between the head 4804 of the guide pin 4800 and the front surface 1208 of the display unit chassis 1200B so as to press the guide pin 4800 against an end (the right end) of the guide groove 4400.

That is, as shown in FIG. 23, when the guide pin 4800 is placed at an end (the right end) of the guide groove 4400 (that end is located in the vicinity of the center of the display unit chassis 1200B in the horizontal direction), the first state is achieved in which the camera body chassis 1200A overlaps the display unit chassis 1200B so that the outline of the image capturing apparatus 1000 is minimized when viewed in the thickness direction.

Additionally, when the guide pin 4800 is placed at an end (the left end) of the guide groove 4400 (that end is located in the vicinity of an end of the display unit chassis 1200B in the horizontal direction), the second state is achieved in which the back surface 1206 of the camera body chassis 1200A is partially exposed from the display unit chassis 1200B so that the outline of the image capturing apparatus 1000 is larger than that in the first state when viewed in the thickness direction.

More specifically, the second state includes the following third and fourth states. In the third state, as shown in FIGS. 18A and 18B, a first area of the back surface 1206 of the camera body chassis 1200A is exposed from the display unit chassis 1200B. In the fourth state, as shown in FIGS. 19A and 19B, a second area different from the first area of the back surface 1206 of the camera body chassis 1200A is exposed from the display unit chassis 1200B in addition to the first area.

That is, when the fitting recess 4806 on the lower surface of the head 4804 of the guide pin 4800 fits the first protrusion 4600A of the guide plate 4000, the first state shown in FIGS. 17A and 17B is achieved.

When the fitting recess 4806 on the lower surface of the head 4804 of the guide pin 4800 fits the second protrusion 4600B of the guide plate 4000, the third state shown in FIGS. 18A and 18B is achieved.

Furthermore, when the fitting recess 4806 on the lower surface of the head 4804 of the guide pin 4800 fits the third protrusion 4600C of the guide plate 4000, the fourth state shown in FIGS. 19A and 19B is achieved.

When a user moves the camera body chassis 1200A relative to the display unit chassis 1200B, the fitting recess 4806 fits the first protrusion 4600A, the second protrusion 4600B, or the third protrusion 4600C. Thus, each time the image capturing apparatus 1000 enters the first state, the third state, or the fourth state, the user feels a click sensation and the selected state can be maintained.

In addition, since the coil spring 5200 is provided, the camera body chassis 1200A and the display unit chassis 1200B are pressed against each other so that the first state is achieved. Accordingly, when the user moves the camera body chassis 1200A and the display unit chassis 1200B from the first state to the third, and then to the fourth state, the image capturing apparatus 1000 can provide the user with a sense of resistance. In addition, when the image capturing apparatus 1000 is returned from the fourth state to the third state, and then to the first state, the biasing force of the lock portion 52 acts. Therefore, by applying only a weak operation force, the user can return the image capturing apparatus 1000 to the first state.

Accordingly, in the present embodiment, the guide pin 4800, the fitting recess 4806, and the first to third protrusions 4600A, 4600B, and 4600C can form a click mechanism that latches and maintains the camera body chassis 1200A and the display unit chassis 1200B in the first state, the third state, or the fourth state.

Additionally, as shown in FIG. 23, the guide plate 4000 includes a first proximity switch 5400A for detecting that the guide pin 4800 is engaged with the first protrusion 4600A and outputting a position detection signal, a second proximity switch 5400B for detecting that the guide pin 4800 is engaged with the second protrusion 4600B and outputting a position detection signal, and a third proximity switch 5400C for detecting that the guide pin 4800 is engaged with the third protrusion 4600C and outputting a position detection signal. These first to third proximity switches 5400A, 5400B, and 5400C form a position detecting unit 1018 (see FIG. 26).

In the present embodiment, the direction in which the camera body chassis 1200A moves relative to the display unit chassis 1200B between the first state and the third state is the same as the direction in which the camera body chassis 1200A moves relative to the display unit chassis 1200B between the third state and the fourth state.

In addition, in the present embodiment, the second state includes the following third and fourth states. In the third state, as shown in FIGS. 18A and 18B, a first area of the back surface 1206 of the camera body chassis 1200A is exposed from the display unit chassis 1200B. In the fourth state, as shown in FIGS. 19A and 19B, a second area different from the first area of the back surface 1206 of the camera body chassis 1200A is exposed from the display unit chassis 1200B in addition to the first area.

Furthermore, in the present embodiment, an area of the back surface 1206 of the camera body chassis 1200A that is exposed from the display unit chassis 1200B in the third state is the first area extending along one of two short sides of the back surface 1206 of the camera body chassis 1200A. In contrast, an area on the back surface 1206 of the camera body chassis 1200A that is exposed from the display unit chassis 1200B in the fourth state is the second area that includes the first area and is larger than the first area extending along one of two short sides of the back surface 1206 of the camera body chassis 1200A.

In addition, the optical member 1402 of the photographing optical system 1400 is disposed on the front surface 1202 at a location shifted from the vertical center line of the front surface 1202 in a direction away from the exposed area of the back surface 1206 of the camera body chassis 1200A in the second state.

The location at which the operation unit 2000 is disposed is described next.

The shutter switch 2002 and the power switch 2100 are provided on a top surface 1214 of the camera body chassis 1200A.

The video/still-image/music mode change switch 2004 is provided on the left end surface 1210 of the camera body chassis 1200A.

As shown in FIG. 19A, an audio output jack 2208 is provided on the right end surface 1212 of the camera body chassis 1200A. A plug of a sound output device, such as a headphone, is removably attached to the audio output jack 2208.

As shown in FIGS. 17B, 18B, and 19B, the zoom operation switch 2006, the recording/playback switch 2008, the menu switch 2010, the back key 2012, the four-way arrow operation keypad 2014, and the character input key 2016 are provided in an area of the back surface of the camera body chassis 1200A that is hidden by the display unit chassis 1200B in the first state and is exposed from the display unit chassis 1200B in the second state.

More specifically, as shown in FIGS. 17B and 18B, the zoom operation switch 2006, the recording/playback switch 2008, the menu switch 2010, the back key 2012, and the four-way arrow operation keypad 2014 are disposed in an area of the back surface of the camera body chassis 1200A that is hidden by the display unit chassis 1200B in the first state and is exposed from the display unit chassis 1200B in the third state.

Additionally, as shown in FIGS. 18B and 19B, the character input key 2016 is disposed in an area of the back surface of the camera body chassis 1200A that is hidden by the display unit chassis 1200B in the first state and is exposed from the display unit chassis 1200B in the fourth state.

As shown in FIG. 21, the operation unit 2000 is disposed in an operation unit region 1240 of the back surface 1206 of the display unit chassis 1200B.

Additionally, as shown in FIG. 25, the area of the back surface of the camera body chassis 1200A where the operation unit 2000 is disposed is an area of the back surface 1206 slightly stepped down from a peripheral portion 1250, so that the operation unit 2000 does not interfere with the front surface 1208 of the display unit chassis 1200B.

An exemplary configuration of a control system of the image capturing apparatus 1000 is described next.

FIG. 26 is a block diagram of the configuration of a control system of the image capturing apparatus 1000.

As noted above, the image capturing apparatus 1000 includes the photographing optical system 1400, the image sensor 1600, and the display panel 1800. The image capturing apparatus 1000 further includes an image processing unit 1002, a display processing unit 1004, a recording medium 1006, an audio processing unit 1008, a microphone 1010, a communication unit 1012, and an external connection connector 1014, an external apparatus interface 1016, the position detecting unit 1018, and a control unit (control means) 1020.

As shown in FIG. 26, the photographing optical system 1400 is accommodated in a lens barrel 1410. The image sensor 1600 is disposed in a back portion of the lens barrel 1410.

The image sensor 1600 includes a CCD sensor or a complementary metal-oxide semiconductor (CMOS) sensor that captures the image of a subject formed by the photographing optical system 1400.

The image processing unit 1002 carries out a variety of signal processing on the basis of an image capture signal output from the image sensor 1600 so as to generate image data. The image processing unit 1002 also carries out processing on image data read out of the recording medium 1006.

The display processing unit 1004 carries out processing on the image data input from the image processing unit 1002 so as to display the image data on the display panel 1800. The display processing unit 1004 also displays image data and character data for displaying menus supplied from the control unit 1020.

The recording medium 1006 stores the image data delivered from the image processing unit 1002 under the control of the control unit 1020. The recording medium 1006 also delivers the stored image data to the image processing unit 1002 under the control of the control unit 1020.

In addition to the image data, the recording medium 1006 stores audio data delivered from the audio processing unit 1008 under the control of the control unit 1020. The recording medium 1006 also delivers the stored audio data to the audio processing unit 1008 under the control of the control unit 1020. Examples of the audio data include a music file to be played back in the above-described music mode.

For example, the recording medium 1006 is composed of a hard disk or a semi-conductor memory (such as a rewritable flash memory). In the present embodiment, the recording medium 1006 is irremovably integrated into the chassis 1200. However, the chassis 1200 may have a memory card slot and a memory card may be removably mounted in the memory card slot as the recording medium 1006.

The audio processing unit 1008 carries out processing on audio data input from the microphone 1010 or audio data input from an external apparatus via the external connection connector 1014 and the external apparatus interface 1016 and delivers the audio data to the recording medium 1006. The audio processing unit 1008 also carries out processing on audio data delivered from the recording medium 1006 so as to supply the audio data to the audio output jack 2208 or supply the audio data to an external apparatus via the external apparatus interface 1016 or the external connection connector 1014.

Accordingly, the image capturing apparatus 1000 can function as a voice recorder (a sound recording apparatus) or a music player.

For example, the external apparatus interface 1016 is a USB interface that communicates audio data and image data with an external apparatus.

In the present embodiment, the communication unit 1012 wirelessly communicates with an external apparatus using Bluetooth technology.

The communication unit 1012 wirelessly communicates audio data and image data with an external apparatus (such as a personal computer).

Additionally, the communication unit 1012 is wirelessly connected to the Internet via external equipment (such as a modem) so as to access and browse web pages and blog pages in servers. In addition, the communication unit 1012 can upload image data and character data for web pages and blog pages to the servers.

The position detecting unit 1018 detects whether the camera body chassis 1200A and the display unit chassis 1200B are positioned in the first state, the third state, or the fourth state. The position detecting unit 1018 then delivers a position detection signal for identifying the position to the control unit 1020.

Hereinafter, for convenience of description, the relative position between the camera body chassis 1200A and the display unit chassis 1200B in the first state is referred to as a "closed position". The relative position between the camera body chassis 1200A and the display unit chassis 1200B in the third state is referred to as a "first position". The relative position between the camera body chassis 1200A and the display unit chassis 1200B in the fourth state is referred to as a "second position".

In the present embodiment, the position detecting unit 1018 includes the first to third proximity switches 5400A, 5400B, and 5400C. However, the position detecting unit 1018 can include a variety of known position detection sensors in addition to a proximity switch.

The control unit 1020 controls the image processing unit 1002, the display processing unit 1004, the recording medium 1006, the audio processing unit 1008, the communication unit 1012, the external apparatus interface 1016, and the position detecting unit 1018. More specifically, the control unit 1020 includes a microcomputer incorporating a CPU and a memory that stores a control program executed by the CPU.

An exemplary operation of the image capturing apparatus 1000 according to the present embodiment is described next.

Figure 27:
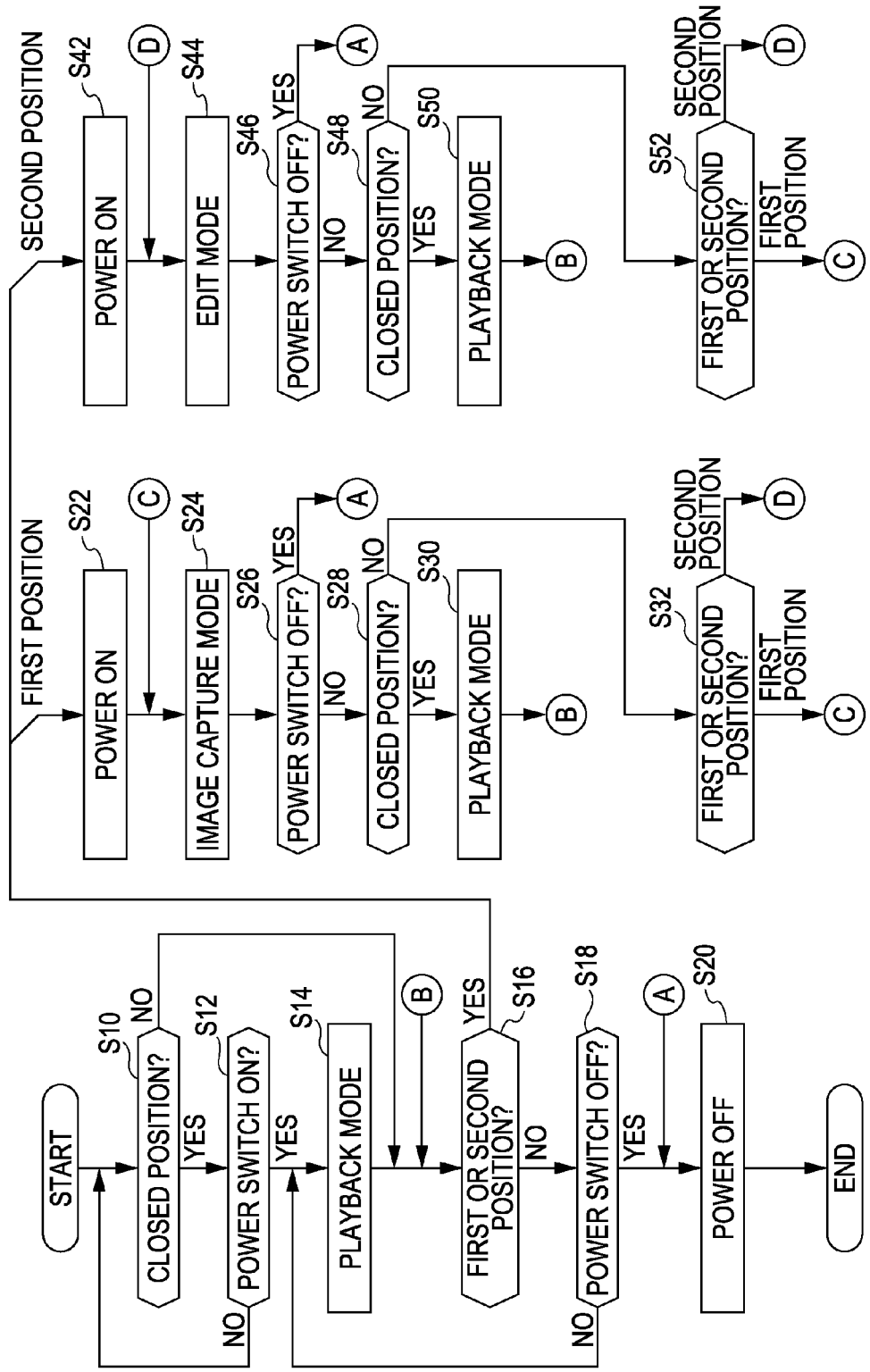
FIG. 27 is a flow chart of the operation of the image capturing apparatus 1000.

FIG. 27 is a flow chart of the operation of the image capturing apparatus 1000.

Initially, the image capturing apparatus 1000 is powered off. The camera body chassis 1200A and the display unit chassis 1200B are in the closed position.

The control unit 1020 determines whether the camera body chassis 1200A and the display unit chassis 1200B are in the closed position on the basis of the position detection signal delivered from the position detecting unit 1018 (step S10).

If the control unit 1020 determines that the camera body chassis 1200A and the display unit chassis 1200B are not in the closed position, the processing proceeds to step S16.

However, if the control unit 1020 determines that the camera body chassis 1200A and the display unit chassis 1200B are in the closed position, the control unit 1020 determines whether the power switch 2100 is turned on (step S12).

If the power switch 2100 has been turned off, the processing returns to step S10.

However, if the power switch 2100 has been turned on, the control unit 1020 enters a playback mode (step S14). In the playback mode, the control unit 1020 displays the image data of a still image or a video read out of the recording medium 1006 on the display panel 1800.

Figure 28A:
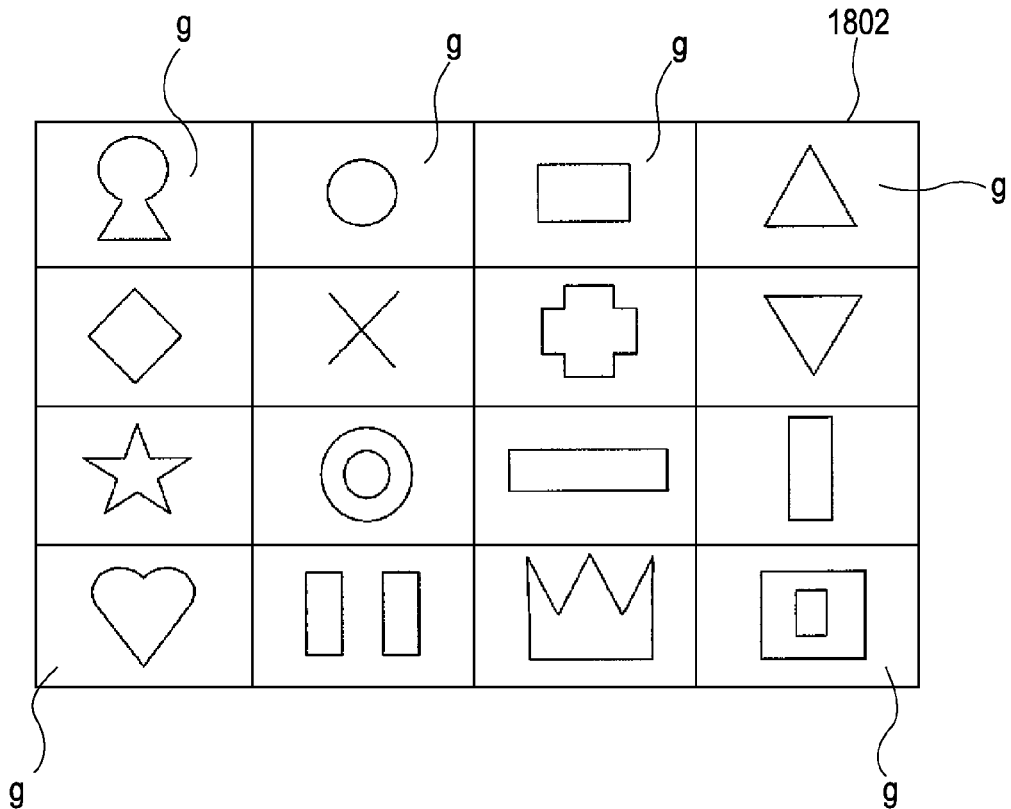
FIGS. 28A and 28B illustrate a display screen 1802 of the display panel 1800 on which images are displayed in a playback mode.
Figure 28B:
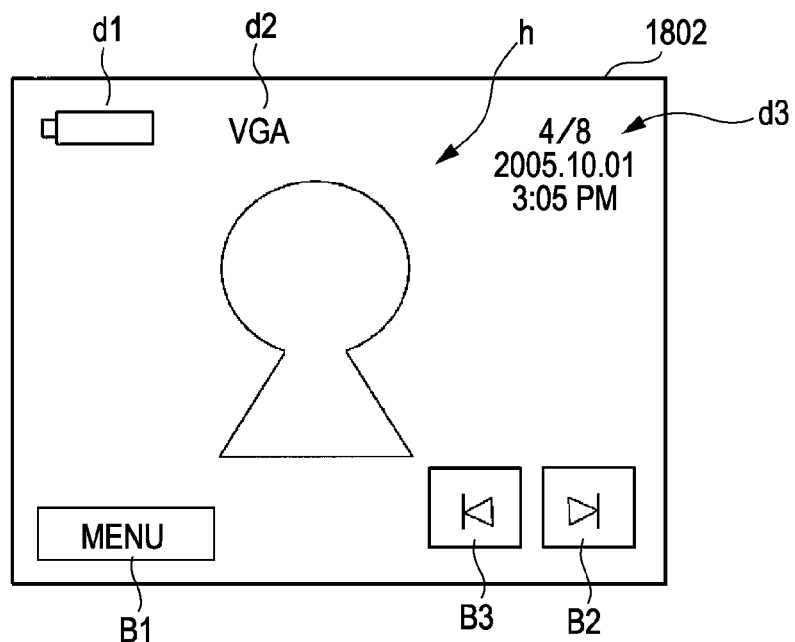

FIGS. 28A and 28B illustrate a display screen 1802 of the display panel 1800 on which images are displayed in a playback mode.

In the playback mode, as shown in FIG. 28A, a plurality of thumbnail images g are displayed on the display screen 1802. If a user selects one of the thumbnail images g to be enlarged and touches an area of the touch panel 2020 corresponding to the selected thumbnail image g, the selected thumbnail image g on the display screen 1802 is displayed as an enlarged image h, as shown in FIG. 28B.

As shown in FIG. 28B, when the enlarged image h is displayed, operation buttons are also displayed on the display screen 1802. For example, a menu button B1 for displaying the operation menu screen, a forward button B2 for displaying the next enlarged display screen, and a backward button B3 for displaying the previous enlarged display screen are displayed on the display screen 1802. The order in which the enlarged images h are displayed by operating the forward button B2 or the backward button B3 corresponds to the order of arrangement of the thumbnail images g shown in FIG. 28A (the order from the upper left to the lower right).

Additionally, battery level display data d1, size data d2 for indicating the size of the image data, the image number attached to the displayed image data, the number of images recorded on the recording medium 1006, and additional data included in the image data (such as date and time) are displayed on the display screen 1802.

It is noted that, when the playback image data represents a still image, the enlarged image is also a still image. When the playback image data represents a video, the enlarged image is also a video.

Subsequently, the control unit 1020 determines whether the camera body chassis 1200A and the display unit chassis 1200B are in one of the first position and the second position on the basis of the position detection signal delivered from the position detecting unit 1018 (step S16).

If the control unit 1020 determines that the camera body chassis 1200A and the display unit chassis 1200B are in neither one of the first position and the second position, that is, if the control unit 1020 determines that the camera body chassis 1200A and the display unit chassis 1200B are in the closed position, the control unit 1020 then determines whether the power switch 2100 has been turned off (step S18).

If the power switch 2100 has not been turned off, the processing returns to step S14. However, if the power switch 2100 has been turned off, the power is turned off (step S20) and the processing is completed.

If, at step S16, the control unit 1020 determines that the camera body chassis 1200A and the display unit chassis 1200B are in the first position, the power is turned on (step S22) and the image capturing apparatus 1000 enters an image capture mode (step S24). However, if the power has already been turned on before step S22 is performed, the processing of step S22 is not performed and the processing proceeds to step S24.

In the image capture mode, the data of a still image or a video is recorded on the recording medium 1006.

Figure 29:
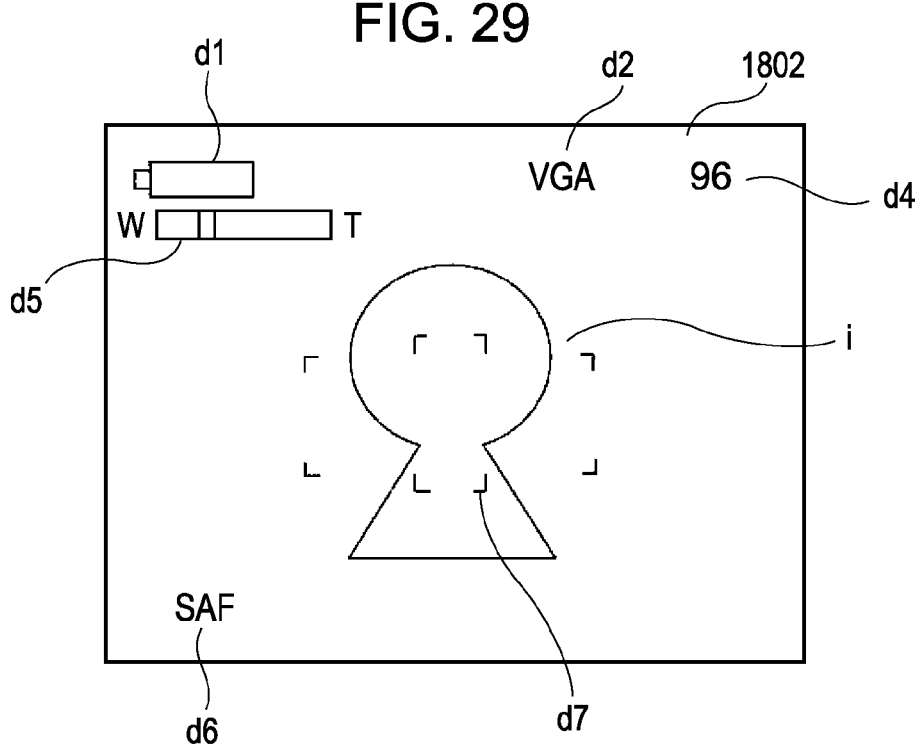
FIG. 29 illustrates the display screen 1802 of the display panel 1800 on which the image of a subject is displayed in an image capture mode.

FIG. 29 illustrates the display screen 1802 of the display panel 1800 on which the image of a subject is displayed in an image capture mode.

In the image capture mode, for example, as shown in FIG. 29, an image i of the subject is displayed on the display screen 1802. At the same time, the following information is displayed on the display screen 1802: the battery level display data d1; the size data d2 indicating the size of the image data; the number of images d4 recorded on the recording medium 1006; a zoom indicator d5 indicating the zoom position between the wide angle position (W) and the telephoto position (T); characters (or icons) d6 indicating the type of image capture mode, such as a macro or sport mode, (or exposure priority/shutter speed priority) and the type of focus control; and a mark d7 indicating the target area of auto focus control.

Subsequently, the control unit 1020 determines whether the power switch 2100 has been turned off (step S26).

If the power switch 2100 has been turned off, the processing proceeds to step S20.

However, if the power switch 2100 has not been turned off, the control unit 1020 determines whether the camera body chassis 1200A and the display unit chassis 1200B are in the closed position on the basis of the position detection signal delivered from the position detecting unit 1018 (step S28). If the control unit 1020 determines that the camera body chassis 1200A and the display unit chassis 1200B are in the closed position, the image capturing apparatus 1000, as described above, enters a playback mode (step S30) and the processing proceeds to step S16.

However, if, at step S28, the control unit 1020 determines that the camera body chassis 1200A and the display unit chassis 1200B are not in the closed position, the control unit 1020 then determines whether the camera body chassis 1200A and the display unit chassis 1200B are in one of the first position and the second position on the basis of the position detection signal delivered from the position detecting unit 1018 (step S32).

If the control unit 1020 determines that the camera body chassis 1200A and the display unit chassis 1200B are in the first position, the processing returns to step S24.

If the control unit 1020 determines that the camera body chassis 1200A and the display unit chassis 1200B are in the second position, the processing proceeds to step S44.

If, at step S16, the control unit 1020 determines that the camera body chassis 1200A and the display unit chassis 1200B are in the second position, the power is turned on (step S42) and the image capturing apparatus 1000 enters an edit mode (step S44). However, if the power has already been turned on before step S42 is performed, the processing of step S42 is not performed and the processing proceeds to step S44.

In the edit mode, data relating to the image data of a still image or a video is input. More specifically, character data, such as annotation relating to the image data, is input.

Figure 30:
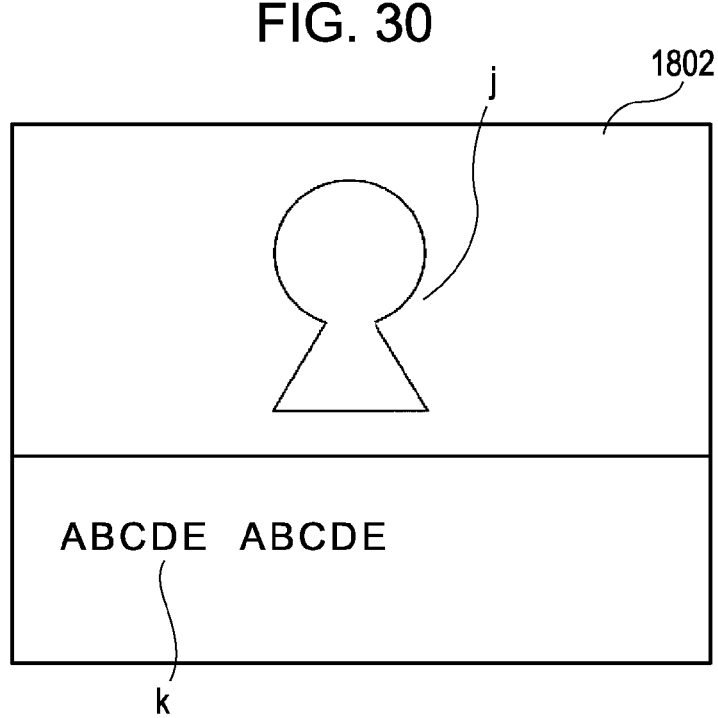
FIG. 30 illustrates the display screen 1802 of the display panel 1800 on which image data and inputting character data are displayed in an edit mode.

FIG. 30 illustrates the display screen 1802 of the display panel 1800 on which image data and inputting character data are displayed in an edit mode.

In the edit mode, for example, as shown in FIG. 30, an image j read out of the recording medium 1006 is displayed on the display screen 1802. At the same time, a character string k input using the character input key 2016 is displayed on the display screen 1802.

For example, the character string k represents annotation relating to the image j and is uploaded to a web page or a blog page on a server in the Internet together with the image data of the image j.

Subsequently, the control unit 1020 determines whether the power switch 2100 has been turned off (step S46).

If the power switch 2100 has been turned off, the processing proceeds to step S20.

However, if the power switch 2100 has not been turned off, the control unit 1020 determines whether the camera body chassis 1200A and the display unit chassis 1200B are in the closed position on the basis of the position detection signal delivered from the position detecting unit 1018 (step S48). If the control unit 1020 determines that the camera body chassis 1200A and the display unit chassis 1200B are in the closed position, the image capturing apparatus 1000 enters a playback mode (step S50) and the processing proceeds to step S16.

However, if, at step S48, the control unit 1020 determines that the camera body chassis 1200A and the display unit chassis 1200B are not in the closed position, the control unit 1020 then determines whether the camera body chassis 1200A and the display unit chassis 1200B are in one of the first position and the second position on the basis of the position detection signal delivered from the position detecting unit 1018 (step S52).

If the control unit 1020 determines that the camera body chassis 1200A and the display unit chassis 1200B are in the first position, the processing returns to step S24.

If the control unit 1020 determines that the camera body chassis 1200A and the display unit chassis 1200B are in the second position, the processing proceeds to step S44.

As noted above, according to the present embodiment, if, as shown in FIGS. 17A and 17B, the camera body chassis 1200A and the display unit chassis 1200B are in the first state, the outline of the chassis 1200 is minimized and is in a compact state. In addition, the display panel 1800 occupies substantially the entirety of the back surface 1204 of the display unit chassis 1200B.

Accordingly, although the outline of the chassis 1200 is compact, the dimensions of the display panel 1800 can be increased to substantially the entire back surface 1204 of the display unit chassis 1200B. Thus, the image capturing apparatus 1000 can advantageously display a large image when a user is viewing the image or is inputting a variety of information relating to the image.

Moreover, when the camera body chassis 1200A and the display unit chassis 1200B are in the first state, the operation unit 2000 disposed on the back surface 1206 of the camera body chassis 1200A is hidden.

Accordingly, by hiding the operation unit 2000 that is not needed when an image is being displayed on the display panel 1800 and the user is viewing the image, performance of an inadvertent operation by the user can be prevented. Thus, the form that is optimal for the user to view the image can be achieved.

In addition, as shown in FIGS. 18A and 18B, when the image capturing apparatus 1000 enters the third state, which is one of the two second states, the back surface 1206 of the camera body chassis 1200A is partially exposed while extending laterally from the display panel 1800. Thus, the zoom operation switch 2006, the recording/playback switch 2008, the menu switch 2010, the back key 2012, and the four-way arrow operation keypad 2014 appear on the side of the display panel 1800.

Accordingly, although the large-sized display panel 1800 is provided, the zoom operation switch 2006, the recording/playback switch 2008, the menu switch 2010, the back key 2012, and the four-way arrow operation keypad 2014 can be disposed on the chassis 1200 in the form that is optimal for the user to operate these operation members.

Furthermore, when the image capturing apparatus 1000 enters the third state, the character input key 2016 is hidden. Therefore, performance of an inadvertent operation of the character input key 2016 by a user that is not needed for image capture can be advantageously prevented.

Still furthermore, in the third state, the user can hold the right portion of the display unit chassis 1200B and the left portion of the camera body chassis 1200A with their right and left hands, respectively. Thus, the user can advantageously hold the image capturing apparatus 1000 without hiding the display panel 1800 with their hands.

Still furthermore, as shown in FIGS. 19A and 19B, when the image capturing apparatus 1000 enters the fourth state, which is the other of the two second states, the entire operation unit 2000 disposed on the back surface 1206 of the camera body chassis 1200A is exposed. Thus, the operation members relating to an image capturing operation, i.e., the zoom operation switch 2006, the recording/playback switch 2008, the menu switch 2010, the back key 2012, and the four-way arrow operation keypad 2014 appear in addition to the character input key 2016.

Accordingly, although the large-sized display panel 1800 is provided, the zoom operation switch 2006, the recording/playback switch 2008, the menu switch 2010, the back key 2012, the four-way arrow operation keypad 2014, and the character input key 2016 can be disposed on the image sensor 12 in the form that is optimal for the user to operate these operation members.

In the fourth state, the user can appropriately perform an edit operation using the character input key 2016 while checking the image displayed on the display panel 1800.

Additionally, according to the present embodiment, when the camera body chassis 1200A and the display unit chassis 1200B are moved from the first state to the second state, the mode changes from the playback mode to the image capture mode or the edit mode. Conversely, when the camera body chassis 1200A and the display unit chassis 1200B are moved from the second state to the first state, the mode changes from the image capture mode or the edit mode to the playback mode. That is, a switching operation for setting a mode is eliminated. Thus, the ease of operation can be advantageously improved.

Furthermore, in the present embodiment, when the camera body chassis 1200A and the display unit chassis 1200B are moved from the first state to the second state with the power turned off, the power is turned on and the image capturing apparatus 1000 enters an image capture mode or an edit mode. That is, the user can use the image capturing apparatus 1000 in the image capture mode or the edit mode without operating the power switch 2100. Thus, the ease of operation can be advantageously improved.

Still furthermore, in the present embodiment, since the operation buttons related to playback of an image are formed as the touch panel 2020, the size of the image capturing apparatus 1000 can be advantageously decreased and the ease of operation can be advantageously improved when the camera body chassis 1200A and the display unit chassis 1200B are in the first state and in the playback mode.

In addition, since the optical member 1402 of the photographing optical system 1400 is located distant from the area exposed in the second state of the back surface 1206 of the camera body chassis 1200A across the horizontal center of the front surface 1202, the position of the optical axis of the photographing optical system 1400 (i.e., an optical axis L shown in FIGS. 19A and 19B) in the horizontal direction can be located close to the center point of the display panel 1800 (i.e., a center point C shown in FIG. 19B) in the second state.

Accordingly, in the second state, the shift between the position of the subject when the user directly views the subject and the position of the subject displayed on the display panel 1800 in the horizontal direction can be decreased. Thus, the ease of operation can be advantageously improved during image capture.

That is, the image capturing apparatus 1000 includes the photographing optical system 1400. The image capturing apparatus 1000 further includes the camera body 1000A and the display unit 1000B separated in the forward-backward direction. The photographing optical system 1400 is included in the camera body 1000A. The photographing optical system 1400 includes the optical member 1402 that is disposed on the front surface 1202 of the camera body 1000A at a location shifted from the vertical center line of the front surface 1202 to one side in the left-right width direction (i.e., a direction D in which the camera body 1000A moves, as shown in FIG. 19A). The camera body 1000A is overlapped with the display unit 1000B so that the back surface 1206 of the camera body 1000A is movable relative to the front surface 1208 of the display unit 1000B between a first state and a second state. In the first state, the camera body chassis 1200A overlaps the display unit chassis 1200B so that the outline of the image capturing apparatus 1000 is minimized when viewed in the thickness direction. In a second state, the back surface 1206 of the camera body chassis 1200A is partially exposed from the display unit chassis 1200B so that the outline of the image capturing apparatus 1000 is larger than that in the first state when viewed in the thickness direction. Accordingly, in the second state, the shift between the position of the subject when the user directly views the subject and the position of the subject displayed on the display panel 1800 in the horizontal direction can be decreased. Thus, the ease of operation can be advantageously improved during image capture.

More specifically, the image capturing apparatus 1000 includes the chassis 1200 having a thin tabular shape and the photographing optical system 1400 incorporated in the chassis 1200. The chassis 1200 has a certain thickness, the left and right width greater than that thickness, and the height (in the vertical direction) greater than that thickness. The chassis 1200 has the front surface 1202 and the back surface 1204 on either side thereof in the thickness direction. The image capturing apparatus 1000 includes the camera body 1000A and the display unit 1000B separated in the thickness direction. The chassis 1200 includes the camera body chassis 1200A serving as a chassis of the camera body 1000A and the display unit chassis 1200B serving as a chassis of the display unit 1000B. The photographing optical system 1400 is incorporated in the camera body chassis 1200A. The photographing optical system 1400 includes the optical member 1402 disposed in the window 1203 formed on the front surface 1202 of the camera body chassis 1200A at a position shifted from the center of the front surface 1202 to one side in the left-right width direction. The camera body chassis 1200A is overlapped with the display unit chassis 1200B so that the back surface 1206 and the front surface 1208 are relatively moved with respect to each other and exhibit the following two states. In a first state, the camera body chassis 1200A overlaps the display unit chassis 1200B so that the outline of the image capturing apparatus 1000 is minimized when viewed in the thickness direction. In a second state, the back surface 1206 of the camera body chassis 1200A is partially exposed from the display unit chassis 1200B so that the outline of the image capturing apparatus 1000 is larger than that in the first state when viewed in the thickness direction. Accordingly, in the second state, the shift between the position of the subject when the user directly views the subject and the position of the subject displayed on the display panel 1800 in the horizontal direction can be decreased. Thus, the ease of operation can be advantageously improved during image capture.

While the foregoing embodiment has been described with reference to the touch panel 2020 as an operation member operated during playback, the operation member operated during playback may be disposed on an surface of the chassis 1200 that is always exposed, for example, on one of the left end surface 1210, the right end surface 1212, the top surface 1214, and the bottom end surface 1216 of the camera body chassis 1200A, the front surface 1202 of the camera body chassis 1200A, the left end surface 1220, the right end surface 1222, the top end surface 1224, and the bottom end surface 1226 of the display unit chassis 1200B.

Fourth Exemplary Embodiment

A fourth exemplary embodiment is described next.

The fourth exemplary embodiment is a modification of the third exemplary embodiment. Unlike the third exemplary embodiment, in the fourth exemplary embodiment, the camera body chassis 1200A and the display unit chassis 1200B relatively move in the vertical direction, the camera body chassis 1200A and the display unit chassis 1200B move between the first state and the second state, and the second state does not include the third and fourth states.

Figure 31:
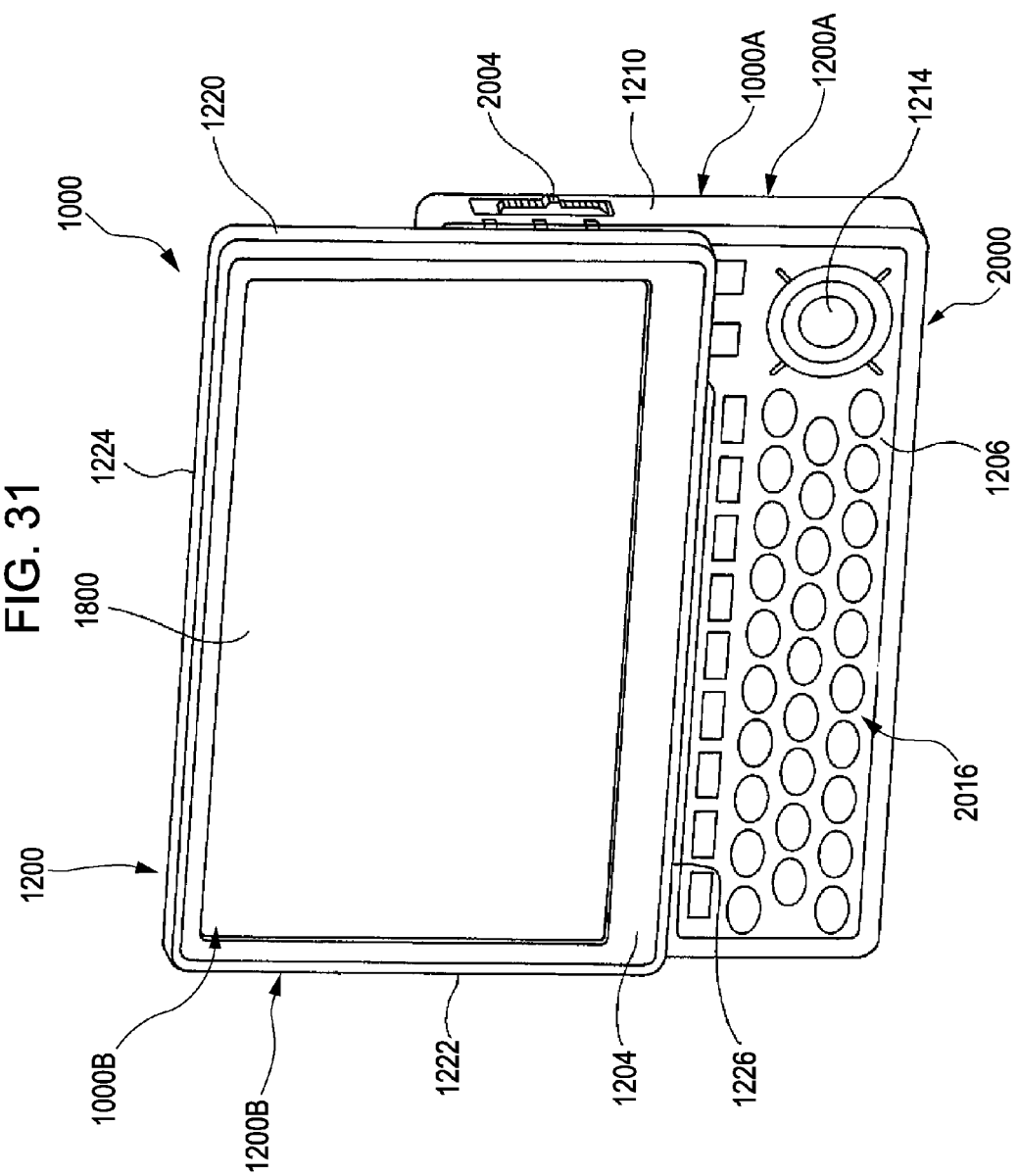
FIG. 31 is a rear perspective view of an image capturing apparatus 1000 according to the fourth embodiment.
Figure 32:
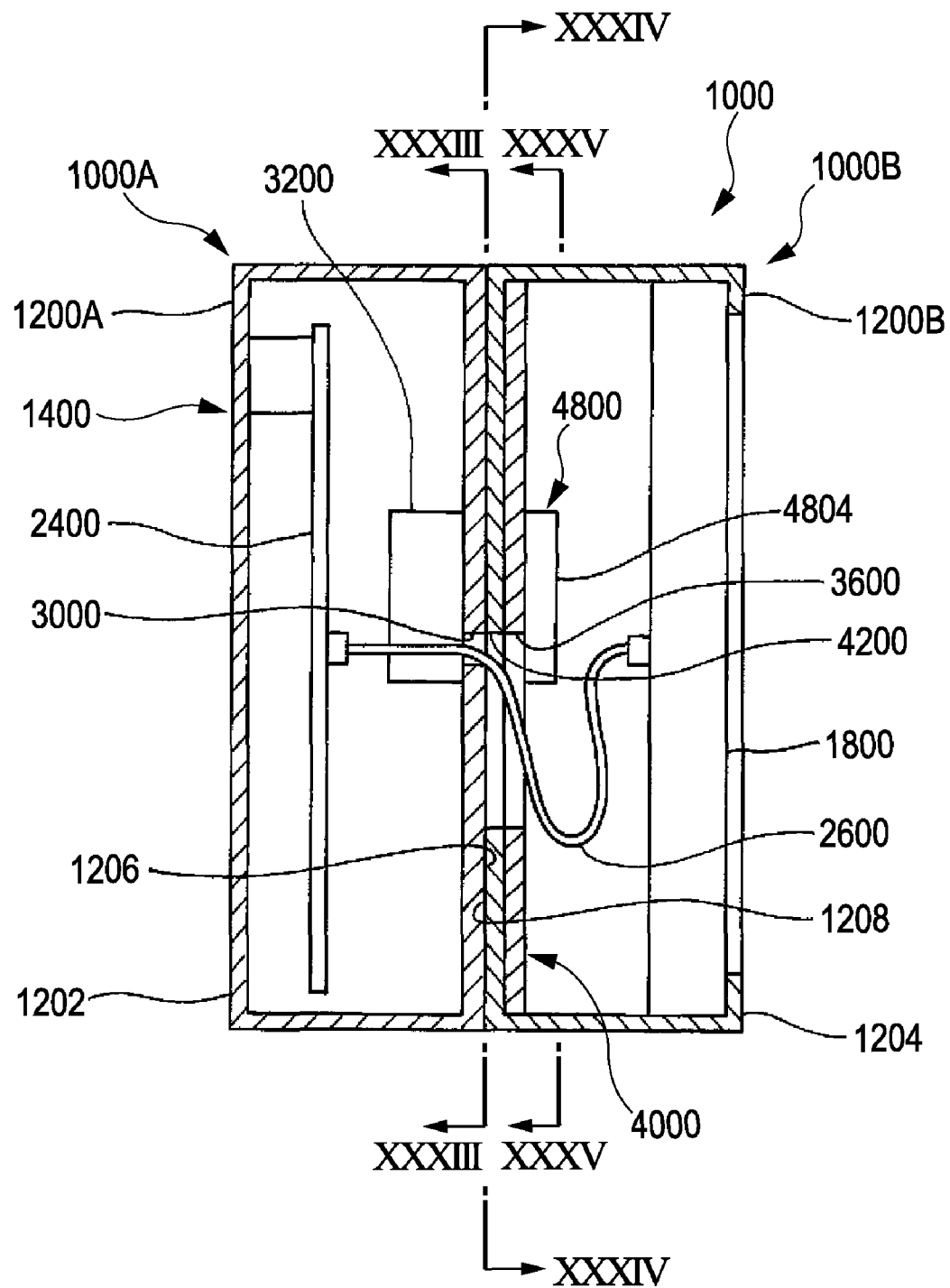
FIG. 32 is a cross-sectional view of the image capturing apparatus 1000 according to the fourth exemplary embodiment.
Figure 35:
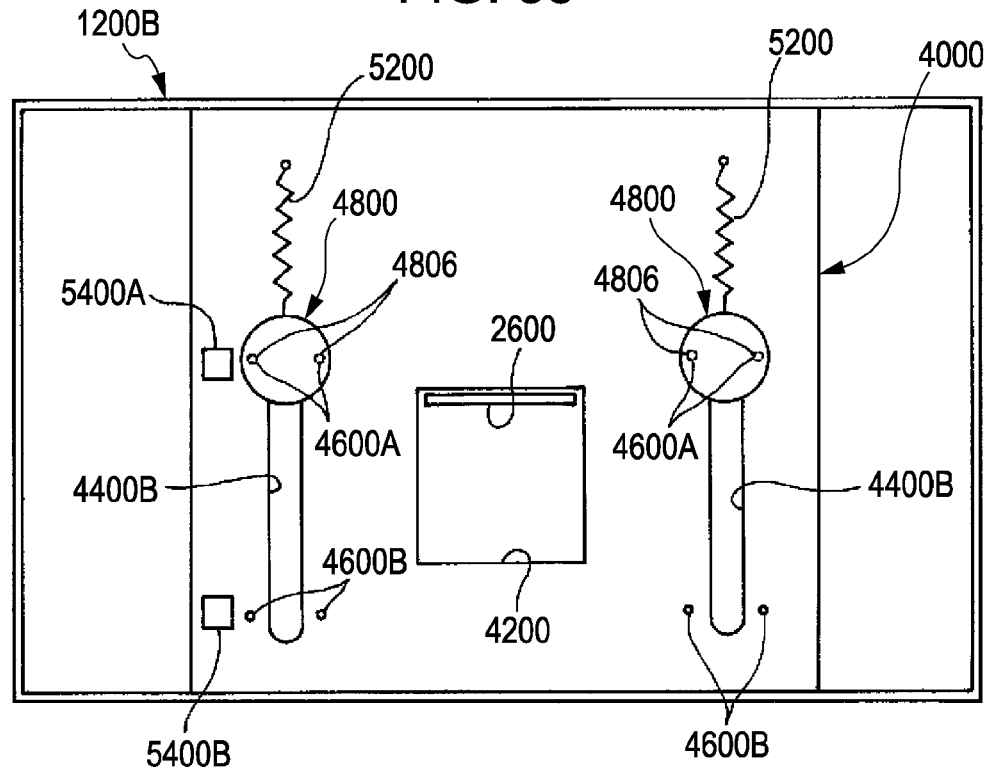
FIG. 35 is a view in the direction of arrows XXXV-XXXV of FIG. 32.
Figure 36:
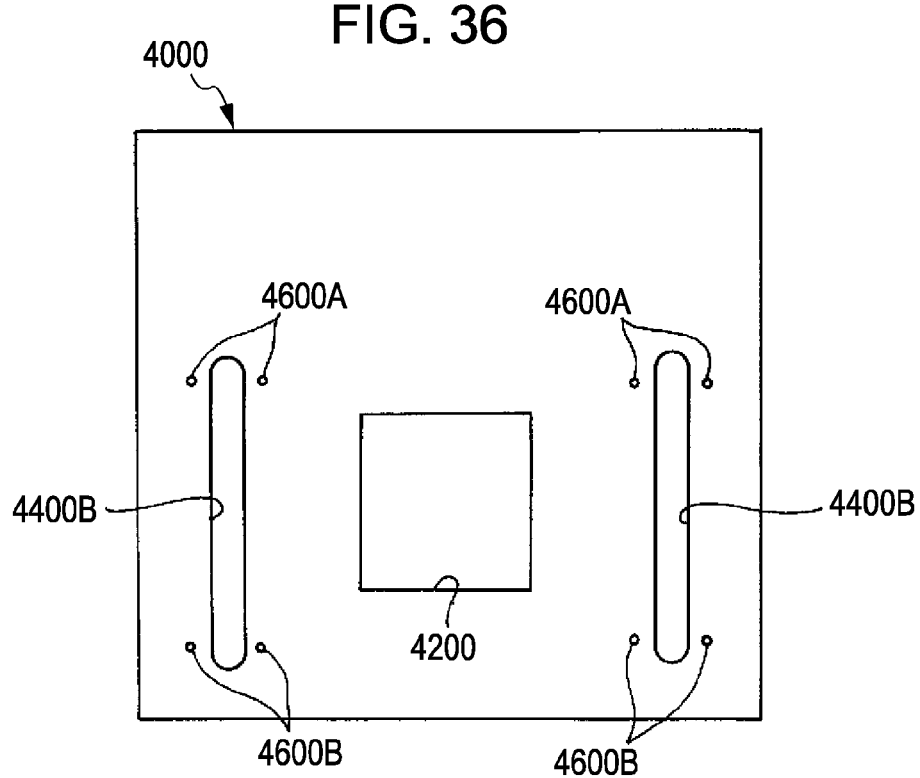
FIG. 36 is a plan view of a guide plate 4000.

FIG. 31 is a rear perspective view of an image capturing apparatus 1000 according to the fourth exemplary embodiment. FIG. 32 is a cross-sectional view of the image capturing apparatus 1000 according to the fourth exemplary embodiment. FIG. 33 is a view in the direction of arrows XXXIII-XXXIII of FIG. 32. FIG. 34 is a view in the direction of arrows XXXIV-XXXIV of FIG. 32. FIG. 35 is a view in the direction of arrows XXXV-XXXV of FIG. 32. FIG. 36 is a plan view of a guide plate 4000. Note that FIG. 32 corresponds to a view in the direction of arrows XXXII-XXXII of FIG. 33.

In the following description, the components of the image capturing apparatus 1000 which correspond to the components of the image capturing apparatus 1000 according to the third exemplary embodiment have the same reference numerals.

Like the third exemplary embodiment, in the fourth embodiment, the camera body chassis 1200A is overlapped with the display unit chassis 1200B so that the back surface 1206 and the front surface 1208 are relatively moved with respect to each other and exhibit the following two states. In a first state, as shown in FIGS. 17A and 17B, the camera body chassis 1200A overlaps the display unit chassis 1200B so that the outline of the image capturing apparatus 1000 is minimized when viewed in the thickness direction. In a second state, as shown in FIG. 31, the back surface 1206 of the camera body chassis 1200A is partially exposed from the display unit chassis 1200B so that the outline of the image capturing apparatus 1000 is larger than that in the first state when viewed in the thickness direction.

In the fourth embodiment, the camera body chassis 1200A moves relative to the display unit chassis 1200B in the vertical direction so as to exhibit the first state and the second state.

Additionally, in the fourth embodiment, an area of the back surface of the camera body chassis 1200A exposed from the display unit chassis 1200B is an area of the back surface 1206 of the camera body chassis 1200A that extends along one of the two long sides of the back surface 1206.

As shown in FIGS. 32 and 33, a groove 3000 for allowing the flexible board 2600 to pass therethrough is formed in the center area of the back surface 1206 of the camera body chassis 1200A (in the horizontal and vertical directions). In addition, two boss portions 3200 are formed so as to protrude from the two positions on the inner side of the back surface 1206 of the camera body chassis 1200A, one of which is on the left side of the groove 3000 and the other is on the right side of the groove 3000. A pin fitting hole 3400 is formed in each of the boss portions 3200.

In contrast, as shown in FIG. 34, a groove 3600 for allowing the flexible board 2600 to pass therethrough is formed in the horizontal center area of the front surface 1208 of the display unit chassis 1200B so as to extend vertically.

Additionally, two pin insertion grooves 3800 are formed at two positions on the front surface 1208 of the display unit chassis 1200B, one of which is on the left side of the groove 3000 and the other is on the right side of the groove 3000. The pin insertion grooves 3800 extend vertically.

Furthermore, as shown in FIGS. 32, 35, and 36, a guide plate 4000 is mounted on the inner surface of the front surface 1208 of the display unit chassis 1200B. The guide plate 4000 is formed from a material having strength and rigidity higher than those of the material of the display unit chassis 1200B.

A groove 4200 and two guide grooves 4400B are formed on the guide plate 4000 at positions corresponding to the groove 3600 and the pin insertion grooves 3800, respectively.

Additionally, a first protrusion 4600A is formed on both sides of the upper end portion of each of the two guide groove 4400B whereas a second protrusion 4600B is formed on both sides of the lower end portion of each of the two guide groove 4400B.

As shown in FIG. 32, the front surface 1202 of the camera body chassis 1200A is overlapped with the front surface 1208 of the display unit chassis 1200B. A shaft 4802 of a guide pin 4800 passes through the guide groove 4400 of the guide plate 4000 and the pin insertion groove 3800 of the front surface 1208 and fits the pin fitting hole 3400 of the boss portions 3200 of the camera body chassis 1200A. The orientation of a head 4804 of the guide pin 4800 is adjusted so that fitting recesses 4806 formed on the lower surface of the head 4804 of the guide pin 4800 fit the first protrusions 4600A and the second protrusion 4600B of the guide plate 4000. After the orientation of the head 4804 is adjusted, the guide pin 4800 is secured to the boss portion 3200 using an adhesive agent 5000.

In this way, the back surface 1206 of the camera body chassis 1200A is overlapped with the front surface 1208 of the display unit chassis 1200B such that the back surface 1206 of the camera body chassis 1200A is moved with respect to the front surface 1208 of the display unit chassis 1200B.

Additionally, as shown in FIG. 35, a coil spring 5200 is provided between the head 4804 of the guide pin 4800 and the front surface 1208 of the display unit chassis 1200B so as to press the guide pin 4800 against an end of the guide groove 4400B.

That is, as shown in FIGS. 32 and 35, when the guide pin 4800 is placed at the upper end of the guide groove 4400B, the first state is achieved in which the camera body chassis 1200A overlaps the display unit chassis 1200B so that the outline of the image capturing apparatus 1000 is minimized when viewed in the thickness direction.

Additionally, when the guide pin 4800 is placed at the lower end of the guide groove 4400B, the second state is achieved in which the back surface 1206 of the camera body chassis 1200A is partially exposed from the display unit chassis 1200B, as shown in FIG. 31, so that the outline of the image capturing apparatus 1000 is larger than that in the first state when viewed in the thickness direction.

That is, when the fitting recess 4806 on the lower surface of the head 4804 of the guide pin 4800 fits the first protrusion 4600A of the guide plate 4000, the first state shown in FIGS. 17A and 17B is achieved.

When the fitting recess 4806 on the lower surface of the head 4804 of the guide pin 4800 fits the second protrusion 4600B of the guide plate 4000, the second state shown in FIG. 31 is achieved.

When a user moves the camera body chassis 1200A relative to the display unit chassis 1200B, the fitting recess 4806 fits the first protrusion 4600A and the second protrusion 4600B. Thus, each time the image capturing apparatus 1000 enters the first state or the second state, the user feels a click sensation and the selected first or second state can be maintained.

In addition, since the coil spring 5200 is provided, the camera body chassis 1200A and the display unit chassis 1200B are pressed against each other so that the first state is achieved. Accordingly, when the user moves the camera body chassis 1200A and the display unit chassis 1200B from the first state to the second state, the image capturing apparatus 1000 can provide the user with a sense of resistance. In addition, when the image capturing apparatus 1000 is returned from the second state to the first state, the biasing force of the lock portion 52 acts. Therefore, by applying only a weak operation force, the user can return the image capturing apparatus 1000 to the first state.

Accordingly, in the present embodiment, the guide pin 4800, the fitting recess 4806, the first protrusion 4600A, and the second protrusion 4600B can form a click mechanism that stops and maintains the camera body chassis 1200A and the display unit chassis 1200B in the first state or the second state.

Additionally, as shown in FIG. 35, the guide plate 4000 includes a first proximity switch 5400A for detecting that the guide pin 4800 is engaged with the first protrusion 4600A and outputting a position detection signal and a second proximity switch 5400B for detecting that the guide pin 4800 is engaged with the second protrusion 4600B and outputting a position detection signal. Like the third exemplary embodiment, these first proximity switch 5400A and second proximity switch 5400B form a position detecting unit 1018 (see FIG. 26).

In the fourth embodiment, the optical member 1402 of the photographing optical system 1400 is disposed on the front surface 1202 at a location shifted from the horizontal center line of the front surface 1202 in a direction away from the exposed area of the back surface 1206 of the camera body chassis 1200A in the second state. Accordingly, in the second state, the optical axis of the photographing optical system 1400 can be placed close to the center of the display panel 1800, so that, in the second state, the shift between the position of the subject when the user directly views the subject and the position of the subject displayed on the display panel 1800 in the vertical direction can be decreased. Thus, the ease of operation can be advantageously improved during image capture.

That is, the image capturing apparatus 1000 includes the photographing optical system 1400. The image capturing apparatus 1000 further includes the camera body 1000A and the display unit 1000B separated in the forward-backward direction. The photographing optical system 1400 is included in the camera body 1000A. The photographing optical system 1400 includes the optical member 1402 that is disposed on the front surface 1202 of the camera body 1000A at a location shifted from the horizontal center line of the front surface 1202 towards one end portion of the display unit 1000B in the vertical direction. The camera body 1000A is overlapped with the display unit 1000B so that the back surface 1206 of the camera body 1000A is movable relative to the front surface 1208 of the display unit 1000B between a first state and a second state. In the first state, the camera body 1000A overlaps the display unit 1000B so that the outline of the image capturing apparatus 1000 is minimized when viewed in the forward-backward direction. In a second state, the camera body 1000A is partially exposed from the other end portion of the display unit 1000B so that the outline of the image capturing apparatus 1000 is larger than that in the first state when viewed in the forward-backward direction. Accordingly, in the second state, the optical axis of the photographing optical system 1400 can be located close to the center of the display panel 1800 in the vertical direction, and therefore, in the second state, the shift between the position of the subject when the user directly views the subject and the position of the subject displayed on the display panel 1800 in the vertical direction can be decreased. Thus, the ease of operation can be advantageously improved during image capture.

More specifically, the image capturing apparatus 1000 includes the chassis 1200 having a thin tabular shape and the photographing optical system 1400 incorporated in the chassis 1200. The chassis 1200 has a certain thickness, the left and right width greater than that thickness, and the height (in the vertical direction) greater than that thickness. The chassis 1200 has the front surface 1202 and the back surface 1204 on either side thereof in the thickness direction. The image capturing apparatus 1000 includes the camera body 1000A and the display unit 1000B separated in the thickness direction. The chassis 1200 includes the camera body chassis 1200A serving as a chassis of the camera body 1000A and the display unit chassis 1200B serving as a chassis of the display unit 1000B. The photographing optical system 1400 is incorporated in the camera body chassis 1200A. The photographing optical system 1400 includes the optical member 1402 disposed in the window 1203 formed on the front surface 1202 of the camera body chassis 1200A at a location shifted from the horizontal center line of the front surface 1202 to one end portion of the display unit chassis 1200B in the vertical direction. The camera body chassis 1200A is overlapped with the display unit chassis 1200B so that the back surface 1206 and the front surface 1208 are relatively moved with respect to each other and exhibit the following first and second states. In the first state, the camera body chassis 1200A overlaps the display unit chassis 1200B so that the outline of the image capturing apparatus 1000 is minimized when viewed in the thickness direction. In the second state, the back surface 1206 of the camera body chassis 1200A is partially exposed from the other end portion of the display unit chassis 1200B so that the outline of the image capturing apparatus 1000 is larger than that in the first state when viewed in the thickness direction. Accordingly, in the second state, the optical axis of the photographing optical system 1400 can be located close to the center of the display panel 1800 in the vertical direction, and therefore, in the second state, the shift between the position of the subject when the user directly views the subject and the position of the subject displayed on the display panel 1800 in the vertical direction can be decreased. Thus, the ease of operation can be advantageously improved during image capture.

As noted above, this fourth exemplary embodiment can provide the same advantages as those of the third exemplary embodiment.

Fifth Exemplary Embodiment

A fifth exemplary embodiment is described next.

Unlike the third exemplary embodiment, in the fifth exemplary embodiment, the camera body chassis 1200A moves relative to the display unit chassis 1200B in both the horizontal and vertical directions.

Figure 38A:
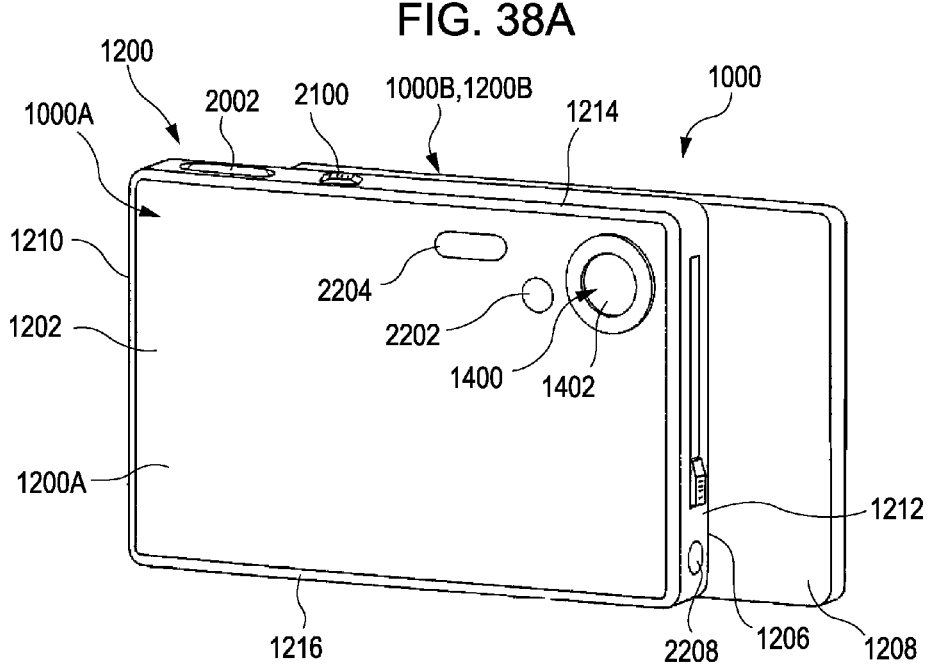
FIG. 38A is another front perspective view of an image capturing apparatus 1000 according to the fifth exemplary embodiment.
Figure 38B:
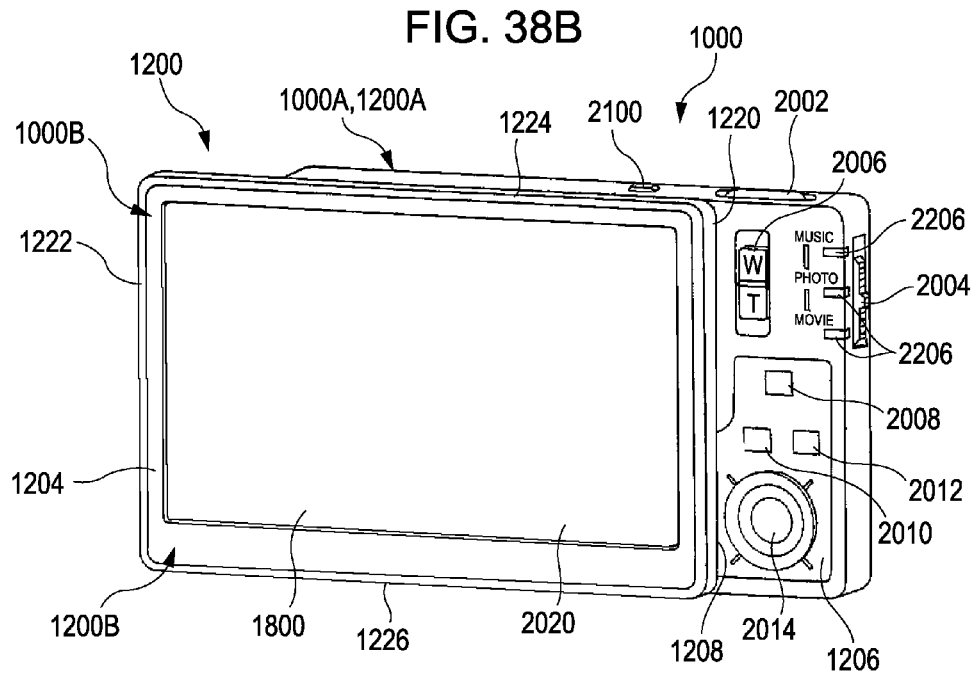
FIG. 38B is another rear perspective view of the image capturing apparatus 1000 according to a fifth exemplary embodiment.
Figure 39:
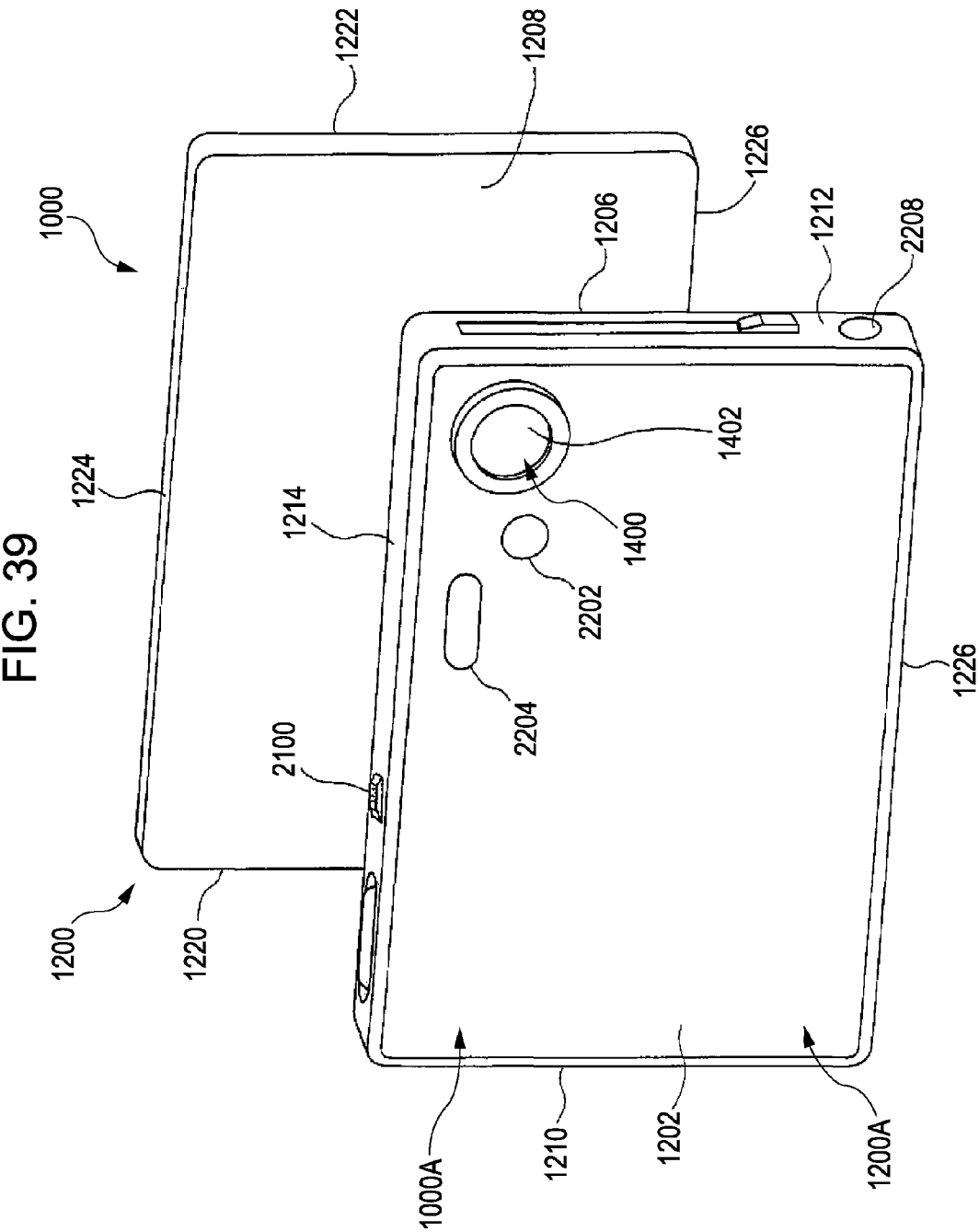
FIG. 39 is another front perspective view of the image capturing apparatus 1000 according to the fifth exemplary embodiment.
Figure 40:
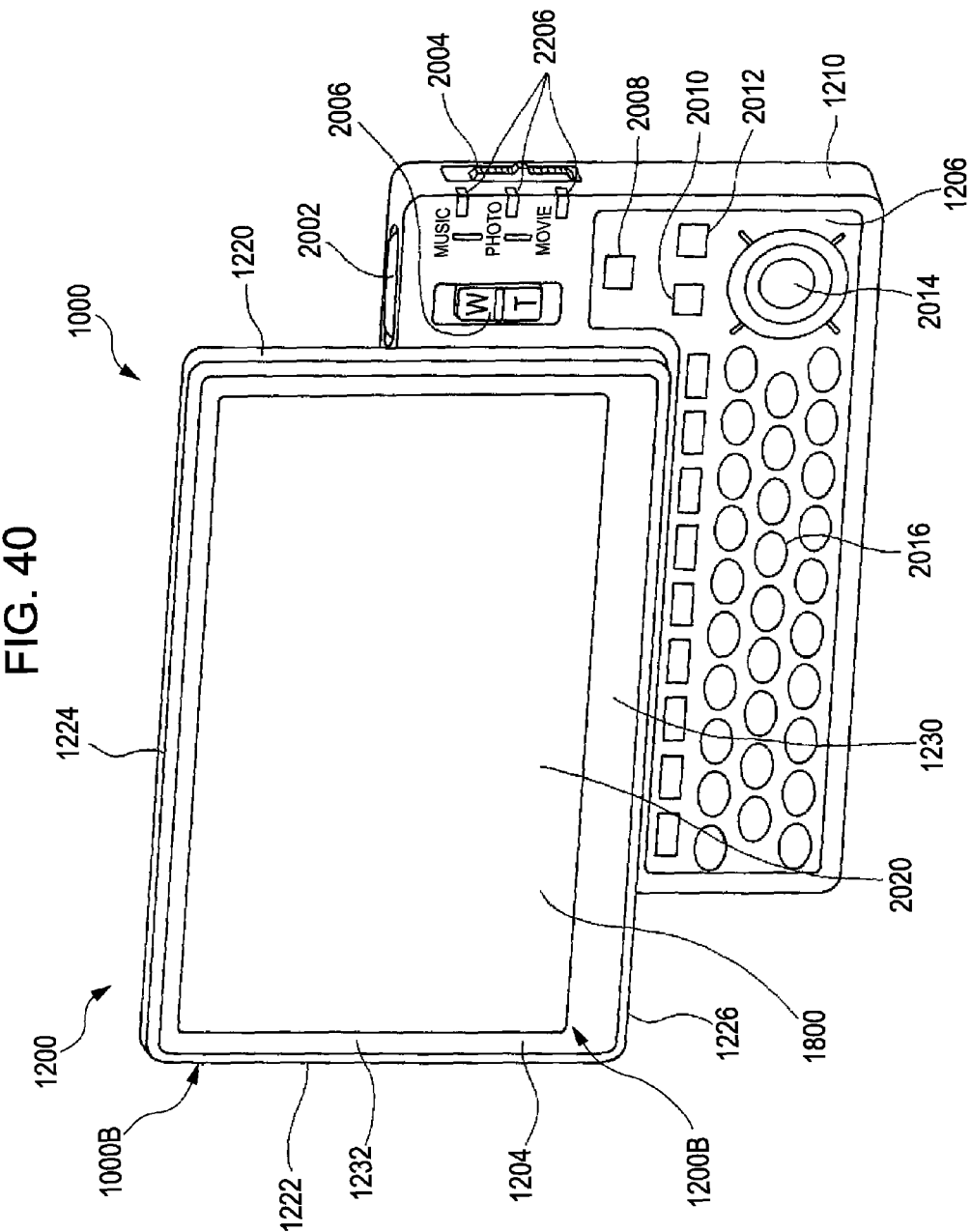
FIG. 40 is another rear perspective view of the image capturing apparatus 1000 according to the fifth exemplary embodiment.

FIG. 37A is a front perspective view of an image capturing apparatus 1000 according to a fifth exemplary embodiment. FIG. 37B is a rear perspective view of the image capturing apparatus 1000. FIG. 38A is another front perspective view of an image capturing apparatus 1000 according to the fifth exemplary embodiment. FIG. 38B is another rear perspective view of the image capturing apparatus 1000 according to the fifth exemplary embodiment. FIG. 39 is another front perspective view of the image capturing apparatus 1000 according to the fifth exemplary embodiment. FIG. 40 is another rear perspective view of the image capturing apparatus 1000 according to the fifth exemplary embodiment.

Like the third exemplary embodiment, in the fifth embodiment, as shown in FIG. 37, the camera body chassis 1200A is overlapped with the display unit chassis 1200B so that the back surface 1206 and the front surface 1208 are relatively moved with respect to each other and exhibit the following first and second states. In the first state, as shown in FIGS. 37A and 37B, the camera body chassis 1200A overlaps the display unit chassis 1200B so that the outline of the image capturing apparatus 1000 is minimized when viewed in the thickness direction. In the second state, as shown in FIGS. 38A-B to 40, the back surface 1206 of the camera body chassis 1200A is partially exposed from the display unit chassis 1200B so that the outline of the image capturing apparatus 1000 is larger than that in the first state when viewed in the thickness direction.

Additionally, in the fifth embodiment, the camera body chassis 1200A moves relative to the display unit chassis 1200B in the horizontal direction so that the image capturing apparatus 1000 enters a third state whereas the camera body chassis 1200A moves relative to the display unit chassis 1200B in the vertical direction so that the image capturing apparatus 1000 enters a fourth state.

That is, in the fifth embodiment, the direction in which the camera body chassis 1200A moves relative to the display unit chassis 1200B between the first state and the third state is perpendicular to the direction in which the camera body chassis 1200A moves relative to the display unit chassis 1200B between the third state and the fourth state.

Furthermore, in the fifth embodiment, the second state includes the third and fourth states. In the third state, as shown in FIG. 38B, a first area of the back surface 1206 of the camera body chassis 1200A is exposed from the display unit chassis 1200B. In the fourth state, as shown in FIG. 40, a second area of the back surface 1206 of the camera body chassis 1200A different from the first area is exposed from the display unit chassis 1200B in addition to the first surface.

Still furthermore, in the fifth embodiment, an area of the back surface 1206 of the camera body chassis 1200A that is exposed from the display unit chassis 1200B in the third state is an area extending along one of two short sides of the back surface 1206 of the camera body chassis 1200A. In contrast, an area on the back surface 1206 of the camera body chassis 1200A that is exposed from the display unit chassis 1200B in the fourth state is an area that includes an area extending along one of two short sides of the back surface 1206 of the camera body chassis 1200A and an area extending along one of two long sides of the back surface 1206 of the camera body chassis 1200A.

Figure 41:
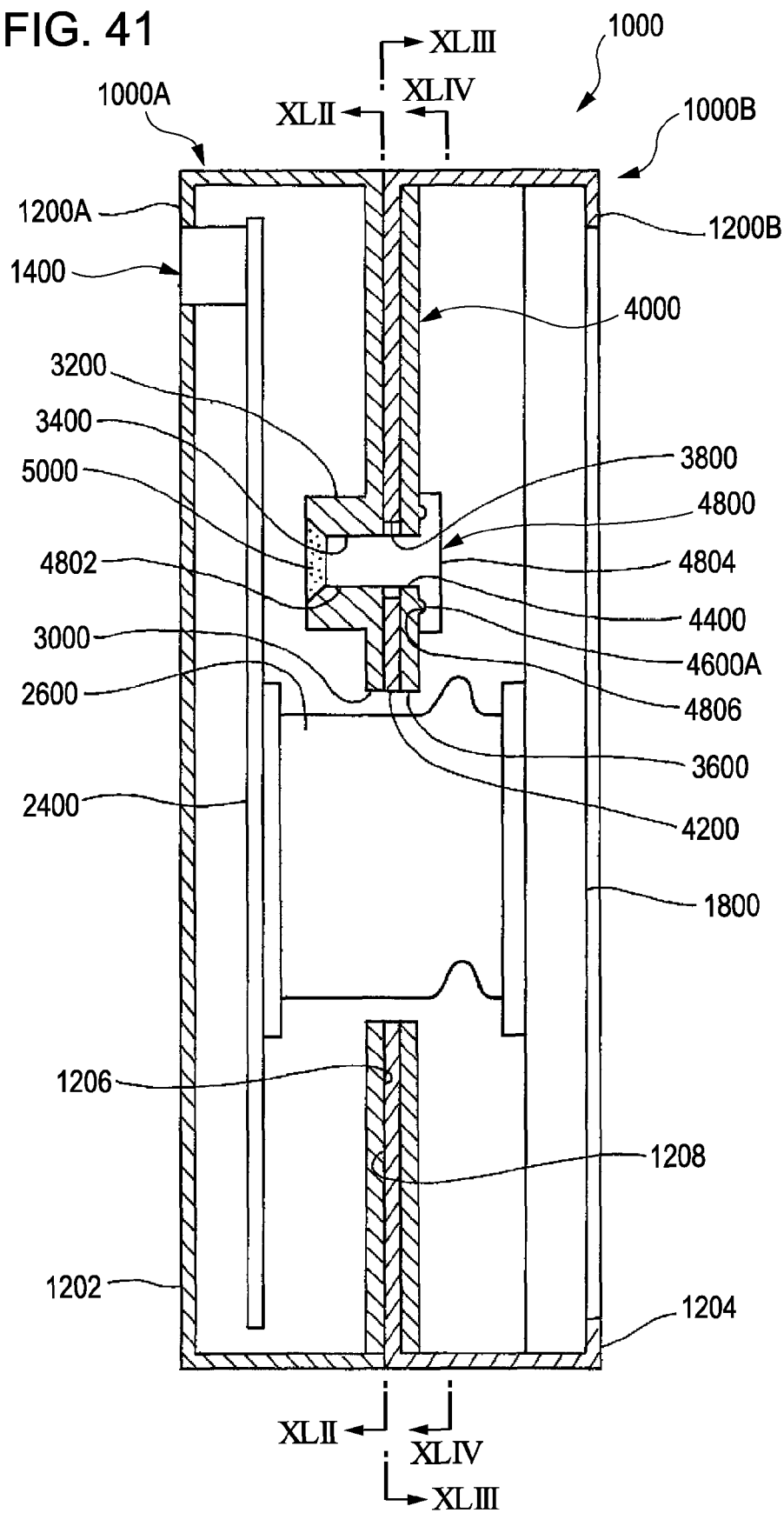
FIG. 41 is a cross-sectional view of the image capturing apparatus 1000 according to the fifth exemplary embodiment.
Figure 42:
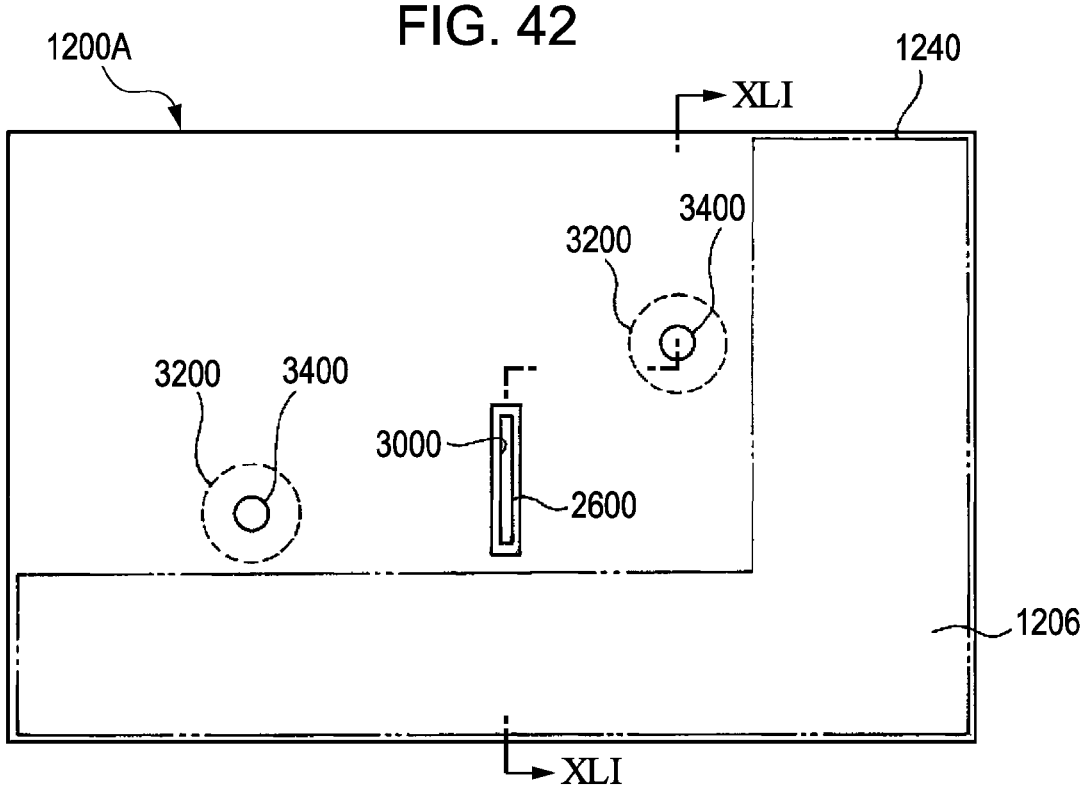
FIG. 42 is a view in the direction of arrows XLII-XLII of FIG. 41.
Figure 43:
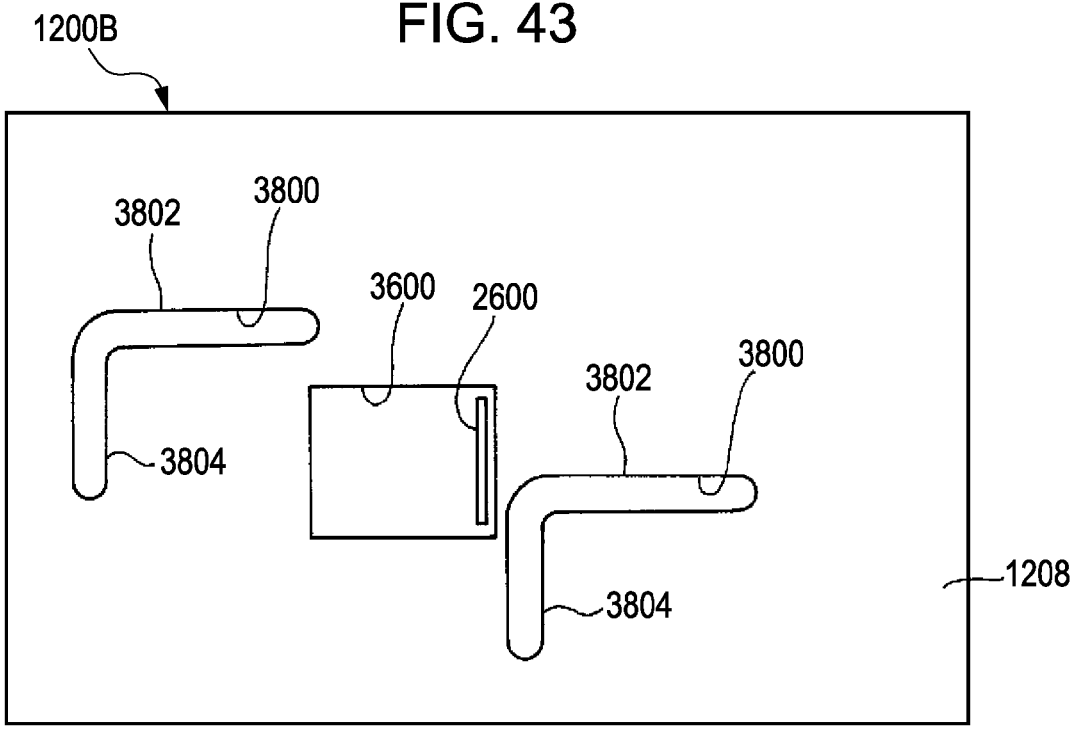
FIG. 43 is a view in the direction of arrows XLIII-XLIII of FIG. 41.
Figure 44:
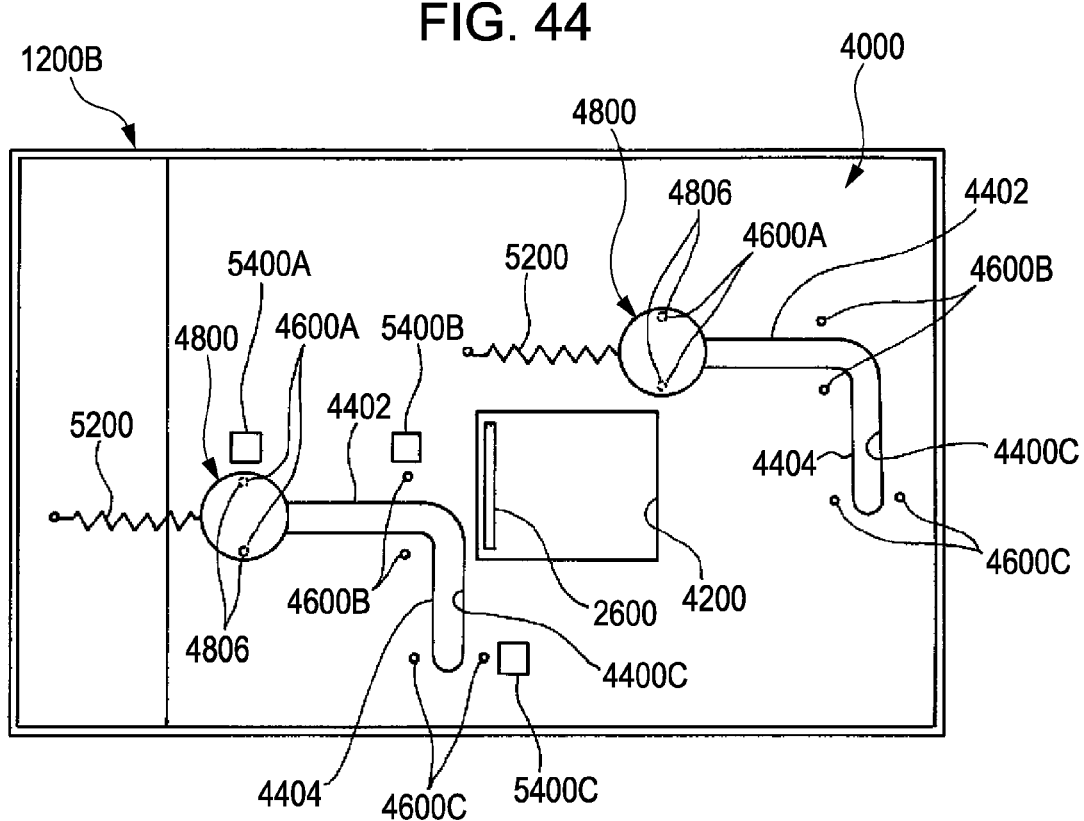
FIG. 44 is a view in the direction of arrows XLIV-XLIV of FIG. 41.
Figure 45:
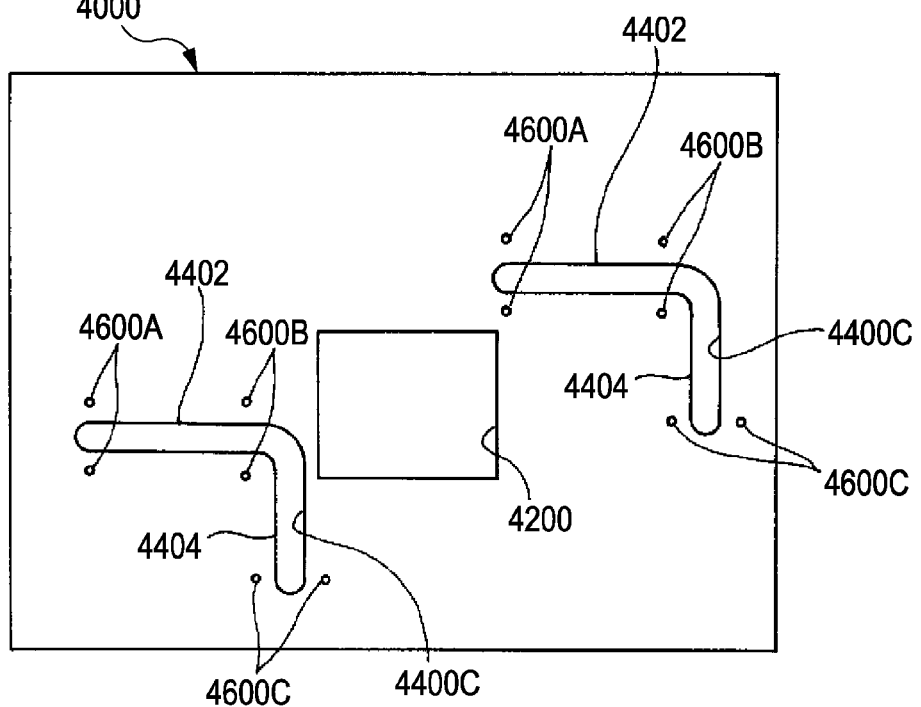
FIG. 45 is a plan view of a guide plate 4000.

FIG. 41 is a cross-sectional view of the image capturing apparatus 1000 according to the fifth exemplary embodiment. FIG. 42 is a view in the direction of arrows XLII-XLII of FIG. 41. FIG. 43 is a view in the direction of arrows XLIII-XLIII of FIG. 41. FIG. 44 is a view in the direction of arrows XLIV-XLIV of FIG. 41. FIG. 45 is a plan view of a guide plate 4000. Note that FIG. 41 corresponds to a view in the direction of arrows XLI-XLI of FIG. 42.

As shown in FIGS. 41 and 42, a groove 3000 for allowing the flexible board 2600 to pass therethrough is formed in the center area of the back surface 1206 of the camera body chassis 1200A (in the horizontal and vertical directions). In addition, two boss portions 3200 are formed so as to protrude from the inner surface of the back surface 1206 of the camera body chassis 1200A at two locations on the left and right sides of the groove 3000. Also, these two locations are separated in the vertical direction. A pin fitting hole 3400 is formed in each of the boss portions 3200.

In contrast, as shown in FIG. 43, a groove 3600 for allowing the flexible board 2600 to pass therethrough is formed in the vicinity of the center in the horizontal direction and in the middle portion in the vertical direction of the front surface 1208 of the display unit chassis 1200B so as to extend horizontally.

Additionally, two pin insertion grooves 3800 are formed at two positions on the front surface 1208 of the display unit chassis 1200B, one of which is on the left side of the groove 3000 and the other is on the right side of the groove 3000. Also, the two pin insertion grooves 3800 are separated in the vertical direction.

Each of the pin insertion grooves 3800 includes a lateral groove portion 3802 that extends horizontally and a longitudinal groove portion 3804 that is connected to the left end of the lateral groove portion 3802 and extends downwardly and perpendicularly to the lateral groove portion 3802.

Furthermore, as shown in FIGS. 44 and 45, a guide plate 4000 is mounted on the inner surface of the front surface 1208 of the display unit chassis 1200B. The guide plate 4000 is formed from a material having strength and rigidity higher than those of the material of the display unit chassis 1200B.

A groove 4200 and two guide grooves 4400C are formed on the guide plate 4000 at positions corresponding to the groove 3600 and the pin insertion grooves 3800, respectively.

That is, each of the guide grooves 4400C includes a lateral groove portion 4402 corresponding to the lateral groove portion 3802 and a longitudinal groove portion 4404 corresponding to the lateral groove portion 3802. The lateral groove portion 4402 extends horizontally, and the longitudinal groove portion 4404 is connected to the left end of the lateral groove portion 4402 and extends downwardly and perpendicularly to the lateral groove portion 4402.

Additionally, first protrusions 4600A, second protrusions 4600B, and third protrusions 4600C are formed along each of the guide grooves 4400C with a predetermined spacing therebetween.

That is, the first protrusion 4600A is formed on both sides of the right end portion of each of the two lateral groove portions 4402. The second protrusion 4600B is formed on both sides of the left end portion of each of the two lateral groove portions 4402. The third protrusion 4600C is formed on both sides of the lower end portion of each of the longitudinal groove portions 4404.

As shown in FIG. 41, the front surface 1202 of the camera body chassis 1200A is overlapped with the front surface 1208 of the display unit chassis 1200B. A shaft 4802 of a guide pin 4800 passes through the guide groove 4400 of the guide plate 4000 and the pin insertion groove 3800 of the front surface 1208 and fits the pin fitting hole 3400 of the boss portions 3200 of the camera body chassis 1200A. The orientation of a head 4804 of the guide pin 4800 is adjusted so that fitting recesses 4806 formed on the lower surface of the head 4804 of the guide pin 4800 fit the first to third protrusions 4600A, 4600B, and 4600C of the guide plate 4000. After the orientation of the head 4804 is adjusted, the guide pin 4800 is secured to the boss portion 3200 using an adhesive agent 5000.

In this way, the back surface 1206 of the camera body chassis 1200A is overlapped with the front surface 1208 of the display unit chassis 1200B such that the back surface 1206 of the camera body chassis 1200A is moved with respect to the front surface 1208 of the display unit chassis 1200B.

Furthermore, as shown in FIG. 44, a coil spring 5200 is provided between the head 4804 of the guide pin 4800 and the front surface 1208 of the display unit chassis 1200B so as to press the guide pin 4800 against an end of the guide groove 4400C (the right end of the lateral groove portion 4402).

That is, as shown in FIG. 44, when the guide pin 4800 is placed at an end (the right end) of the lateral groove portion 4402, the first state is achieved in which the camera body chassis 1200A overlaps the display unit chassis 1200B so that the outline of the image capturing apparatus 1000 is minimized when viewed in the thickness direction.

Additionally, when the guide pin 4800 is placed at an end (the left end) of the lateral groove portion 4402 or the lower end of the longitudinal groove portion 4404, the second state is achieved in which the back surface 1206 of the camera body chassis 1200A is partially exposed from the display unit chassis 1200B so that the outline of the image capturing apparatus 1000 is larger than that in the first state when viewed in the thickness direction.

More specifically, the second state includes the following third and fourth states. In the third state, as shown in FIGS. 38A and 38B, a first area of the back surface 1206 of the camera body chassis 1200A is exposed from the display unit chassis 1200B. In the fourth state, as shown in FIGS. 39 and 40, a second area different from the first area of the back surface 1206 of the camera body chassis 1200A is exposed from the display unit chassis 1200B in addition to the first area.

That is, when the fitting recess 4806 on the lower surface of the head 4804 of the guide pin 4800 fits the first protrusion 4600A of the guide plate 4000, the first state shown in FIGS. 37A and 37B is achieved.

When the fitting recess 4806 on the lower surface of the head 4804 of the guide pin 4800 fits the second protrusion 4600B of the guide plate 4000, the third state shown in FIG. 38 is achieved.

Furthermore, when the fitting recess 4806 on the lower surface of the head 4804 of the guide pin 4800 fits the third protrusion 4600C of the guide plate 4000, the fourth state shown in FIGS. 39 and 40 is achieved.

When a user moves the camera body chassis 1200A relative to the display unit chassis 1200B, the fitting recess 4806 fits the first protrusion 4600A, the second protrusion 4600B, or the third protrusion 4600C. Thus, each time the image capturing apparatus 1000 enters the first state, the third state, or the fourth state, the user feels a click sensation and the selected first, third, or fourth state can be maintained.

In addition, since the coil spring 5200 is provided, the camera body chassis 1200A and the display unit chassis 1200B are pressed against each other so that the first state is achieved. Accordingly, when the user moves the camera body chassis 1200A and the display unit chassis 1200B from the first state to the third, and then to the fourth state, the image capturing apparatus 1000 can provide the user with a sense of resistance. In addition, when the image capturing apparatus 1000 is returned from the fourth state to the third state, and then to the first state, the biasing force of the lock portion 52 acts. Therefore, by applying only a weak operation force, the user can return the image capturing apparatus 1000 to the first state.

Accordingly, in the present exemplary embodiment, the guide pin 4800, the fitting recess 4806, and the first to third protrusions 4600A, 4600B, and 4600C can form a click mechanism that stops and maintains the camera body chassis 1200A and the display unit chassis 1200B in the first state, the third state, or the fourth state.

Additionally, as shown in FIG. 44, the guide plate 4000 includes a first proximity switch 5400A for detecting that the guide pin 4800 is engaged with the first protrusion 4600A and outputting a position detection signal, a second proximity switch 5400B for detecting that the guide pin 4800 is engaged with the second protrusion 4600B and outputting a position detection signal, and a third proximity switch 5400C for detecting that the guide pin 4800 is engaged with the third protrusion 4600C and outputting a position detection signal. Like the third exemplary embodiment, these first to third proximity switches 5400A, 5400B, and 5400C form a position detecting unit 1018 (see FIG. 26).

Like the fourth exemplary embodiment, in the fifth exemplary embodiment, the optical member 1402 of the photographing optical system 1400 is disposed on the front surface 1202 at a location shifted from the center of the front surface 1202 in a direction away from the exposed area of the back surface 1206 of the camera body chassis 1200A in the second state. Thus, the position of the optical axis of the photographing optical system 1400 can be located close to the center point of the display panel 1800 in the second state. Accordingly, in the second state, the offset between the position of the subject when the user directly views the subject and the position of the subject displayed on the display panel 1800 in the horizontal and vertical directions can be decreased. Thus, the ease of operation can be advantageously improved during image capture.

As noted above, the fifth exemplary embodiment also can provide the same advantages as those of the third exemplary embodiment. It should be noted that, in the fifth exemplary embodiment, since two areas of the back surface 1206 of the camera body chassis 1200A, namely, an area that extends along one of two short sides of the back surface 1206 and an area that extends along one of two long sides of the back surface 1206 are exposed from the display unit chassis 1200B, the layout of the operation unit 2000 can be freely determined compared with the fourth embodiment.

Sixth Exemplary Embodiment

A sixth exemplary embodiment is described next.

The sixth exemplary embodiment is a modification of the fifth exemplary embodiment. Unlike the fifth exemplary embodiment, in the sixth exemplary embodiment, the camera body chassis 1200A moves relative to the display unit chassis 1200B in an oblique direction with respect to the short sides and long sides of the camera body chassis 1200A and the display unit chassis 1200B. In addition, the camera body chassis 1200A and the display unit chassis 1200B move between the first state and the second state, and the second state does not include the third and fourth states.

For convenience of description, the following description is made with reference to FIGS. 37A, 37B, 39, and 40. Like the third exemplary embodiment, as shown in FIGS. 37A and 37B, the camera body chassis 1200A is overlapped with the display unit chassis 1200B so that the back surface 1206 and the front surface 1208 are relatively moved with respect to each other and exhibit the following first and second states. In the first state, as shown in FIGS. 37A and 37B, the camera body chassis 1200A overlaps the display unit chassis 1200B so that the outline of the image capturing apparatus 1000 is minimized when viewed in the thickness direction. In the second state, as shown in FIGS. 39 and 40, the back surface 1206 of the camera body chassis 1200A is partially exposed from the display unit chassis 1200B so that the outline of the image capturing apparatus 1000 is larger than that in the first state when viewed in the thickness direction.

Additionally, in the sixth embodiment, the camera body chassis 1200A moves relative to the display unit chassis 1200B in an oblique direction with respect to the short sides and long sides of the camera body chassis 1200A and the display unit chassis 1200B so that the image capturing apparatus 1000 enters a second state.

Furthermore, in the sixth embodiment, an area of the back surface 1206 of the camera body chassis 1200A that is exposed from the display unit chassis 1200B in the third state is an area that includes an area extending along one of two short sides of the back surface 1206 of the camera body chassis 1200A and an area extending along one of two long sides of the back surface 1206 of the camera body chassis 1200A.

Figure 46:
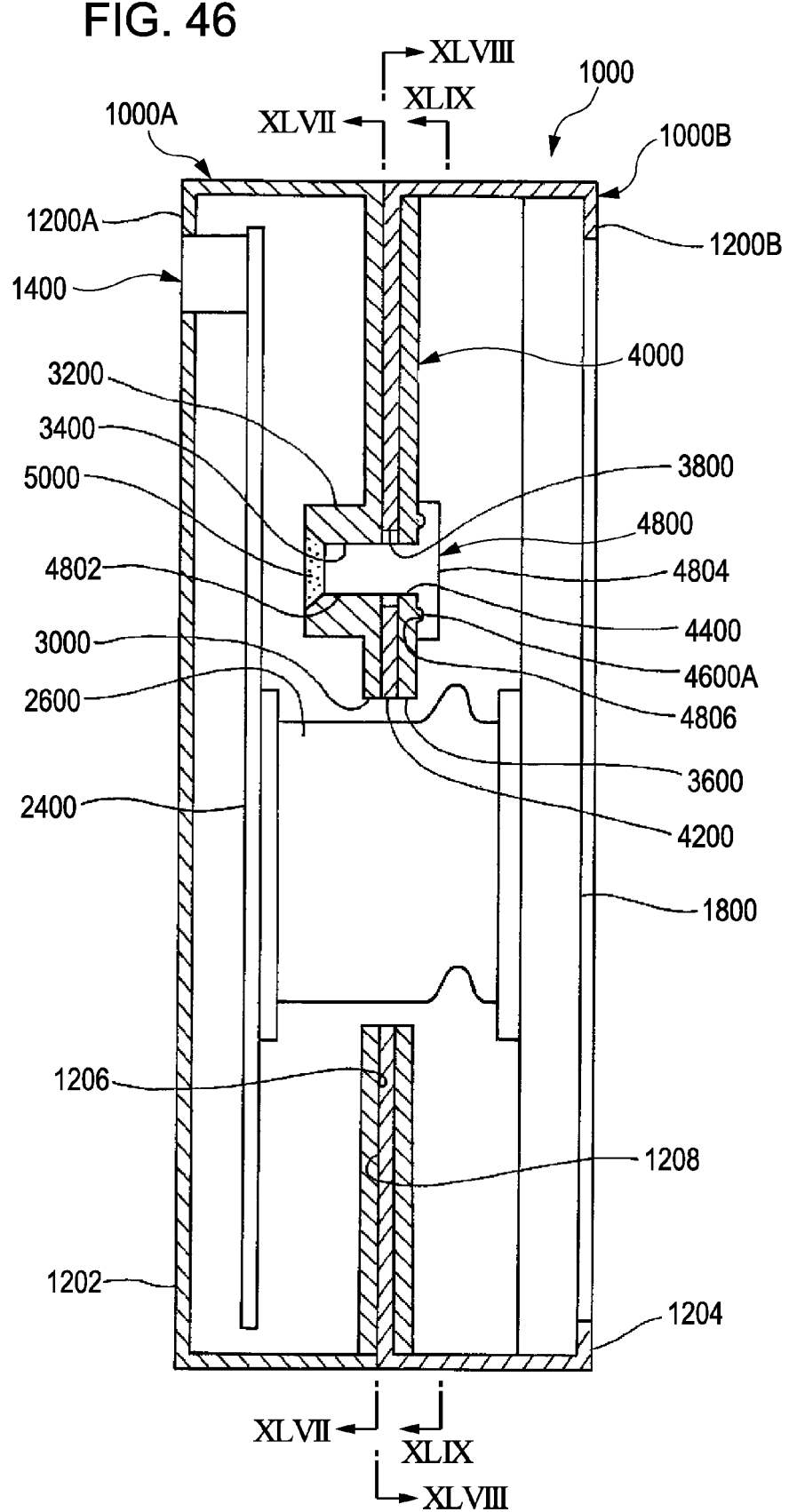
FIG. 46 is a cross-sectional view of an image capturing apparatus 1000 according to a sixth exemplary embodiment.
Figure 47:
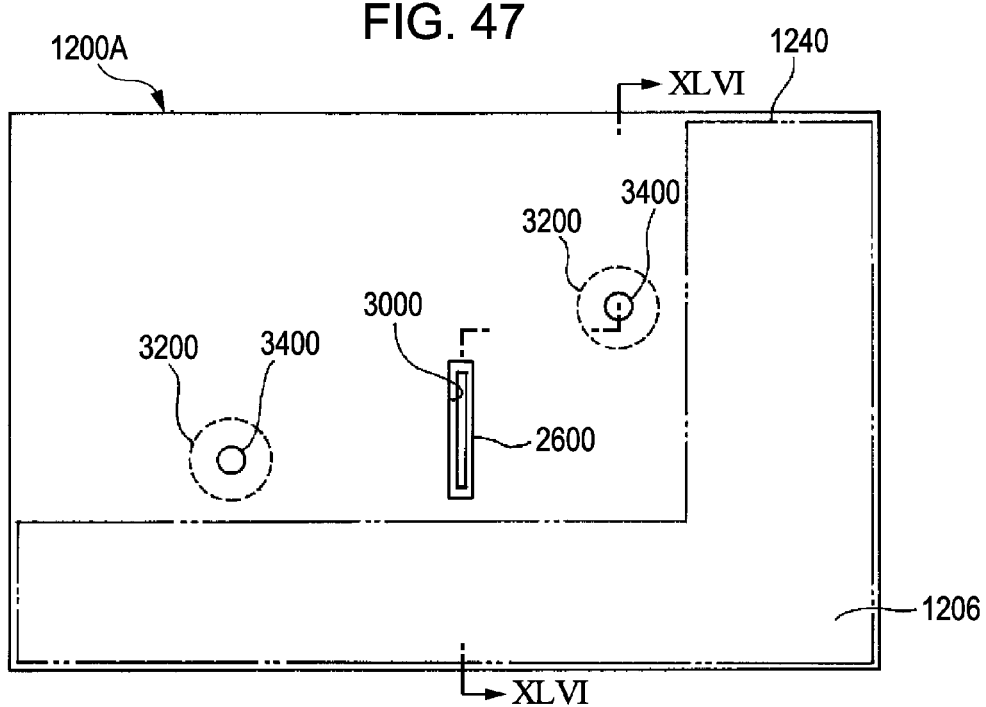
FIG. 47 is a view in the direction of arrows XLVII-XLVII of FIG. 46.
Figure 48:
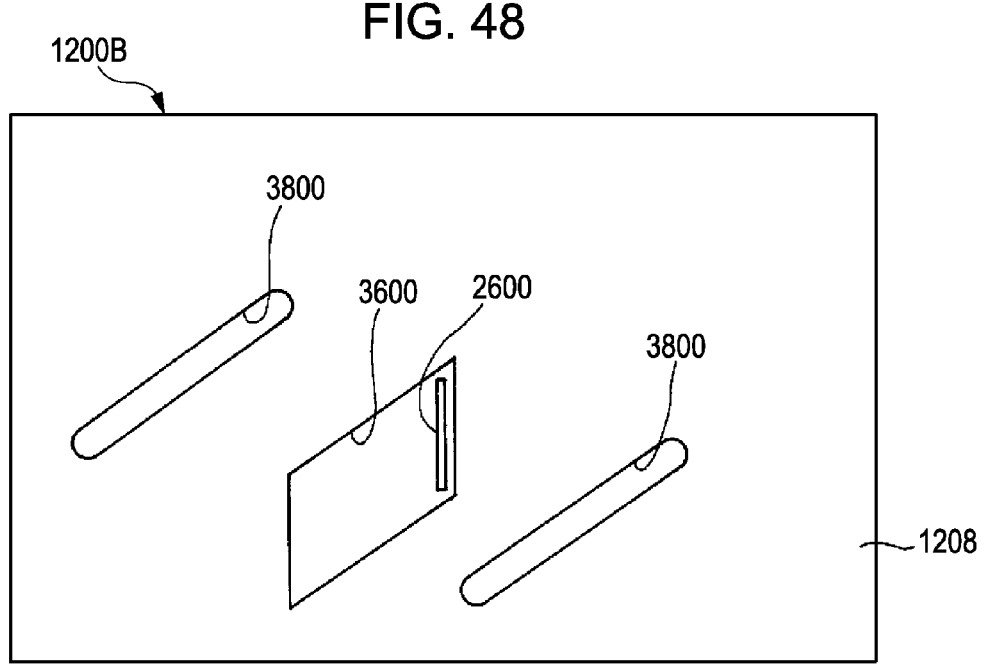
FIG. 48 is a view in the direction of arrows XLVIII-XLVIII of FIG. 46.
Figure 49:
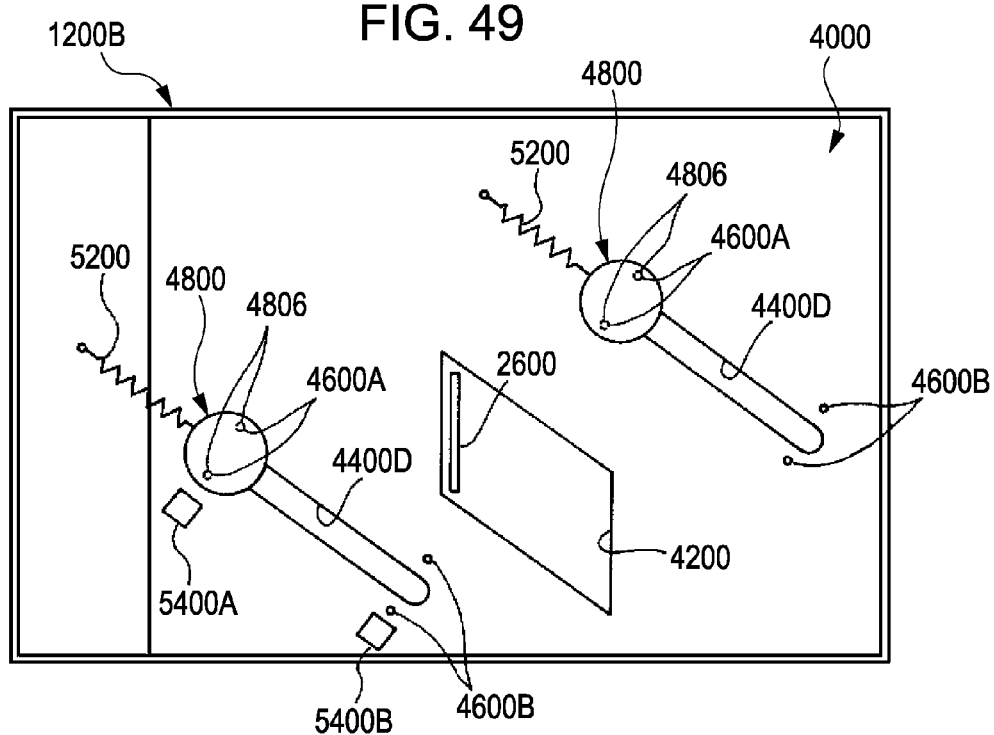
FIG. 49 is a view in the direction of arrows XLIX-XLIX of FIG. 46.
Figure 50:
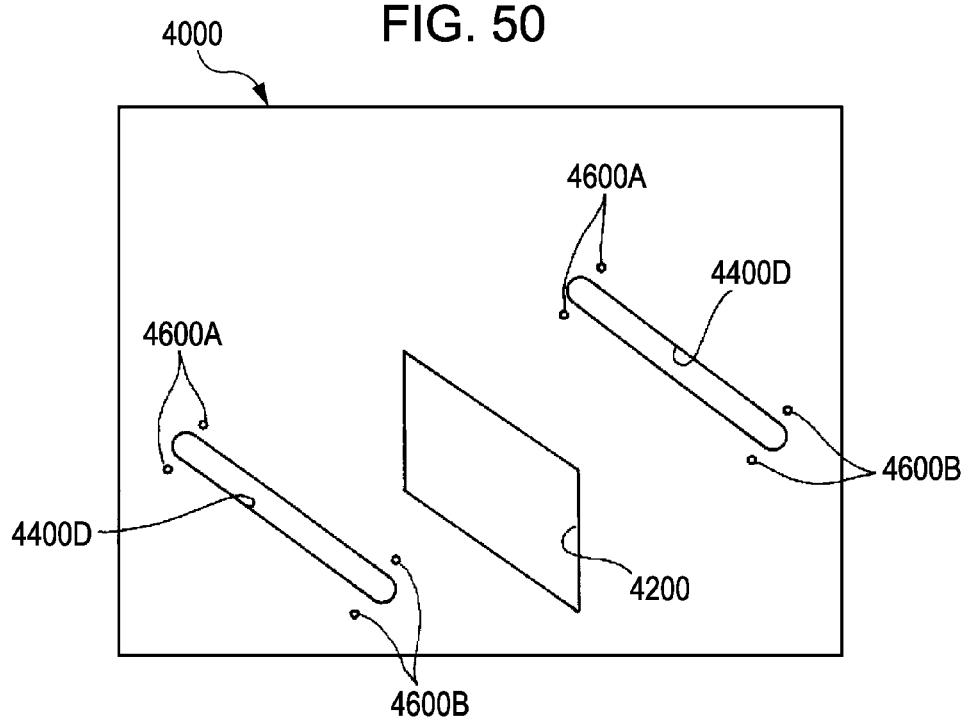
FIG. 50 is a plan view of a guide plate 4000.

FIG. 46 is a cross-sectional view of the image capturing apparatus 1000 according to the sixth exemplary embodiment. FIG. 47 is a view in the direction of arrows XLVII-XLVII of FIG. 46. FIG. 48 is a view in the direction of arrows XLVIII-XLVIII of FIG. 46. FIG. 49 is a view in the direction of arrows XLIX-XLIX of FIG. 46. FIG. 50 is a plan view of a guide plate 4000. Note that FIG. 46 corresponds to a view in the direction of arrows XLVI-XLVI of FIG. 47.

As shown in FIGS. 46 and 47, a groove 3000 for allowing the flexible board 2600 to pass therethrough is formed in the center area of the back surface 1206 of the camera body chassis 1200A (in the horizontal and vertical directions). In addition, two boss portions 3200 are formed so as to protrude from the inner surface of the back surface 1206 of the camera body chassis 1200A at two locations on the left and right sides of the groove 3000. Also, these two locations are separated in the vertical direction. A pin fitting hole 3400 is formed in each of the boss portions 3200.

In contrast, as shown in FIG. 48, a groove 3600 for allowing the flexible board 2600 to pass therethrough is formed on the left side of the vertical center line of the front surface 1208 and at the middle portion in the vertical direction of the front surface 1208 of the display unit chassis 1200B so as to extend obliquely with respect to the short sides and long sides of the front surface 1208 of the display unit chassis 1200B.

Additionally, two pin insertion grooves 3800 are formed at two positions on the front surface 1208 of the display unit chassis 1200B, one of which is on the left side of the groove 3000 and the other is on the right side of the groove 3000. Also, the two pin insertion grooves 3800 are separated in the vertical direction. Each of the pin insertion grooves 3800 extends obliquely with respect to the short sides and long sides of the display unit chassis 1200B.

Furthermore, as shown in FIGS. 49 and 50, a guide plate 4000 is mounted on the inner surface of the front surface 1208 of the display unit chassis 1200B. The guide plate 4000 is formed from a material having strength and rigidity higher than those of the material of the display unit chassis 1200B.

A groove 4200 and two guide grooves 4400D are formed on the guide plate 4000 at positions corresponding to the groove 3600 and the pin insertion grooves 3800, respectively.

That is, each of the guide grooves 4400D extends obliquely with respect to the short sides and long sides of the front surface 1208 of the display unit chassis 1200B.

Additionally, a first protrusion 4600A is formed on both sides of the upper end portion of each of the two guide grooves 4400D. A second protrusion 4600B is formed on both sides of the lower end portion of each of the two guide grooves 4400D.

As shown in FIG. 46, the front surface 1202 of the camera body chassis 1200A is overlapped with the front surface 1208 of the display unit chassis 1200B. A shaft 4802 of a guide pin 4800 passes through the guide groove 4400 of the guide plate 4000 and the pin insertion groove 3800 of the front surface 1208 and fits the pin fitting hole 3400 of the boss portions 3200 of the camera body chassis 1200A. The orientation of a head 4804 of the guide pin 4800 is adjusted so that fitting recesses 4806 formed on the lower surface of the head 4804 of the guide pin 4800 fit the first protrusion 4600A and the second protrusion 4600B of the guide plate 4000. After the orientation of the head 4804 is adjusted, the guide pin 4800 is secured to the boss portion 3200 using an adhesive agent 5000.

In this way, the back surface 1206 of the camera body chassis 1200A is connected to the front surface 1208 of the display unit chassis 1200B such that the back surface 1206 of the camera body chassis 1200A is moved with respect to the front surface 1208 of the display unit chassis 1200B.

Furthermore, as shown in FIG. 49, a coil spring 5200 is provided between the head 4804 of the guide pin 4800 and the front surface 1208 of the display unit chassis 1200B so as to press the guide pin 4800 against the right end of the guide groove 4400D (the right end of the lateral groove portion 4402).

That is, as shown in FIG. 49, when the guide pin 4800 is placed at the right end of the guide groove 4400D, the first state is achieved in which, as shown in FIGS. 37A and 37B, the camera body chassis 1200A overlaps the display unit chassis 1200B so that the outline of the image capturing apparatus 1000 is minimized when viewed in the thickness direction.

Additionally, when the guide pin 4800 is placed at the left end of the guide grooves 4400D, the second state is achieved in which, as shown in FIGS. 39 and 40, the back surface 1206 of the camera body chassis 1200A is partially exposed from the display unit chassis 1200B so that the outline of the image capturing apparatus 1000 is larger than that in the first state when viewed in the thickness direction.

That is, when the fitting recess 4806 on the lower surface of the head 4804 of the guide pin 4800 fits the first protrusion 4600A of the guide plate 4000, the first state shown in FIGS. 37A and 37B is formed.

In contrast, when the fitting recess 4806 on the lower surface of the head 4804 of the guide pin 4800 fits the second protrusion 4600B of the guide plate 4000, the second state shown in FIGS. 39 and 40 is achieved.

When a user moves the camera body chassis 1200A relative to the display unit chassis 1200B, the fitting recess 4806 fits the first protrusion 4600A or the second protrusion 4600B. Thus, each time the image capturing apparatus 1000 enters the first state or the second state, the user feels a click sensation and the selected first or second state can be maintained.

In addition, since the coil spring 5200 is provided, the camera body chassis 1200A and the display unit chassis 1200B are pressed against each other so that the first state is achieved. Accordingly, when the user moves the camera body chassis 1200A and the display unit chassis 1200B from the first state to the second state, the image capturing apparatus 1000 can provide the user with a sense of resistance. In addition, when the image capturing apparatus 1000 is returned from the second state to the first state, the biasing force of the lock portion 52 acts. Therefore, by applying only a weak operation force, the user can return the image capturing apparatus 1000 to the first state.

Accordingly, in the present exemplary embodiment, the guide pin 4800, the fitting recess 4806, the first protrusion 4600A, and the second protrusion 4600B can form a click mechanism that stops and maintains the camera body chassis 1200A and the display unit chassis 1200B in the first state or the second state.

Additionally, as shown in FIG. 49, the guide plate 4000 includes a first proximity switch 5400A for detecting that the guide pin 4800 is engaged with the first protrusion 4600A and outputting a position detection signal and a second proximity switch 5400B for detecting that the guide pin 4800 is engaged with the second protrusion 4600B and outputting a position detection signal. Like the third exemplary embodiment, these first proximity switches 5400A and second proximity switch 5400B form a position detecting unit 1018 (see FIG. 26).

Like the fifth exemplary embodiment, in the sixth exemplary embodiment, the optical member 1402 of the photographing optical system 1400 is disposed on the front surface 1202 at a location shifted from the center of the front surface 1202 in a direction away from the exposed area of the back surface 1206 of the camera body chassis 1200A in the second state. Thus, the position of the optical axis of the photographing optical system 1400 can be located close to the center point of the display panel 1800 in the second state. Accordingly, in the second state, the offset between the position of the subject when the user directly views the subject and the position of the subject displayed on the display panel 1800 in the horizontal and vertical directions can be decreased. Thus, the ease of operation can be advantageously improved during image capture.

As noted above, the sixth exemplary embodiment also can provide the same advantages as those of the third exemplary embodiment.

While the foregoing embodiments have been described with reference to the image capturing apparatus 1000 functioning as a digital still camera, the present invention can be applied to, for example, a variety of image capturing apparatuses (such as video cameras) or a mobile information device (such as a cell phone, a personal digital assistant (PDA), a laptop personal computer, or a music player).

In the foregoing embodiments, the directions, for example, the forward-backward direction, the right-left direction, the horizontal direction, and vertical direction should be interpreted to be illustrative only and non limiting. Thus, the present invention is not limited by these directions.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus comprising:
   a camera body having an image-capturing lens for receiving light to form an image of a subject;
   a display unit having a display screen for displaying the image, the display unit being slidably supported by the camera body, a surface of the display unit opposite a surface having the display screen disposed thereon facing a surface of the camera body opposite a surface having the image-capturing lens disposed thereon;
   wherein an image capture button used for capturing the image is disposed on the surface of the camera body opposite the surface having the image-capturing lens disposed thereon and wherein the image capture button is exposed when the display unit is slid over the camera body in a first direction and the image capture button is covered by the display unit when the display unit is slid over the camera body in a second direction opposite the first direction;
   a lens cover configured to cover and uncover the image-capturing lens, the lens cover being slidable with respect to and over the camera body together with the display unit when the display unit is slid in the first and second directions;
   wherein the lens cover uncovers the image-capturing lens when the display unit is slid in the first direction and exposes the image capture button and the lens cover covers the image-capturing lens when the display unit is slid in the second direction and covers the image capture button,
   wherein, with the display unit slid to a maximum extent in the second direction over the camera body, the lens cover covers the image-capturing lens without covering a portion of the surface of the camera body having the image-capturing lens disposed thereon.

2. The image capturing apparatus according to claim 1, wherein, when the display unit is slid in the first direction, the center of the display screen moves in a direction towards the image-capturing lens.

3. The image capturing apparatus according to claim 2, wherein, when the display unit is slid in the first direction and the image capture button is exposed, the center of the display screen is located on the optical axis of the image-capturing lens.

4. An image capturing apparatus comprising:
   a camera body having an image-capturing lens for receiving light to form an image of a subject;
   a display unit having a display screen for displaying the image, the display unit being slidably supported by the camera body, a surface of the display unit opposite a surface having the display screen disposed thereon facing a surface of the camera body opposite a surface having the image-capturing lens disposed thereon;
   wherein an image capture button used for capturing the image is disposed on the surface of the camera body opposite the surface having the image-capturing lens disposed thereon and wherein the image capture button is exposed and an image capture mode for capturing the image of a subject is set when the display unit is slid over the camera body in a first direction;
   a lens cover configured to cover and uncover the image-capturing lens, the lens cover being slidable with respect to and over the camera body together with the display unit when the display unit is slid in the first direction and a second direction opposite to the first direction;
   wherein the lens cover uncovers the image-capturing lens when the display unit is slid in the first direction and exposes the image capture button and the lens cover covers the image-capturing lens when the display unit is slid in the second direction and covers the image capture button;
   wherein, with the display unit slid to a maximum extent in the second direction over the camera body, the lens cover covers the image-capturing lens without covering a portion of the surface of the camera body having the image-capturing lens disposed thereon.

5. The image capturing apparatus according to claim 4, wherein, when the display unit is slid over the camera body in the second direction, a playback mode for displaying the captured image on the display screen is set.

6. The image capturing apparatus according to claim 4, wherein, when the display unit is slid over the camera body in the first direction, the image capturing apparatus is powered on.

* * * * *